United States Patent
Levitsky et al.

(10) Patent No.: US 11,626,914 B2
(45) Date of Patent: Apr. 11, 2023

(54) DEMODULATION REFERENCE SIGNAL CONFIGURATION SELECTION AND REPORTING

(71) Applicant: QUALCOMM Incorporated, San Diego, CA (US)

(72) Inventors: Michael Levitsky, Rehovot (IL); Wanshi Chen, San Diego, CA (US); Jacob Pick, Beit Zayit (IL); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 17/318,769

(22) Filed: May 12, 2021

(65) Prior Publication Data

US 2021/0376898 A1    Dec. 2, 2021

Related U.S. Application Data

(60) Provisional application No. 63/030,901, filed on May 27, 2020.

(51) Int. Cl.
  *H04B 7/06* (2006.01)
  *H04L 5/00* (2006.01)
  *H04W 24/10* (2009.01)
  *H04B 17/336* (2015.01)

(52) U.S. Cl.
  CPC ......... *H04B 7/0626* (2013.01); *H04B 17/336* (2015.01); *H04L 5/0051* (2013.01); *H04W 24/10* (2013.01)

(58) Field of Classification Search
  CPC ..... H04B 7/0626; H04L 5/0051; H04W 24/10
  See application file for complete search history.

(56) References Cited

U.S. PATENT DOCUMENTS

| | | | |
|---|---|---|---|
| 11,159,270 B2* | 10/2021 | Khoshnevisan | H04L 5/0035 |
| 2015/0373694 A1* | 12/2015 | You | H04W 24/08 |
| | | | 370/329 |
| 2021/0344462 A1* | 11/2021 | Jiao | H04L 5/0094 |
| 2021/0378004 A1* | 12/2021 | Cirik | H04W 72/1289 |
| 2022/0149901 A1* | 5/2022 | Zhang | H04B 7/0695 |
| 2022/0201712 A1* | 6/2022 | Su | H04L 5/0094 |
| 2022/0216964 A1* | 7/2022 | Mon | H04J 11/0053 |

* cited by examiner

*Primary Examiner* — Zhiren Qin
(74) *Attorney, Agent, or Firm* — Holland & Hart LLP

(57) ABSTRACT

Methods, systems, and devices for wireless communications are described. In some systems, a user equipment (UE) may determine a set of groups of layers relating to a set of transport blocks (TBs) or a set of code division multiplexing (CDM) groups. The UE may group the layers such that the layers in each group have a minimal difference in signal-to-interference-plus-noise ratio (SINR) between the layers. The UE may select a different demodulation reference signal (DMRS) configuration for each of the set of groups of layers based on maximizing a communication efficiency metric for each group of layers. The UE may transmit an indication of the selected DMRS configurations for each group of layers to a base station via a field in a report. The base station may accordingly determine a DMRS configuration for each group of layers based on the DMRS configurations indicated by the UE.

30 Claims, 18 Drawing Sheets

| | PDCCH Symbols 405 | | PDSCH Symbols 410 | | Available REs 415 |

DEMODULATION REFERENCE SIGNAL CONFIGURATION SELECTION AND REPORTING

CROSS REFERENCE

The present application for Patent claims the benefit of U.S. Provisional Patent Application No. 63/030,901 by LEVITSKY et al., entitled "DMRS CONFIGURATION SELECTION AND REPORTING PER TB AND PER CDM GROUP," filed May 27, 2020, assigned to the assignee hereof, and expressly incorporated by reference herein.

FIELD OF TECHNOLOGY

The following relates to wireless communications, including demodulation reference signal (DMRS) configuration selection and reporting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A wireless communications system may support the transmission of reference signals to estimate channel characteristics and increase a reliability of data transmissions.

SUMMARY

The described techniques relate to improved methods, systems, devices, and apparatuses that support demodulation reference signal (DMRS) configuration selection and reporting. In some examples, DMRS configuration selection and reporting may be performed per transport block (TB) and per code division multiplexing (CDM) group. Generally, the described techniques provide for selecting a DMRS configuration for each of one or more groups of layers associated with a data channel. For example, a base station may transmit data to a user equipment (UE) over a data channel using a set of groups of layers and may use a DMRS configuration (e.g., a different DMRS configuration) for each of the set of groups of layers. In some implementations, the base station may select the DMRS configurations for each group of layers based on an indication of a number of selected DMRS configurations received from the UE. In some examples, the UE may select the DMRS configurations based on a set of channel characteristics and a link quality characteristic, such as a spectral efficiency and post-processing signal-to-interference-plus-noise ratio (SINR), for a data channel over which the base station may transmit data to the UE.

For example, the UE may determine a set of channel characteristics and measure the post-processing SINR for the data channel based on a channel state information (CSI) reference signal (CSI-RS) and a CSI interference measurement (CSI-IM) resource. The UE may use the determined set of channel characteristics and the estimated post-processing SINR, which may be referred to as CSI-RS SINR or CSI-RS post-processing SINR, to determine the corresponding post-processing SINR for the data channel and to identify or otherwise determine a set of link quality characteristics for each layer of a quantity of layers associated with the data channel. In some aspects, the set of link quality characteristics may include a set of SINRs, which may be referred to as a set of DMRS SINRs or DMRS post-processing SINRs. For example, each SINR of the set of SINRs (i.e., the set of link quality characteristics) may correspond to a tested DMRS configuration of a set of pre-defined or pre-configured DMRS configurations.

The UE may determine a grouping of the quantity of the layers based on the determined DMRS post-processing SINR. In some examples, the UE may group or pair layers together such that the layers within a group have a minimal difference in DMRS post-processing SINR. For each group of layers, the UE may select a DMRS configuration from the set of tested DMRS configurations and using the identified set of link quality characteristics corresponding to the tested DMRS configurations for each layer of that group of layers and based on a communication efficiency metric determined for each group of layers. In some aspects, the communication efficiency metric may include spectral efficiency maximization criteria and the UE may select a DMRS configuration from the set of DMRS configurations based on determining which DMRS of the set of DMRS configurations is associated with the greatest communication efficiency metric (e.g., the greatest spectral efficiency) for each group of layers. Accordingly, the UE may select a DMRS configuration for each group of layers based on determining which DMRS configuration may result in the greatest spectral efficiency for each group of layers. The UE may transmit an indication of the selected DMRS configurations to the base station. In some examples, the UE may transmit the indication of the selected DMRS configurations in a field of a channel state feedback (CSF) report.

DETAILED DESCRIPTION

Figure 1:
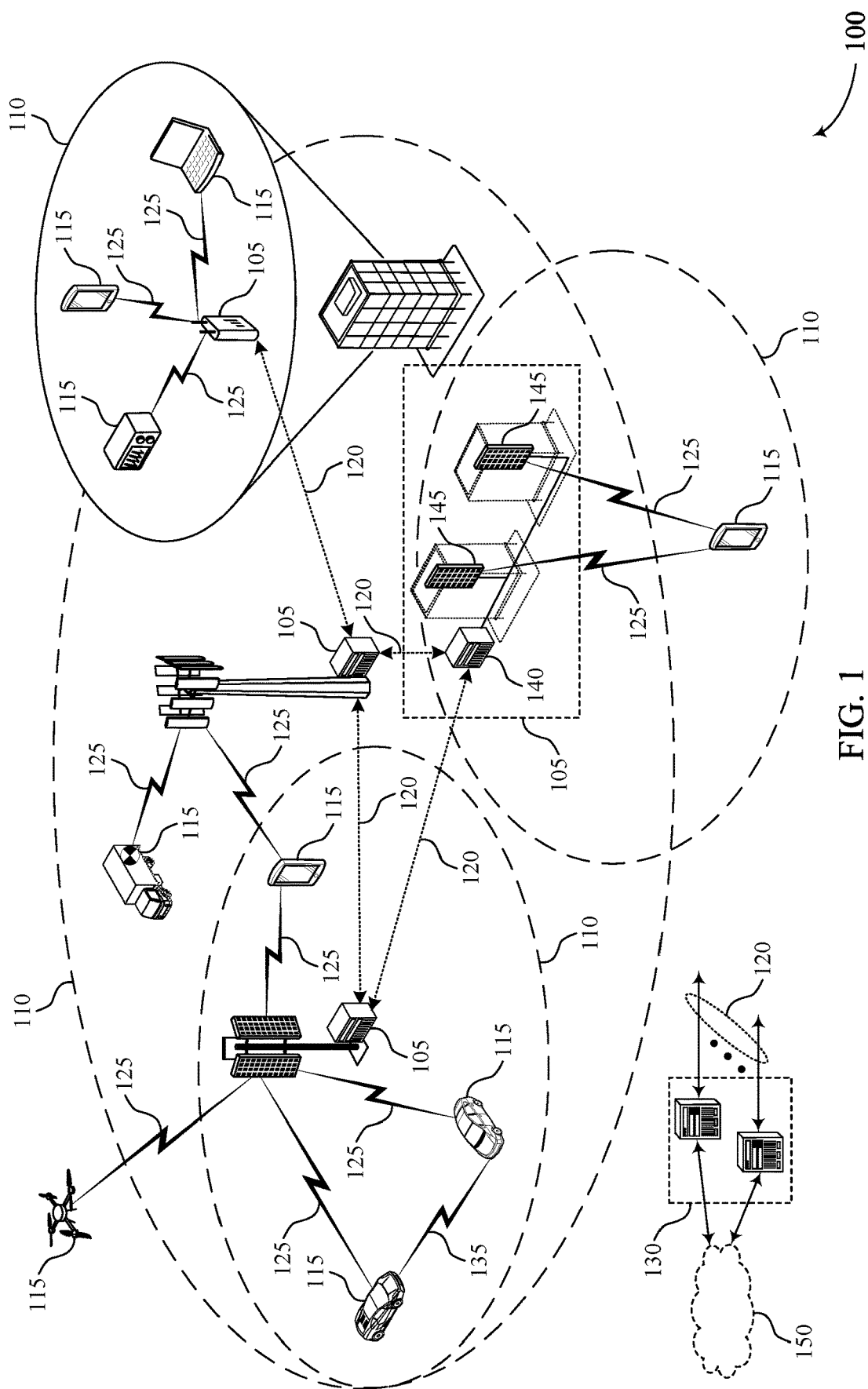
FIG. 1 illustrates an example of a wireless communications system that supports demodulation reference signal (DMRS) configuration selection and reporting per transport block (TB) and per code division multiplexing (CDM) group in accordance with aspects of the present disclosure.

Reference signals may be used to determine measurements for and an estimate of a channel to maintain a reliable and efficient link between wireless devices. For example, a channel state information reference signal (CSI-RS) may be used to adapt transmission parameters. Additionally, a demodulation reference signal (DMRS) may be used to determine an estimate of a data channel (e.g., a physical downlink/uplink shared channel (PDSCH/PUSCH)) and to assist in the demodulation and decoding of signals received over the data channel.

A DMRS configuration used by a wireless device may be determined based on radio resource control (RRC) signaling. In some cases, however, communication parameters that are established using RRC procedures may become sub-optimal or inconvenient after some changes in channel and reception conditions. For instance, RRC re-configuration procedures may be unable to adopt DMRS configuration "on the fly." For example, RRC reconfiguration procedures may be non-synchronous and associated with high latency. Thus, signaling a DMRS configuration to a wireless device in accordance with RRC procedures may result in an unstable or unreliable communications link and, in some cases, a loss of connectivity.

Further, unstable or unreliable communications links may be associated with or otherwise result in lower spectral efficiency of the communication links. Spectral efficiency of a link may be associated with a measure of achievable throughput of the communication link using an allocation of resources. For example, a wireless device may determine the spectral efficiency of the communication link based on determining a ratio between communication resources that are allocated to data signaling and communication resources that are allocated to control/management signaling and based on determining the efficiency of the transmission on data resources. In cases in which a loss of connectivity is likely, more communication resources may be allocated to control/management signaling and less communication resources may be allocated for data signaling, which may reduce the spectral efficiency of the communication link.

Spectral efficiency may depend on selected transmission parameters, a channel, a signal-to-noise ratio (SNR), and a pilot configuration used for channel estimation. In some cases, changes in channel conditions that occur after the DMRS configuration is signaled cause a configured DMRS configuration to use excessive resources without providing any increase in spectral efficiency or link efficiency associated with communications to a wireless device. In some other cases, a change in channel conditions may cause a selected DMRS configuration to use insufficient resources for optimizing spectral efficiency or link efficiency associated with communications to a wireless device. Moreover, selecting a single DMRS configuration for each group of layers may be sub-optimal. For example, the spectral efficiency or link efficiency associated with a DMRS configuration may be based on one or more link quality characteristics, such as a signal-to-interference-plus-noise ratio (SINR), which may vary across different groups of layers.

To increase a spectral efficiency associated with a communications link, preferred DMRS configurations may be identified by a wireless device and signaled to a scheduling node (e.g., a transmitting device, such as a base station) to adapt to short-term changes in channel and reception conditions. In some examples, a wireless device, such as a user equipment (UE), may use a CSI-RS to determine a set of characteristics and a link quality characteristic (e.g., SINR, such as post-processing SINR) for a channel. The wireless device may use the determined set of channel characteristics and the estimated link quality characteristic to estimate multiple equivalent link quality characteristics that correspond to multiple tested DMRS configurations for each layer of a quantity of layers associated with a data channel. The wireless device may then use the estimated equivalent link quality characteristics to identify a DMRS configuration of the multiple DMRS configurations for subsequent communications for each of one or more groups of layers (where the layers are grouped to achieve a smallest difference in post-processing SINR between the layers of a group). For example, the wireless device may select a DMRS configuration for a group of layers (related to the same transport block (TB) or to the same code division multiplexing (CDM) group) based on determining that a spectral efficiency for the group of layers provided by the DMRS configuration is higher than a spectral efficiency provided by the other DMRS configurations for the group of layers. The wireless device may indicate the identified DMRS configurations (one DMRS configuration for each of the one or more groups of layers) to a scheduling node. The scheduling node may select a DMRS configuration for each group of layers for subsequent transmissions to the wireless device based on the indicated DMRS configurations. For example, the scheduling node may select the indicated DMRS configurations or select DMRS configurations related to the indicated DMRS configurations based on network scheduling criteria. By adaptively selecting different DMRS configurations for each group of layers (related to the same TB or to the same CDM group) based on DMRS configurations indicated by a wireless device, the communication link between the scheduling node and the wireless device may achieve a greater spectral efficiency.

Aspects of the disclosure are initially described in the context of wireless communications systems. Aspects of the disclosure are additionally described in the context of a collection of operations, DMRS configurations, and a process flow. Aspects of the disclosure are further illustrated by and described with reference to apparatus diagrams, system diagrams, and flowcharts that relate to DMRS configuration selection and reporting per TB and per CDM group.

FIG. 1 illustrates an example of a wireless communications system 100 that supports DMRS configuration selection and reporting per TB and per CDM group in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A wireless communications system 100 may support the allocation of portions of wireless spectrum (e.g., communication resources) to wireless devices. The wireless spectrum may be partitioned into resource elements (k), where a resource element may be the smallest defined unit of a communication resource—a resource element may span one subcarrier (e.g., may span 12 KHz) and one symbol (e.g., may span 66.7 µs). A communication resource may include a set of resource elements.

A wireless communications system 100 may support the transmission of multiple sets of data using a common communication resource—e.g., by using multiple spatial streams (l). By communicating multiple sets of data using a common communication resource, a throughput of a wireless communications system 100 may be increased.

A wireless communications system 100 may support the transmission of reference signals to increase an efficiency and a reliability of communications between wireless devices (e.g., a base station 105 and a UE 115). Reference signals may be transmitted from a base station 105 to a UE 115, and vice versa. Reference signals transmitted to a UE 115 may be referred to as downlink reference signals and reference signals transmitted to a base station 105 may be referred to as uplink reference signals. Reference signals may be used by the wireless devices to determine characteristics of a channel. The characteristics of a channel may also be referred to as a channel estimate, channel conditions, or channel metrics. Reference signals may include CSI-RS, downlink (DL) DMRS, uplink (UL) DMRS, sounding reference signal (SRS), tracking reference signal (TRS), and phase tracking reference signal (PTRS).

A CSI-RS transmission may be used by a UE 115 to determine a channel estimate that is used to assist in link adaptation. For example, a UE 115 may use a CSI-RS transmission to assist in the adaptation of transmission parameters to maintain a reliable communication link between the UE 115 layer and a base station 105. The channel estimate may be used to determine a signal quality ratio, such as a post-processing SNR or a post-processing SINR, for the channel, a delay spread ($\tau_{rms}$) for the channel/a classification of the channel (or channel type), a precoding matrix to use for communications over the channel, a rank to use for communications over the channel, or any combination thereof. A DL DMRS transmission may also be used by a UE 115 to determine a data channel estimate that may be used to demodulate and decode transmissions received in a data channel. The channel estimate determined using the CSI-RS transmission may be different than the channel estimate determined using the DL DMRS transmission. Thus, a DL DMRS may be transmitted using resources that are associated with data resources allocated to a UE 115. A TRS transmission may be used by a UE 115 for synchronization loops and for determination of mid and long-term characteristics of a channel, such as a Doppler frequency, delay spread, and power delay profile.

An UL DMRS may be used by a base station 105 to determine a channel estimate for an uplink channel between the base station and a UE 115 that transmitted the UL DMRS (e.g., so the base station 105 can perform coherent demodulation of the physical uplink control channel (PUCCH) and the physical uplink shared channel (PUSCH)). For example, each scheduled PUCCH and PUSCH may have its own DMRS, which may assist the base station 105 with demodulation and decoding. The UL SRS may be used by a base station 105 for uplink link adaption, uplink transmission parameter selection, and uplink measurements, among other uses. In some examples, an UL SRS may be used by a base station 105 to determine the uplink channel quality over a wide bandwidth so that the base station 105 can perform frequency-selective scheduling for the UE 115 that transmitted the UL SRS.

A reference signal may be transmitted over communication resources in accordance with a reference signal configuration. A reference signal configuration may indicate which resource elements are allocated to a reference signal transmission. In some cases, a resource element allocated to a transmission of a reference signal may be referred to as a pilot resource element. A group of resource elements (e.g., contiguous resource elements) within a symbol period allocated to a transmission of a reference signal may be referred to as a pilot symbol. In some cases, a reference signal configuration indicates a temporal spacing ($D_t$) between resource elements allocated to a reference signal; a frequency spacing ($D_f$) between resource elements allocated to a reference signal; and a power boosting parameter ($\rho_p$) that indicates a power for transmitting the reference signal resource element relative to a power for transmitting a data resource element. Different reference signal configurations may be associated with different combinations of temporal spacing, frequency spacing, and power boosting. For example, a first reference signal configuration may be associated with a first temporal spacing, a first frequency spacing, and a first power boosting and a second reference signal configuration may be associated with the first temporal spacing, the first frequency spacing, and a second power boosting, and so on.

A base station 105 may determine configurations for the different reference signals. In some cases, a base station 105 determines a DL or UL DMRS configuration for a UE 115 by selecting the DMRS configuration from a limited set of DMRS configurations. The base station 105 may then signal the selected DMRS configuration to a UE 115 using RRC signaling.

A wireless communications system 100 may increase a reliability and/or an efficiency of communications between wireless devices (e.g., a base station 105 and a UE 115) by avoiding transmissions over particular resources. For example some resources may be left unused for one or more purposes relating to increasing the reliability and/or the efficiency of communications between the wireless devices. In some cases, resources that are left unused may be referred to as interference management resources. Interference management resources may be used by wireless devices to determine interference and noise characteristics of a channel and to assist in deriving post-processing channel quality estimations using reference signals.

CSI-IM resources may be configured to enable a UE 115 to measure interference caused by neighboring cells to data resources of a serving cell. CSI-IM resources may be used by a UE 115 to determine a noise covariance matrix estimate for a channel ($R_{nn}$). A UE 115 may use the noise estimate to obtain a refined channel estimate that takes in account noise observed on the channel. CSI-IM resources may also be used to determine a noise variance factor ($\sigma_{IM}^2$). In some cases, CSI-IM resources may be coupled with CSI-RS transmissions. For example, CSI-IM resource elements may be allocated with reference to (e.g., to supplement) allocated CSI-RS resource elements. Thus, CSI-RS and CSI-IM resource may be used together to determine a channel estimate and the corresponding post-processing signal quality ratio.

A UE 115 may use demodulation reference signals to determine a signal quality ratio for a data channel. In some cases, a UE 115 may use a minimum mean squared error (MMSE) equalization or linear MMSE (LMMSE) filtering approach to obtain post-processing SINR for a channel. An MMSE approach may include estimating post-processing SINR for each resource element k of each involved spatial stream l, which may also be referred to as a layer or spatial layer as described herein. For example, for each spatial stream l and resource element k included in a communication resource, post-processing SINR ($\gamma_l(k)_{DMRS}$) obtained using DMRS based channel estimation may be formulated based on Equation 1:

$$\gamma_l(k)_{DMRS} = \frac{1}{(\sigma_n^2 + \sigma_{ICI}^2 + \sigma_e^2) \cdot \left[ (\hat{H}_{eff}^H(k)\hat{H}_{eff}(k) + (\sigma_n^2 + \sigma_{ICI}^2 + \sigma_e^2) \cdot I)^{-1} \right]_{l,l}} - 1$$

$$\hat{H}_{eff}(k) = \hat{H}(k) \cdot P$$

$$\sigma_e^2 = f(\tau_{rms}, f_{D\_max}, D_t, D_f, SNR(\rho_p))$$

where $\sigma_n^2$ may be thermal noise variance; $\sigma_{ICI}^2$ may be inter-carrier interference variance; $\sigma_e^2$ may be channel estimation error variance, and $\hat{H}_{eff}(k)$ may be an effective estimated channel matrix. The channel estimation error variance may be determined to accommodate for noise that is received with and inseparable from a reference signal, modelling errors, and algorithmic limitations. Also, P may be a precoding matrix and $\hat{H}(k)$ may be an estimated channel matrix. Moreover, $\tau_{rms}$ may be a delay spread for the channel and $f_{D\_max}$ may be a Doppler frequency for the channel. Additionally, $D_t$ may be a temporal spacing between resource elements used for the demodulation reference signal; $D_f$ may be a frequency spacing between resource element used for the demodulation reference signal; and $\rho_p$ may be a power level used to transmit the reference signal resource elements relative to a power level used to transmit data resource elements. The term $SNR(\rho_p)$ may be an input SNR on the pilot resource elements used for a demodulation reference signal and may be a function of $\rho_p$.

In some cases, the UE 115 may determine an average post-processing SINR for each spatial stream l by averaging, for a spatial stream l, the post-processing SINRs determined across the resource elements k. In some other cases, the UE 115 may determine an average post-processing SINR for each subband for each spatial stream l by averaging, for a subband and a spatial stream l, the post-processing SINRs determined across the resource elements k of the subband. In either case, the average post-processing SINR for a DMRS may be referred to as $\gamma_{l_{DMRS}}$. In some examples, the UE 115 may use Equation 1 to determine a post-processing SINR for a channel using a DMRS, in which case $\gamma_l(k)_{RS}$ may be represented as $\gamma_l(k)_{DMRS}$. In some cases, a post-processing SINR for a channel may be dependent on a configuration of a DMRS. For example, a post-processing SINR for a channel may be increased/decreased depending on the portion of the channel estimation error which depends on the combination of the channel characteristics and pilot configuration used for channel estimation. A base station 105 may similarly use Equation 1 to determine a per resource element post-processing SINR and average post-processing SINR using an uplink reference signal.

Additionally, or alternatively, a UE 115 may determine a post-processing signal quality ratio for a channel based on the channel characteristics determined using the CSI-RS and CSI-IM resources with noise estimation that is free of a channel estimation error component $\sigma_e^2$ (e.g., because the noise measured using the interference management resources may be isolated from the reference signal). That is, the noise component $(\sigma_n^2 + \sigma_{ICI}^2 + \sigma_e^2)$ can be replaced with the noise variance $\tilde{\sigma}_{IM}^2$ measured using an interference management resource, where $\tilde{\sigma}_{IM}^2 \triangleq \sigma_n^2 + \sigma_{ICI}^2$. For example, for a spatial stream l and a resource element k, a post-processing SINR $(\gamma_l'(k)_{CSI-RS})$ may be determined using a reference signal based on Equation 2:

$$\gamma_l'(k)_{CSI-RS} = \frac{1}{\tilde{\sigma}_{IM}^2 \cdot \left[ \left( \hat{H}_{eff}^H(k) \hat{H}_{eff}(k) + (\tilde{\sigma}_{IM}^2) I \right)^{-1} \right]_{l,l}} - 1$$

The UE 115 may determine an average post-processing SINR for each spatial stream l by averaging the post-processing SINRs determined for each resource element k. In some cases, an average post-processing SINR may be calculated across all resource elements k of a wideband. In some other cases, an average post-processing SINR may be calculated across the resource elements k per subband. The average post-processing SINR may be referred to as $\bar{\gamma}_l'(k)_{CSI-RS}$.

The post-processing SINR calculated based on Equation 2 and the actual post-processing SINR that is expected in case of PDSCH (defined analytically for the sake of the explanation based on Equation 1) may be different from one another. In some cases, the post-processing SINR representative for PDSCH (which may be represented by the variable $\gamma_{DMRS}$) and that is expected to be obtained using DMRS based channel estimation and the post-processing SINR calculated based on Equation 2 (which may be represented by the variable $\gamma_{CSI-RS}$) may be determined based on a CSI-RS and CSI-IM resources. The $\gamma_{DMRS}$ may be an actual representative of channel conditions for data resources allocated to a UE 115 while the $\gamma_{CSI-RS}$ may be an estimate (or projection) of channel conditions for the data resources based on CSI-RS and CSI-IM resources. The expected difference between $\gamma_{CSI-RS}$ and $\gamma_{DMRS}$ can be defined/learned per channel characteristics set and per given reception conditions and may later be used to estimate an $\gamma_{DMRS}$ based on applying an adjustment to a calculated $\gamma_{CSI-RS}$. Additionally, in some cases, the expected difference can be defined/learned for each subband. In some cases, the difference between the $\gamma_{DMRS}$ and the $\gamma_{CSI-RS}$ may be non-linear, and $\gamma_{DMRS}$ may be determined using a non-linear function (e.g., $\gamma_{DMRS}=f(\gamma_{CSI-RS})$). A UE 115 may determine a set of mapping functions/average differences between calculated post-processing SINR values for CSI-RS ($\gamma_{CSI-RS}$) and measured or calculated post-processing SINR values for DMRSs ($\gamma_{DMRS}$) for different combinations of CSI-RS and DMRS configurations. Thus, a difference provided by a corresponding mapping function between a $\gamma_{DMRS}$ and a $\gamma_{CSI-RS}$ may be based on a configuration of a DMRS and a configuration of a CSI-RS and defined per channel characteristics set and per given input/thermal SNR.

A wireless communications system 100 may also support the reporting of information about a channel determined using reference signals. A UE 115 may use CSI-RS to determine optimal/preferred transmission parameters for a channel, such as a preferred precoding matrix, rank, and modulation coding scheme (MCS). The UE 115 may determine a preferred transmission parameter based on determining that a transmission parameter will maximize a channel metric (e.g., a spectral efficiency metric) and/or based on a post-processing signal quality ratio (e.g., a post-processing SINR) for a channel. The UE 115 may indicate the preferred reception parameters to a base station 105 in a channel state feedback (CSF) report (which may also be referred to as a channel state information (CSI) report) that may have different formats and may include a PMI field that conveys a PMI, a rank indicator (RI) field that conveys an RI, a strongest layer indicator (SLI) field that conveys an SLI; and a channel quality indicator (CQI) field that conveys a CQI. The base station 105 may use the PMI and RI to determine a precoding matrix and rank to use for subsequent transmissions and the CQI to determine an MCS for subsequent transmission.

To determine a value for a CQI, the UE 115 may use a post-processing SINR value or an estimated spectral efficiency evaluated using a CSI-RS ($\gamma_{CSI-RS}$). In some cases, to determine a CQI that is more representative of channel conditions and more convenient for a data channel, the UE 115 may estimate a post-processing SINR value for a DMRS configuration that is currently configured ($\gamma_{DMRS}$). The post-processing SINR value for $\gamma_{DMRS}$ may be derived from the $\gamma_{CSI-RS}$ and the corresponding mapping trained numerically for CSI-RS and DMRS configuration combination and per channel characteristic set. The UE 115 may use the estimated post-processing SINR value ($\gamma_{DMRS}$) to determine a value for the CQI. In some cases, to determine the estimated $\gamma_{DMRS}$, the UE 115 may determine a configuration used for a received CSI-RS and a configuration that is currently configured for a DMRS. The UE 115 may then identify an average difference between post-processing SINRs calculated using CSI-RSs of the CSI-RS configuration and DMRSs of the DMRS configuration. The UE 115 may use the identified average difference/mapping to obtain an estimated $\gamma_{DMRS}$ for the current DMRS configuration (e.g., by adding the average difference/or applying a mapping function to the calculated $\gamma_{CSI-RS}$). A base station 105 may use the reported CSI to adapt transmission parameters to better suit a channel. For example, a base station 105 may adapt transmission parameters by using an indicated precoding matrix and rank and using an MCS that corresponds to the CQI value.

As described herein, reference signals may be used to determine measurements for and an estimate of a channel to maintain a reliable and efficient link between wireless devices (e.g., a base station 105 and UE 115). For example, a channel state information reference signal (CSI-RS) may be used to adapt transmission parameters. Additionally, a demodulation reference signal (DMRS) may be used to determine an estimate of a data channel (e.g., a physical downlink shared channel (PDSCH)) and to assist in the demodulation and decoding of signals received over the data channel.

A DMRS configuration used by a UE 115 may be determined based on RRC signaling. But communication parameters that are established using RRC procedures may be unable to adapt to changes in channel and reception conditions (e.g., because RRC reconfiguration procedures are non-synchronous and associated with high latency). Thus, signaling a DMRS configuration to a UE 115 in accordance with RRC procedures may result in an unstable or unreliable communications link and, in some cases, a loss of connectivity. Spectral efficiency may be a measure of throughput that can be conveyed by the link using the allocated resources (e.g., based among the rest on determining a ratio between communication resources that are allocated to data signaling and communication resources that are allocated to control/management signaling). Spectral efficiency on data resource elements may depend on selected transmission parameters, a channel, a signal to noise ratio, and a pilot configuration used for channel estimation. In some cases, changes in channel conditions that occur after the DMRS configuration is signaled cause a selected DMRS configuration to use excessive resources without providing any increase in a spectral efficiency or link efficiency of communications to a UE 115. In some other cases, a change in channel conditions may cause a selected DMRS configuration to use insufficient resources for optimizing link efficiency in communications to a UE 115. Further, a single DMRS configuration for each group of layers (e.g., each group of layers corresponding to a TB or a CDM group) may result in sub-optimal spectral efficiency and achievable throughput. For example, each group of layers may be associated with a different post-processing SINR and the performance of a DMRS configuration may vary over different post-processing SINR scenarios. For instance, a DMRS configuration may result in high spectral efficiency and high achievable throughput for a first group of layers associated with a first post-processing SINR and may result in low (or sub-optimal) spectral efficiency and low achievable throughput for a second group of layers associated with a second post-processing SINR.

To increase a spectral efficiency of a communications link, preferred DMRS configurations may be identified by a UE 115 and signaled to a base station 105 to adapt to short-term changes in channel and reception conditions. In some examples, a wireless device may use a CSI-RS to determine a set of characteristics and to estimate a link quality characteristic, such as a post-processing SINR, for a channel. The UE 115 may use the determined set of channel characteristics and the estimated link quality characteristic to estimate multiple equivalent link quality characteristics that correspond to multiple tested DMRS configurations for each layer associated with a transmission over the channel. In some implementations of the present disclosure, the UE 115 may use the estimated equivalent link quality characteristics to select a different and a most convenient DMRS configuration of the multiple DMRS configurations for subsequent communications for each group of layers associated with a transmission of the channel.

In some examples, the UE 115 may identify or otherwise select the DMRS configuration of the multiple DMRS configurations for each group of layers based on determining that a spectral efficiency achievable with the DMRS configuration is greater than a spectral efficiency obtained with the other DMRS configurations for that group of layers. The UE 115 may indicate the identified DMRS configurations (e.g., one DMRS configuration for each group of layers associated with a transmission over the channel and related to a different TB or a different CDM group) to a scheduling node, such as a base station 105. The base station 105 may select a DMRS configuration for subsequent transmissions to the wireless device for each group of layers based on the indicated DMRS configurations. For example, the base station 105 may select the indicated DMRS configurations or related DMRS configurations based on network scheduling criteria. By adaptively selecting DMRS configurations based on DMRS configurations indicated by a UE 115, a spectral efficiency of a link will be increased. Moreover, based on identifying a DMRS configuration for each group of layers associated with a different TB or related to a different CDM group, the UE 115 may increase the spectral efficiency of the link more than the UE 115 would have otherwise increased the spectral efficiency of the link using a single DMRS configuration. For example, the UE 115 may select a different DMRS configuration for each group of layers based on the post-processing SINR associated with each one of the layers related to the group of layers, which may result in a more optimal spectral efficiency and achievable throughput in case that there is a variation in post-processing SINR across the groups of layers associated with a transmission over the channel.

In some examples, a base station 105 may dynamically select an uplink DMRS configuration that increases spectral efficiency of the link. For example, the base station 105 may use the parameters of one or more uplink reference signals (e.g., DMRS, SRS) and a set of channel characteristics (e.g., Doppler frequency $f_{D\_max}$, delay spread $\tau_{rms}$, SNR) to estimate multiple link quality characteristics (e.g., multiple SINRs) that correspond to multiple uplink DMRS configurations. The base station 105 may use the estimated signal quality characteristics to identify an UL DMRS configuration of the multiple UL DMRS configurations for subsequent communications for each of the one or more groups of layers. For example, the base station 105 may select an UL DMRS configuration for each of the one or more groups of layers based on determining that a spectral efficiency of the link provided by an UL DMRS configuration for a group of layers is higher than a spectral efficiency provided by the other UL DMRS configurations for that group of layers.

However, a base station 105 may not be able to reliably determine the Doppler frequency for the uplink channel, which may prevent the base station 105 from properly selecting a convenient DMRS configuration (e.g., because the SINR values ($\gamma_{DMRS}$) used to select the DMRS configuration are a function of the channel estimation error variance $\sigma_e^2$, which in turn is a function of the Doppler frequency $f_{D\_max}$, as shown in Equation 1). In one example, the base station 105 may estimate the uplink Doppler frequency by measuring repetitions of existing uplink reference signals (e.g., DMRS, SRS) from a UE 115. But the repetitions of these reference signals may be improperly spaced for Doppler frequency estimation, which may result in an inaccurate Doppler frequency estimation that negatively impacts the selection of an UL DMRS configuration.

To more accurately estimate the uplink Doppler frequency, a base station 105 may configure an SRS with a repetition spacing that is appropriate for reliable Doppler frequency estimation given the deployment scenario. Because appropriate repetition spacing is important for reliable Doppler estimation, a base station 105 may select the repetition spacing for a UE 115 based on the subcarrier spacing and carrier frequency configured for the UE 115. Thus, the base station 105 may enable proper selection of an appropriate DMRS configuration that allows an increase in (or maximization of) the spectral efficiency of the link.

Alternatively, the base station 105 may estimate the uplink Doppler frequency by equating it with the downlink Doppler frequency reported by a UE 115. For example, the base station 105 may determine that there are sufficient conditions to assume channel Doppler reciprocity (which may therefore justify an assumption that the uplink Doppler frequency is equal to the downlink Doppler frequency). The downlink Doppler frequency may be determined by the UE 115 based on measurements of a downlink reference signal (e.g., a TRS) transmitted by the base station 105. Thus, the base station 105 may enable selection of an appropriate DMRS configuration that allows an increase in the spectral efficiency of a link by using the reported downlink Doppler frequency as an estimate for the uplink Doppler frequency for calculations related to UL DMRS configuration selection.

Figure 2:
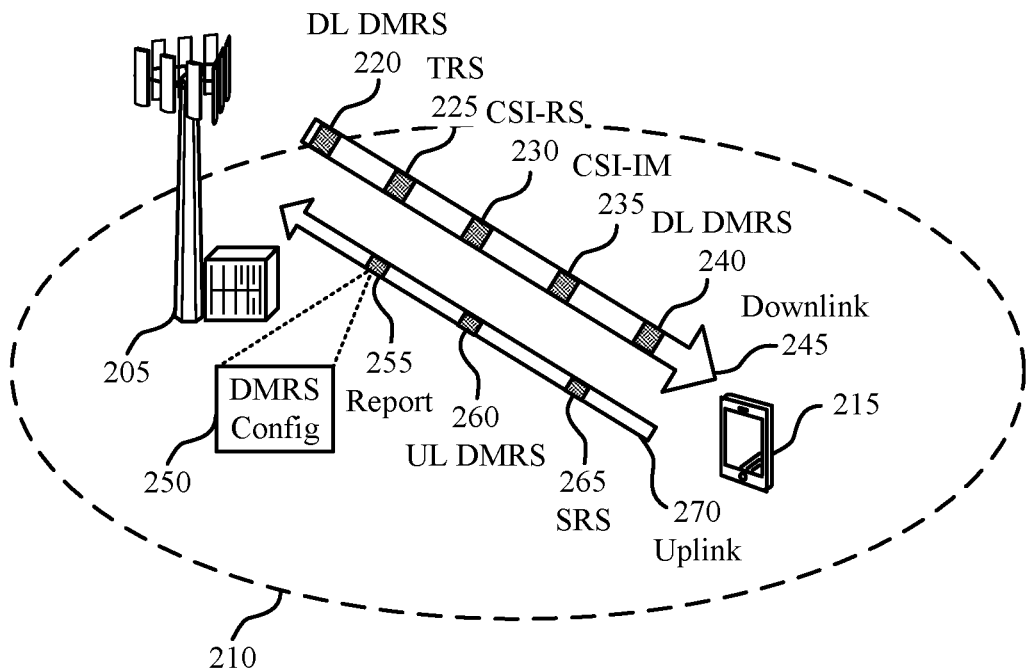
FIG. 2 illustrates an example of a wireless communications system that supports DMRS configuration selection and reporting per TB and per CDM group in accordance with aspects of the present disclosure.

FIG. 2 illustrates an example of a wireless communications system 200 that supports DMRS configuration selection and reporting per TB and per CDM group in accordance with aspects of the present disclosure. In some examples, the wireless communications system 200 may implement aspects of wireless communications system 100. Wireless communications system 200 may include base station 205 and UE 215 which may be examples of a base station or UE described with reference to FIG. 1. Base station 205 and UE 215 may communicate with one another over downlink 245 and uplink 270 within coverage area 210, as described with reference to FIG. 1.

A DMRS configuration used by a UE 215 may be determined based on RRC signaling. In some examples, the UE 215 may be RRC configured with a fixed pilot pattern for a DMRS that is based on a DMRS type and a number of DMRS positions. A DMRS spacing in time may be based on predetermined DMRS locations for a combination of a PDSCH mapping type and a PDSCH symbol duration (which may be signaled in downlink control information (DCI)). A power boosting for a DMRS may be determined based on a DMRS type and based on the number of DMRS CDM groups without multiplexing with data resource elements on DMRS symbols. An accuracy of a channel estimate depends on a level of correlation of a channel in time and frequency, input SNR on DMRS resource elements and DMRS configuration/pattern. Channel parameters and SNR conditions may be different for different UEs and may also vary in time. Thus, different DMRS configurations may be used to maximize a spectral efficiency of a link for different channel and SNR conditions. But communication parameters that are established using RRC procedures may become sub-optimal or inconvenient after some changes in channel and reception conditions. For instance, RRC re-configuration procedures may be unable to adopt DMRS configuration "on the fly." That is, establishing a DMRS configuration using RRC procedures, may cause an excessive number of pilots to be used or an insufficient number of pilots to be used for different reception scenarios and different time periods.

To increase a spectral efficiency of a communications link, preferred DMRS configurations may be identified by a UE 215 and reported to the network. Further, the UE 215 may identify a DMRS configuration for each of one or more groups of layers associated with a transmission from a base station 205. For example, each group of layers, which may correspond to a group of DMRS ports related to the same CDM group or a specific TB associated with the CDM group, may be associated with different post-processing SINRs. In some cases, different post-processing SINRs may result in variable and, in some SINR regions, sub-optimal performance (e.g., sub-optimal spectral efficiency) when a single DMRS configuration is used. For example, a first DMRS configuration may be associated with a relatively higher spectral efficiency for a first SINR region and a relatively lower spectral efficiency for a second SINR region, where an SINR region may refer to some range of SINR values. On the contrary, a second DMRS configuration may be associated with a relatively lower spectral efficiency for the first SINR region and a relatively higher spectral efficiency for the second region. As such, the UE 215 may select a DMRS configuration for each of the groups of layers to achieve an optimal spectral efficiency for each of the one or more groups of layers based on the post-processing SINR associated with each layer of each group of layers. For instance, the UE 215 may determine an effective spectral efficiency as a joint parameter for a group of layers based on the post-processing SINR associated with each layer of the group of layers and may determine a DMRS configuration for the group of layers based on the effective spectral efficiency. For example, the UE 215 may select the first DMRS configuration for a first group of layers (e.g., a first TB or a first CDM group) having an SINR in the first SINR region and may select the second DMRS configuration for a second group of layers (e.g., a second TB or a second CDM group) having an SINR in the second SINR region. The base station 205 may use the reported DMRS configurations to select DMRS configurations (e.g., one DMRS configuration for each group of layers) for the UE 215.

An offline numerical training procedure may be performed to generate, for UE 215, one or more mappings that indicate previously determined differences (e.g., average differences) in values measured for a link quality characteristic (e.g., spectral efficiency or post-processing SINR) determined using CSI-RS transmissions and in values measured for the link quality characteristic determined using DL DMRS transmissions having different configurations. The one or more mappings may include mappings corresponding to respective channel conditions, which may include delay spread ($\tau_{rms}$), Doppler frequency ($f_{D\_max}$), and noise variance ($\tilde{\sigma}_{IM}^2$). That is, a first mapping may be associated with a first set of quantized values for $\tau_{rms}$, $f_{D\_max}$, and $\tilde{\sigma}_{IM}^2$ (e.g., $\tau_{rms}$=1, $\tilde{\sigma}_{IM}^2$=1, and $f_{D\_max}$=1), a second mapping may be associated with a second set of quantized values for $\tau_{rms}$, $f_{D\_max}$, and $\tilde{\sigma}_{IM}^2$ (e.g., $\tau_{rms}$=1, $\tilde{\sigma}_{IM}^2$=1, and $f_{D\_max}$=2), and so on.

The one or more mappings may similarly include sets of mappings for different CSI-RS configurations. That is, a first set of mappings for a first CSI-RS configuration (CSI-RS_1) may include a first mapping that is associated with a first set of values for $\tau_{rms}$, $f_{D\_max}$ and $\tilde{\sigma}_{IM}^2$ (e.g., $\tau_{rms}$=1, $\tilde{\sigma}_{IM}^2$=1, and $f_{D\_max}$=1), a second mapping that is associated with a second set of values for $\tau_{rms}$, $f_{D\_max}$, and $\tilde{\sigma}_{IM}^2$ (e.g., $\tau_{rms}$=1, $\tilde{\sigma}_{IM}^2$=1, and $f_{D\_max}$=2), and so on. And a second set of mappings for a second CSI-RS configuration (CSI-RS_2) may include a first mapping that is associated with the first set of values for $\tau_{rms}$, $f_{D\_max}$, and $\tilde{\sigma}_{IM}^2$, a second mapping that is associated with the second set of values for $\tau_{rms}$, $f_{D\_max}$, and $\tilde{\sigma}_{IM}^2$, etc.

Although described with reference to the UE 215, a similar offline numerical training procedure may be implemented by the base station 205 (e.g., using uplink reference signals such as DMRS or SRS) to generate one or more mappings that indicate previously numerically determined differences in values measured for a link quality characteristic (e.g., spectral efficiency or post-processing SINR) determined using UL DMRS or SRS transmissions and in values measured for the link quality characteristic determined using UL DMRS transmissions having other waveform and different configurations. One or more numerically trained mappings that indicate previously determined differences in values measured for the link quality characteristic determined using UL DMRS or SRS of a first configuration and in values measured for the link quality characteristic determined using UL DMRS transmissions having other configurations may also be generated by base station 205.

The base station 205 may configure an initial DL DMRS configuration for the UE 215 during an RRC signaling exchange. The base station 205 may then transmit, using downlink 245, first DL DMRS 240 to UE 215 in accordance with the initial DL DMRS configuration. The UE 215 may use first DL DMRS 240 to decode data and/or to determine an SINR for the channel ($\gamma_{DMRS}$) (e.g., based on Equation 1). The initial DL DMRS configuration may be associated with a first combination of a temporal spacing $D_t$ between resource elements allocated to first DL DMRS 240; a frequency spacing $D_f$ between resource elements allocated to first DL DMRS 240; and a power level corresponding to $\rho_p$ used to transmit first DL DMRS 240 resource elements relative to a power level used to transmit data resource elements. Different DL DMRS configurations may be represented using different combinations of triplet ($D_t$, $D_f$, $\rho_p$) (e.g., a first DL DMRS configuration may be represented by the triplet (0,0,0), a second DL DMRS configuration may be referenced by the triplet (0,0,1), and so on).

The base station 205 may also transmit CSI-RS 230 to UE 215 in accordance with a configured CSI-RS configuration. Base station 205 may be prohibited from transmitting any signaling over CSI-IM resource 235.

The UE 215 may receive CSI-RS 230 and monitor CSI-IM resource 235. The UE 215 may use CSI-RS 230 to estimate the channel response and CSI-IM resource 235 to estimate a reception noise (which may be used to calculate a noise covariance matrix ($R_{nn}$). Thus, the UE 215 may use CSI-IM resource 235 to determine a level of noise and interference on the channel (e.g., caused by transmissions using neighboring cells and thermal effects). The UE 215 may also use the noise component to determine a noise variance $\tilde{\sigma}_{IM}^2$ for the channel.

After determining an effective channel matrix (e.g., $\hat{H}_{eff}$), the UE 215 may use the effective channel matrix to determine a post-processing SINR for the channel based on CSI-RS 230 and CSI-IM resource 235 ($\gamma_{CSI-RS}$) (e.g., based on Equation 2). The UE 215 may also use the post-processing SINR obtained for the involved layers to determine a precoding matrix and rank that increase a performance of communications over the channel. Additionally, the UE 215 may use the effective channel matrix to determine a delay spread $\tau_{rms}$ for the channel. In some implementations of the present disclosure, the UE 215 may estimate or otherwise determine a different channel delay spread characteristic for each group of layers (e.g., one or more layers) and may use the estimated channel delay spread characteristic as an input for post-processing SINR mapping. For example, the UE 215 may perform some grouping before post-processing SINR mapping such that the UE 215 may estimate a joint channel delay spread characteristic for a group of layers using the estimated effective channel corresponding to the group of layers based on CSI-RS 230 and CSI-IM 235 and the selected pre-coding and rank hypothesis. In some cases, based on estimating a channel delay spread characteristic for a group of layers, the UE 215 may achieve a more precise estimation for each group than if the UE 215 estimated the channel delay spread characteristic for each layer independently or jointly for all CDM groups. In some examples, the UE 215 may estimate different channel delay spread characteristics for each group of layers based on using the columns of the effective channel matrix $\hat{H}_{eff}$.

The base station 205 may also transmit TRS 225 to the UE 215. The UE 215 may use TRS 225 to determine a Doppler frequency $f_{D\_max}$ (e.g., a maximum Doppler frequency) for the channel. The UE 215 may also use TRS 225 to determine a delay spread $\tau_{rms}'$ for the channel. In some examples, the UE 215 may map values determined for delay spread, Doppler frequency, and noise variance to sets of quantized values (e.g., to reduce processing complexity).

The UE 215 may use any combination of CSI-RS 230, CSI-IM resource 235, and TRS 225 to determine a DL DMRS configuration for a group of layers that increases a spectral efficiency of communications over the channel relative to the other DL DMRS configurations for the group of layers. To determine the DL DMRS configuration for each group of layers, the UE 215 may use a post-processing SINR value determined from the CSI-RS 230 and CSI-IM resource 235; a delay spread value for each group of layers or for all of the layers together determined from CSI-RS 230 and/or TRS 225; a Doppler frequency value determined from TRS 225; a noise variance value determined from CSI-IM resource 235 or an input SINR; and a mapping generated based on the training procedure. That is, after determining an SINR value for $\gamma_{CSI-RS}$, the UE 215 may identify the values determined for $\tau_{rms}$, $f_{D\_max}$, and $\tilde{\sigma}_{IM}^2$ and a mapping based on the identified values for $\tau_{rms}$, $f_{D\_max}$, and $\tilde{\sigma}_{IM}^2$ and a configuration used for CSI-RS 230 (e.g., for a first CSI-RS configuration, which may be represented as CSI-RS_1). The mapping may include, for each available DL DMRS configuration, an adjustment from the SINR value calculated using a CSI-RS of a CSI-RS configuration ($\gamma_{CSI-RS}$) to an estimated equivalent post-processing SINR value for a respective DL DMRS configuration (i.e., a value for $\gamma_{DMRS\_x}$, where there are N available DL DMRS configurations and x≤N).

An example mapping is provided by Table 1.

TABLE 1

| CSI-RS_1; $\tau_{rms} = 1$, $f_{D\_max} = 1$; $\tilde{\sigma}_{IM}^2 = 1$ | | |
|---|---|---|
| DL DMRS Configuration ($D_t$, $D_f$, $\rho_p$) | | $\gamma_{DMRS\_x}$ |
| DMRS_1 | (0, 0, 0) | $f_1(\gamma_{CSI-RS\_1})$ |
| DMRS_2 | (0, 0, 1) | $f_2(\gamma_{CSI-RS\_1})$ |
| DMRS_3 | (0, 1, 1) | $f_3(\gamma_{CSI-RS\_1})$ |
| ... | ... | ... |
| DMRS_N | (x, y, z) | $f_n(\gamma_{CSI-RS\_1})$ |

Other mappings may be generated for different combinations of $\tau_{rms}$, $f_{D\_max}$, $\tilde{\sigma}_{IM}^2$, and CSI-RS configurations. For example, while the mapping may be associated with the combination (CSI-RS_1, $\tau_{rms}$, $\tilde{\sigma}_{IM}^2$, and $f_{D\_max}$) depicted in Table 1, another mapping may be associated with a different combination of (CSI-RS_1, $\tau_{rms}'$, $\tilde{\sigma}_m$, and $f_{D\_max}$), and so on.

A more general mapping is provided by Table 2.

TABLE 2

| CSI-RS_w; $\tau_{rms} = x$, $f_{D\_max} = y$; $\tilde{\sigma}_{IM}^2 = z$ | | |
|---|---|---|
| DL DMRS Configuration ($D_t$, $D_f$, $\rho_p$) | | $\gamma_{DMRS\_x}$ |
| DMRS_1 | (0, 0, 0) | $f_1(\gamma_{CSI-RS\_w})$ |
| DMRS_2 | (0, 0, 1) | $f_2(\gamma_{CSI-RS\_w})$ |
| DMRS_3 | (0, 1, 1) | $f_3(\gamma_{CSI-RS\_w})$ |
| ... | ... | ... |
| DMRS_N | (m, n, o) | $f_n(\gamma_{CSI-RS\_w})$ |

The UE 215 may use the mapping to derive, from a calculated $\gamma_{CSI-RS}$, SINR values for each of the available DL DMRS configurations ($\gamma_{DMRS\_x}$). That is, $\gamma_{DMRS\_x}$ may equal f ($\gamma_{CSI-RS}$), where 1>x≥N.

Figure 4:
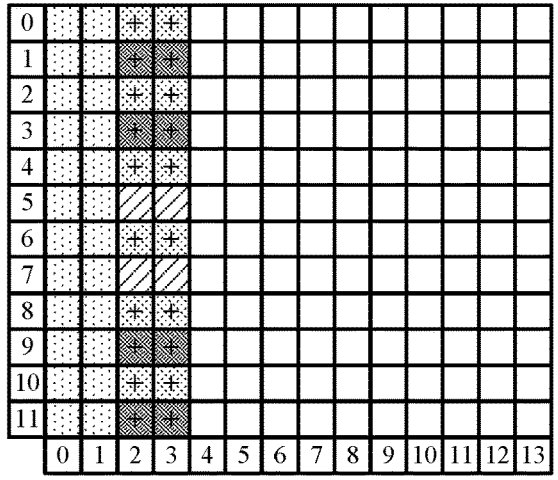
FIG. 4 illustrates example DMRS configurations that support DMRS configuration selection and reporting per TB and per CDM group in accordance with aspects of the present disclosure.
Figure 4:
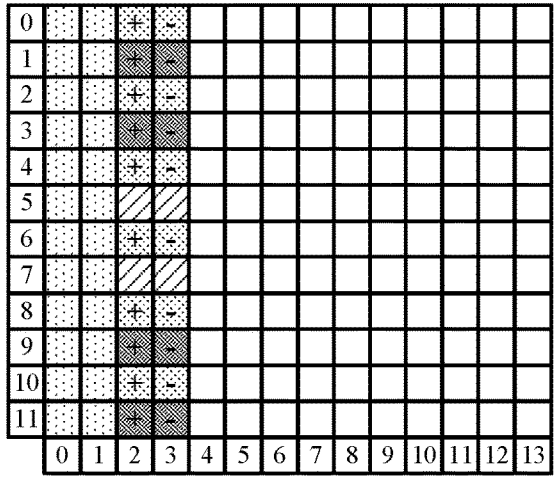
Figure 4:
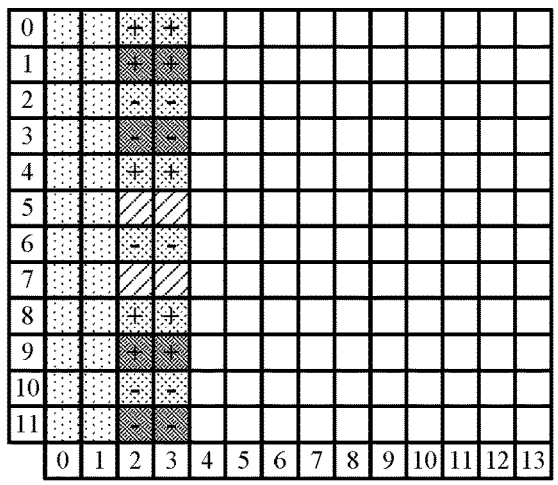
Figure 4:
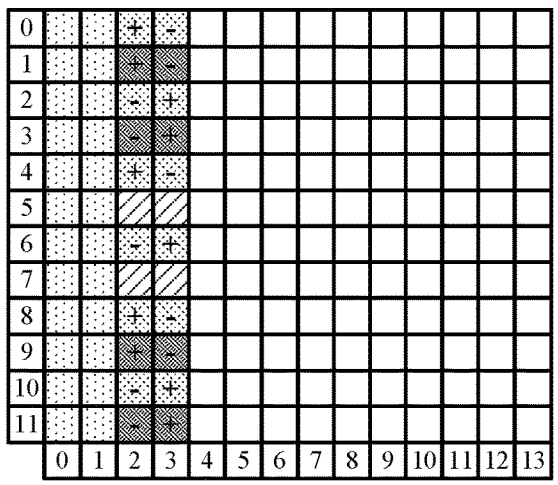
Figure 5:
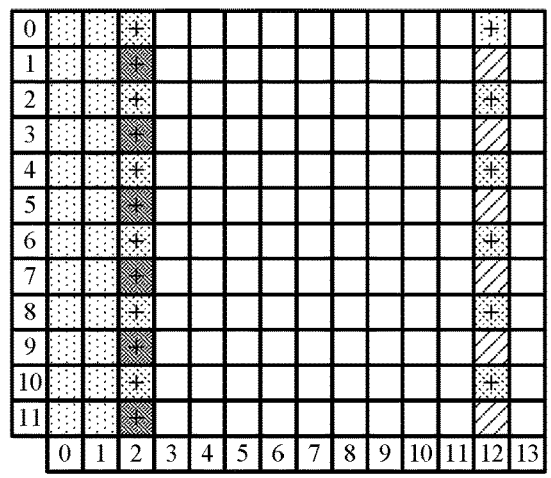
FIG. 5 illustrates example DMRS configurations that support DMRS configuration selection and reporting per TB and per CDM group in accordance with aspects of the present disclosure.
Figure 5:
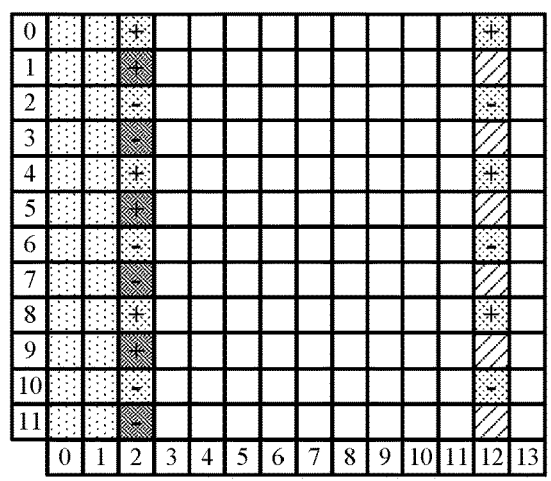

After determining SINR values for each of the available DL DMRS configurations for each layer of the group of layers, the UE 215 may determine a grouping for the layers such that a group of layers includes a minimal difference in SINR values, as described in more detail herein, including with reference to FIGS. 4 and 5. Upon determining the groups of layers, the UE 215 may determine a DL DMRS configuration of the DL DMRS configurations that maximizes a communication efficiency metric for each group of layers. For example, the UE 215 may determine the DL DMRS configuration that maximizes spectral efficiency for each group of layers (e.g., for each TB or CDM group) of the channel based on Equation 3:

$$\underset{i=1:N}{\mathrm{argmax}} \left( N_{RE\_data}(DMRS\_i) \cdot \sum_{l \in TB/CDM} C_{QAM}(\gamma_l(DMRS\_i)) \right)$$

where $C_{QAM}$ may be the constrained capacity function for a maximal allowed modulation scheme (e.g., for a quadrature amplitude modulation (QAM) order) that gives the estimated spectral efficiency per resource element; $N_{RE\_data}$ may be the number of data resource elements per resource allocation; DMRS_i may be the DL DMRS configuration defined by a combination of ($D_t$, $D_f$, ($\rho_p$)); and $\overline{\gamma}_l(\gamma_{DMRS\_i})$ may be the average post-processing SINR per layer l for a corresponding DL DMRS configuration DMRS_i. $N_{RE\_data}$ may be a function of $D_t$ and $D_f$ of the corresponding DL DMRS configuration DMRS_i.

A result of Equation 3 may output an argument k that results in a largest value for the equation inside of the outermost (largest) set of parentheses shown in Equation 3. The argument k that corresponds to the largest value may also correspond to the kth DL DMRS configuration DMRS_k. In some implementations, the UE 215 may repeat Equation 3 a number of times (e.g., a number of times equal to the number of TBs or involved CDM groups in the channel) to determine a DMRS configuration for each group of layers of the channel. In some cases, two DL DMRS configurations that have the same SINR value may result in different outcomes for the equation inside of the outermost set of parentheses shown in Equation 3 (e.g., the one of the two DL DMRS configurations that uses additional resource elements may result in a smaller value). For similar reasons, a DL DMRS configuration that has a larger SINR may result in a smaller value than a DL DMRS configuration that has a smaller SINR. Similar equations may be used to determine which of the DL DMRS configurations will maximize other communication metrics for a channel. In some cases, the identified DL DMRS configuration may be different than the initial DL DMRS configuration configured by the base station 205.

The UE 215 may be configured to generate a CSF report based on the received and monitored CSI-RS resources. Thus, the UE 215 may determine a value for a PMI, RI, CQI, and a DMRS configuration indicator (DMI). For the PMI and RI, UE 215 may select values that maximize the estimated average spectral efficiency. For the DMI, UE 215 may select a value corresponding to the DL DMRS configuration that maximizes a communication metric (e.g., effective spectral efficiency) for each group of layers of the channel (e.g., based on Equation 3). In some examples, the UE 215 may select a number of values corresponding to a number of DL DMRS configurations, where each DMRS configuration of the number of DMRS configurations corresponds to a group of layers of the channel. For the CQI, UE 215 may select a value based on a delay spread, a Doppler frequency, an average spectral efficiency associated with the selected PMI and RI, and a selected DL DMRS configuration (a selected DL DMRS configuration for each group of layers). In some examples, the CSF report may include a PMI field, an RI field, a CQI field, and a DMI field that is configured to convey multiple DMIs. In other examples, the CSF report may not include a DMI field explicitly. In such cases, the UE 215 may jointly encode values determined for the CQI and DMI and use a joint CQI+DMI field to convey the jointly encoded information.

After generating the CSF report, the UE 215 may transmit, using uplink 270, the CSF report to the base station 205 in report 255. Report 255 may include DMRS configuration indication 250 based on the DL DMRS configurations selected by the UE 215 (e.g., the DL DMRS configuration for each group of layers related to a TB or a CDM group of the channel). The base station 205 may use report 255 to adapt transmission parameters for subsequent communications to the UE 215. In some examples, the base station 205 may transmit second DL DMRS 220 to the UE 215 in accordance with the DL DMRS configuration indicated by DMRS configuration indication 250. In some other examples, the base station 205 may identify a group of DL DMRS configurations based on DMRS configuration indication 250 and may transmit second DL DMRS 220 in accordance with one or more of the DL DMRS configurations included in the group of DL DMRS configurations. In some cases, the group of DL DMRS configurations may include the DL DMRS configurations indicated by DMRS configuration indication 250. For example, the group of DL DMRS configurations may include a DL DMRS configuration for each TB or each CDM group.

In some examples, an initial UL DMRS configuration may be configured for the UE 215 during an RRC signaling exchange. The initial UL DMRS configuration may be associated with a first combination of a temporal spacing between resource elements allocated to an UL DMRS; a frequency spacing between resource elements allocated to an UL DMRS; and a power level used to transmit an UL DMRS resource element relative to a power level used to transmit data resource element—which may be represented as $(D_t'', D_f'', \rho_p'')$. Thus, the UE 215 may transmit UL DMRSs to the base station 205 in accordance with the initial UL DMRS configuration. The base station 205 may be configured to determine a preferred UL DMRS configuration, as similarly described with reference to the operations that support a determination of preferred DL DMRS configurations by the UE 215. That is, the base station 205 may identify an UL DMRS configuration that maximizes a communication metric for each group of layers of the channel based on a delay spread $\tau_{rms}$, a Doppler frequency $f_{D\_max}$, representative for the uplink 270 and an estimated post-processing signal quality ratio $\gamma_{RS}$ of a reference signal transmitted by UE 215.

In such cases, the base station 205 may generate, for different combinations of channel conditions (e.g., for different combinations of $\tau_{rms}$ and $f_{D\_max}$ and input SNR), a mapping between values determined for a link quality characteristic (e.g., post-processing SINR) estimated using a received reference signal and the corresponding equivalent values for the link quality characteristic corresponding to usage of UL DMRS 260 transmissions having different UL DMRS configurations (e.g., during an offline training procedures). In some cases, the base station 205 may generate the mapping between the applicable UL DMRS configurations. That is, the base station 205 may determine, for each UL DMRS configuration, a difference in values calculated for a link quality characteristic using a first UL DMRS configuration ($\gamma_{UL\_DMRS}$) and a remaining set of UL DMRS configurations ($\gamma_{UL\_DMRS\_x}$). Additionally, or alternatively, the base station 205 may generate the mapping between an SRS and the available UL DMRS configurations. In such cases, the base station 205 may determine, for each SRS configuration, a difference in values calculated for a link quality characteristic using an SRS configuration ($\gamma_{SRS}$) and corresponding equivalent values for the link quality characteristic while using available UL DMRS configurations ($\gamma_{UL\_DMRS\_x}$). In either case, the base station 205 may generate separate mappings for different reference signal configuration and for different combinations of $\tau_{rms}$, $f_{D\_max}$, and input SNR. Input SNR may be equivalent to a thermal noise variance component.

An example mapping for an UL DMRS may be provided by Table 3:

TABLE 3

| UL_DMRS_1(0, 0, 0); $\tau_{rms}$ = 1, $f_{D\_max}$ = 1; SNR = 1 | |
|---|---|
| UL DMRS Configuration ($D_t$, $D_f$, $\rho_p$) | $\gamma_{UL\_DMRS\_x}$ |
| UL_DMRS_2 | (0, 0, 1) | $f_2(\gamma_{UL\_DMRS\_1})$ |
| UL_DMRS_3 | (0, 1, 1) | $f_3(\gamma_{UL\_DMRS\_1})$ |
| ... | ... | ... |
| UL_DMRS_N | (x, y, z) | $f_n(\gamma_{UL\_DMRS\_1})$ |

An example mapping for an SRS may be provided by Table 4:

TABLE 4

| SRS_1; $\tau_{rms}$ = 1, $f_{D\_max}$ = 1; SNR = 1 | |
|---|---|
| UL DMRS Configuration ($D_t$, $D_f$, $\rho_p$) | $\gamma_{UL\_DMRS\_x}$ |
| UL_DMRS_1 | (0, 0, 0) | $f_1(\gamma_{SRS\_1})$ |
| UL_DMRS_2 | (0, 0, 1) | $f_2(\gamma_{SRS\_1})$ |
| UL_DMRS_3 | (0, 1, 1) | $f_3(\gamma_{SRS\_1})$ |
| ... | ... | ... |
| UL_DMRS_N | (x, y, z) | $f_n(\gamma_{SRS\_1})$ |

The base station 205 may use the mapping and an SINR value calculated for a received reference signal ($\gamma_{RS}$) to estimate SINR values for each of the available UL DMRS configurations ($\gamma_{UL\_DMRS\_x}$). The base station 205 may then use the calculated SINR values to determine an UL DMRS configuration that provides a maximum or a greatest value for an effective spectral efficiency metric. In some implementations, the base station 205 may determine an UL DMRS configuration for each group of layers (e.g., each CDM group or TB of the channel). For example, the base station 205 may determine the UL DMRS configuration that maximizes effective spectral efficiency for the channel based on Equation 4:

$$\underset{i=1:N}{\operatorname{argmax}} \left( N_{RE\_data}(UL\_DMRS\_i) \cdot \sum_{l=TB/CDM} C_{QAM}(\overline{\gamma}_l(UL\_DMRS\_i)) \right)$$

where $C_{QAM}$ may be the constrained capacity function for a maximum relevant modulation scheme (e.g., for a QAM order) that gives the estimated average spectral efficiency per resource element; $N_{RE\_data}$ may be the number of data resource elements per resource allocation (or per resource block); UL_DMRS_i may be the UL DMRS configuration defined by a combination of ($D_t$, $D_f$, $\rho_p$); and $\overline{\gamma}_l$(UL_DMRS_i) may be the average post-processing SINR for a corresponding UL DMRS configuration UL_DMRS_i. $N_{RE\_data}$ may be a function of $D_t$ and $D_f$ of the corresponding UL DMRS configuration UL_DMRS_i.

The base station 205 may configure the UE 215 to use the determined UL DMRS configuration (e.g., the UL DMRS configuration for each group of layers of the channel), and the UE 215 may transmit a subsequent UL DMRS (e.g., UL DMRS 260) to the base station 205 based on the indicated UL DMRS configuration. For example, the UE 215 may transmit UL DMRS 260 in accordance with the indicated UL DMRS configuration or in accordance with an UL DMRS configuration that is a part of a group that includes the indicated UL DMRS configuration. In some aspects, the group that includes the indicated UL DMRS configuration may refer to a group of close equivalents (e.g., similar DMRS configurations) to the indicated UL DMRS configuration that the UE 215 may select from based on indicated UL DMRS configuration.

Thus, the base station 205 may use Equation 4 (or a similar equation) to determine a convenient UL DMRS configuration for the UE 215. As discussed, the estimated equivalent post-processing SINR values input into Equation 4 may be a function of (e.g., based on) the delay spread $\tau_{rms}$, Doppler frequency $f_{D\_max}$, input SNR of the uplink channel, and the estimated post-processing SINR based on a specific SRS or UL DMRS allocation/configuration. For example, the base station 205 may use uplink delay spread $\tau_{rms}$, uplink Doppler frequency $f_{D\_max}$, and uplink input/reception SNR measured in SRS or the used DMRS configuration as bases for estimating the SINR values for the available UL DMRS configurations ($\gamma_{UL\_DMRS\_x}$). So, the ability of the base station 205 to select an appropriate UL DMRS configuration for the UE 215 may be dependent on, or improve with, the ability of the base station 205 to reliably determine/estimate the delay spread, Doppler frequency, and input SNR of the uplink channel.

To determine the delay spread, the base station 205 may measure an SRS 265 used for a link adaption procedure for the uplink channel. The base station 205 may also measure an SRS 265 to determine the reception SNR for the uplink channel. To determine the Doppler frequency for the uplink channel, the base station 205 may, in some cases, measure an SRS 265 or a DMRS (e.g., UL DMRS 260) with convenient configuration (e.g., repetition of two transmissions from the same antenna port, the same beam or quasi-collocated beams on two symbols with appropriate spacing in time). However, as described herein, the SRS 265 and DMRS may be unsuitably configured for Doppler frequency estimation. For example, the spacing between repetitions of the SRS 265 may be limited and may only be appropriate for Doppler frequency estimation in some scenarios (e.g., certain pairing of carrier frequency, subcarrier spacing, and a limited Doppler range). And the spacing between repetitions of the DMRS may be inconsistent (e.g., due to PUSCH scheduling variability) and fail to support reliable Doppler frequency estimation.

So, in some examples, the base station 205 may improve Doppler frequency estimation by configuring the UE 215 to use an SRS configuration that has an appropriate repetition spacing tailored to the deployment scenario (e.g., carrier frequency, sub carrier spacing). Once the SRS repetition spacing is consistent and tailored to the communications parameters, base station 205 may use the SRS 265 to reliably estimate the Doppler frequency for the uplink channel. Once determined, the uplink Doppler frequency may be used by the base station 205, along with other factors, to select an appropriate UL DMRS configuration for the UE 215 that allows an increase in the spectral efficiency of the link.

Figure 3:
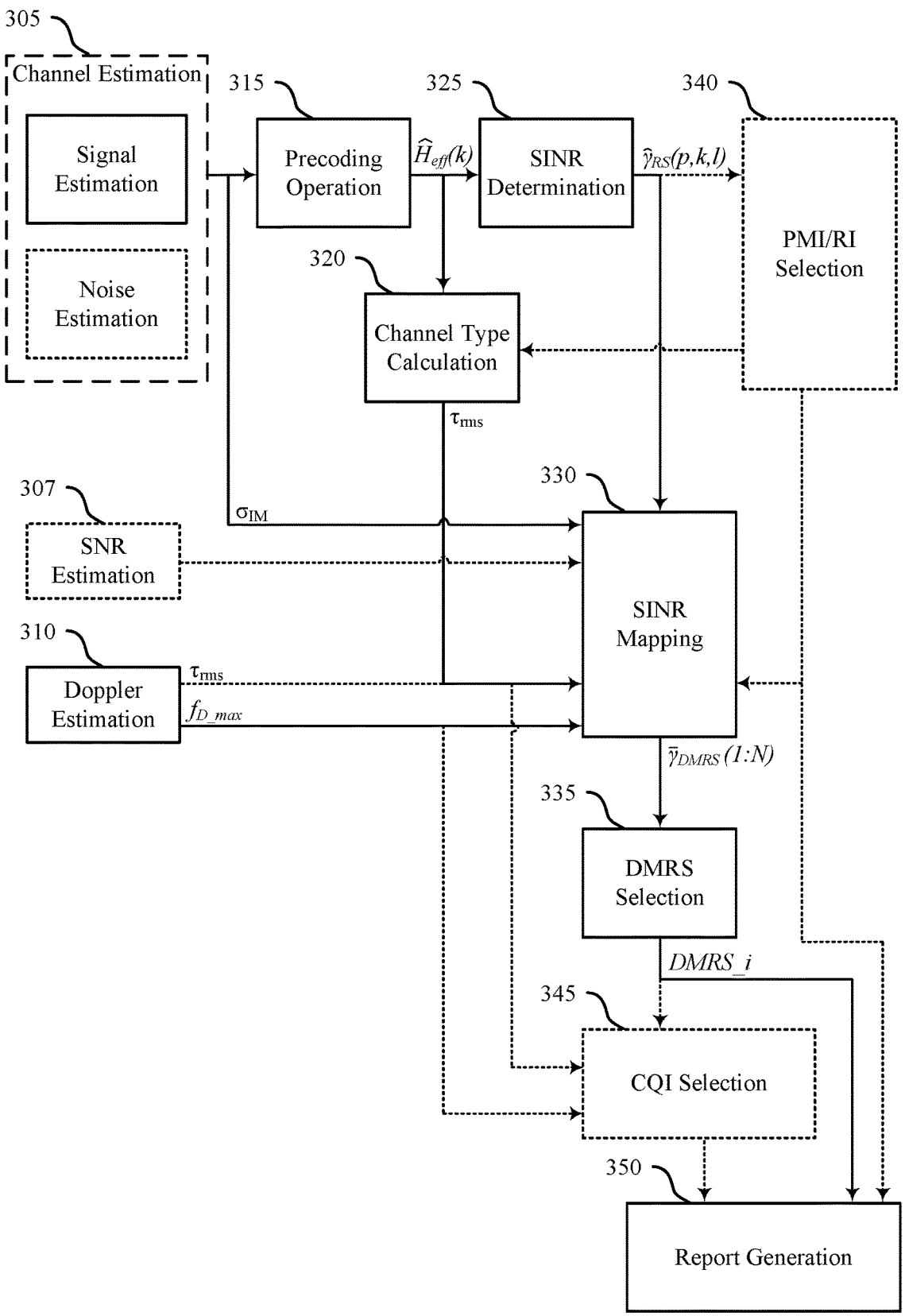
FIG. 3 illustrates a collection of operations that support DMRS configuration selection and reporting per TB and per CDM group in accordance with aspects of the present disclosure.

FIG. 3 illustrates an example of a collection of operations that supports DMRS configuration selection and reporting per TB and per CDM group in accordance with aspects of the present disclosure. Process flow 300 may be performed by a base station or a UE, such as base station 205 or UE 215 of FIG. 2. In some examples, the process flow 300 may implement aspects of wireless communications system 100 and wireless communications system 200.

Process flow 300 illustrates an exemplary collection of operations performed to support the selection of a DMRS configuration for each group of layers (e.g., each CDM group, each TB, or each group of DMRS ports) of a channel. For example, process flow 300 depicts internal signaling that may be exchanged and internal processing that may be performed to support selecting a DMRS configuration for each group of layers of a channel. Process flow 300 may be related to a process for using reference signals to determine channel characteristics that may be in turn be used to determine preferred transmission parameters, such as a preferred DMRS configuration, precoding matrix, rank, and MCS.

One or more of the operations described in process flow 300 may be performed earlier or later in the process, omitted, replaced, supplemented, or any combination thereof. Also, additional operations described herein that are not included in process flow 300 may be included.

At block 305, a wireless device (e.g., a base station or a UE) may obtain an estimate of a channel between a transmitting device and the wireless device. Estimating the channel may include an estimation of the channel based on a reference signal (e.g., based on CSI-RS, UL DMRS, and/or SRS). Estimating the channel may also include an estimation of a noise component of channel based on an interference management resource (e.g., based on a CSI-IM resource). For example, if the wireless device is a UE, the UE may use a CSI-IM resource to measure the noise or the interference that may influence transmissions over the channel. When the noise estimation is obtained free of channel estimation error, the wireless device may use Equation 2 to estimate post-processing SINR. When noise estimation cannot be obtained free of channel estimation error, the wireless device may use Equation 1 to estimate post-processing SINR. The channel estimate may be represented using a channel matrix.

At block 307, the wireless device may estimate an input SNR for the channel (e.g., if the wireless device is a base station). The wireless device may estimate the input SNR to assist in post-processing SINR mapping as an alternative to using thermal noise and interference variance estimated in block 305 (e.g., if the wireless device is a base station).

At block 310, the wireless device may obtain an estimate of a Doppler frequency of the channel. The wireless device may estimate the Doppler frequency based on a received reference signal. For example, if the wireless device is a UE, the wireless device may estimate the Doppler frequency for the downlink channel based on a DMRS or a TRS. If the wireless device is a base station, the wireless device may estimate the Doppler frequency for the uplink channel based on a specially configured SRS. Or the base station may determine the Doppler frequency for the uplink channel based on the Doppler frequency for the downlink channel. In some cases, the wireless device may also determine a delay spread based on the received reference signal (e.g., the DMRS, TRS, or SRS).

At block 315, the wireless device may generate one or more channel matrices based on different combinations of the tested precoding matrices and rank hypothesis. The wireless device may generate one or more effective channel matrices based on applying the different combinations of precoding matrices and rank hypothesis to the channel estimate determined during the channel estimation operation.

At block 320, the wireless device may classify the channel based on one or more of the effective channel estimates obtained after applying the tested precoding operation (e.g., the channel may be classified as an urban or rural channel). The wireless device may also determine a delay spread for the channel based on the effective channel estimates. In some examples, the delay spread is determined for an effective channel estimate that corresponds to a precoding matrix and rank that have been selected for the channel to optimize link efficiency.

At block 325, the wireless device may determine one or more post-processing signal quality ratios (e.g., post-processing SNR or post-processing SINR) based on the effective channel matrices obtained after applying a precoding operation. In some cases, the precoding operation may be omitted (e.g., if a received reference signal is already precoded). In some cases, the wireless device may determine, for each stream l, each resource element k, and each precoding matrix p, a signal quality ratio $\hat{\gamma}_{RS}(p, k, l)$. The one or more signal quality ratios may be determined based on Equation 1 (e.g., if the wireless device does not obtain a noise estimate that is free of a channel estimation error component). Additionally, or alternatively, the one or more signal quality ratios may be determined based on Equation 2 (e.g., if the wireless device is a UE and based on CSI-RS and CSI-IM resources).

At block 330, the wireless device may execute a mapping from an SINR computed for a received reference signal (e.g., a CSI-RS, UL DMRS, or SRS) to multiple SINRs estimated for a set of DMRS configurations. In some examples, the wireless device may execute the mapping from an SINR computed for the received reference signal to multiple SINRs estimated for a set of DMRS configurations for each layer of the channel. The estimated SINRs may be represented as $\bar{\gamma}_{DMRS}(1:N)$. As described herein, including with reference to FIG. 2, the wireless device may identify a mapping based on an indication of a first set of characteristics for the channel (e.g., a combination of a delay spread $\tau_{rms}$, Doppler frequency $f_{D\_max}$, and/or noise variance $\tilde{\sigma}_{IM}^2$ if the wireless device is a UE, or a combination of a delay spread $\tau_{rms}$, Doppler frequency $f_{D\_max}$, and/or reception SNR if the wireless device is a base station) and a configuration of the received reference signal having a combination of a temporal spacing, frequency spacing, and power boosting. The Doppler frequency may be determined based on the Doppler estimation. And the noise variance may be determined based on the noise estimation.

Before executing the mapping, the SINRs computed for the received reference signal ($\hat{\gamma}_{RS}(p, k, l)$) may be averaged across the set of resource elements k for each stream l and precoding matrix p. In some examples, the SINRs computer for the received reference signal may be averaged across all resource elements k of a wideband or across a subset of resource elements k of each subband (e.g., the wireless device may average the computed SINRs per subband). To compute the SINR for the received reference signal, the wireless device may average a set of SINRs computed for different resource elements, on a per stream basis and in accordance with a selected precoding matrix and rank. In some cases, an indication of the precoding matrix and rank is provided to the SINR mapping operation based on a prior or concurrent determination of the precoding matrix and rank. The SINR mapping operation may use the indicated precoding matrix and rank to determine which version of SINR estimates determined at block 325 to use for the SINR mapping.

At block 335, the wireless device may select a DMRS configuration for each group of layers (e.g., each TB or each CDM group) associated with the channel. The wireless device may select a DMRS configuration (e.g., one for each group of layers) from the set of DMRS configurations that maximizes a communication metric for the channel, such as effective spectral efficiency (e.g., based on Equation 3 or 4). That is, for a group of layers, which may correspond to a TB or a CDM group, the wireless device may select the DMRS configuration, such as DMRS_i, that yields a larger value for the communication metric than the other DMRS configuration for that group of layers.

Alternatively, the wireless device may determine a CQI or an MCS for each TB based on the selected DMRS configuration associated with each TB. For example, in the case of multiple TBs which are relevant to relatively high SNR and low mobility conditions, DMRS configuration adaptation is likely to be relevant for DMRS density in the frequency domain which may enable the wireless device to determine an appropriate (e.g., a more optimal) DMRS configuration for each TB based on the spectral efficiency estimated for each TB and with consideration that different TBs may have different reported CQI associated correspondingly with different spectral efficiency estimated per TB.

In some examples, the wireless device may determine a DMRS configuration for each TB based on the MCS associated with each TB and a mapping. Such determination of a DMRS configuration for each TB based on the MCS associated with each TB may be an example of implicit DMRS configuration signaling. The mapping may include a table, an algorithm, or any other means for mapping one set of values to another set of values. For instance, the wireless device may use the mapping to identify a correspondence between a set of MCS values (or MCS differences on two TBs) and a set of DMRS configurations or DMRS densities (e.g., predefined DMRS configurations, DMRS densities, or density differences between DMRSs associated with different TBs). As such, the wireless device may use the MCS associated with a TB as a pointer to a DMRS configuration that the wireless device may assume for that TB (e.g., implicit DMRS configuration signaling). In some implementations, the wireless device may identify one or more MCS thresholds that the wireless device may use to map the set of MCS values to the set of DMRS configurations. For example, the wireless device may receive (e.g., from the transmitting device), be pre-configured with one or more MCS thresholds or follow a definition, such as set forth in a specification, for the one or more MCS thresholds and may determine which DMRS configuration to select for each TB based on which MCS thresholds the MCS associated with the TB satisfies.

For instance, the wireless device may determine that a first TB is associated with a first MCS that satisfies a first MCS threshold corresponding to a first DMRS configuration. Accordingly, the wireless device may assume or select the first DMRS configuration for the first TB (e.g., the first TB relayed layers demodulation). In another example, the wireless device may determine that a second TB is associated with a second MCS that satisfies a second MCS threshold corresponding to a second DMRS configuration. Accordingly, the wireless device may assume or select the second DMRS configuration for the second TB (e.g., the second TB related layers demodulation). As such, the wireless device and the transmitting device may implicitly determine the same DMRS configurations for each TB (e.g., without explicit signaling of the DMRS configuration for each TB).

At block 340, the wireless device may determine a precoding matrix and rank that increases a spectral efficiency of the channel (e.g., based on the determined signal quality ratios). As described herein, the selected precoding matrix and rank may be used by the SINR mapping operation to determine an average estimated SINR for a received reference signal that corresponds to a selected precoding matrix and rank. The wireless device may also determine a spectral efficiency for the channel based on the selected precoding matrix and rank selection. In some cases, the precoding matrix and rank selection operation is not performed.

At block 345, the wireless device may determine a value of a recommended CQI for each group of layers that corresponds to a different TB. The CQI determination for a group of layers may be based on the delay spread $T_{rms}$, Doppler frequency $f_{D\_max}$, and the respective DMRS configuration DMRS_i for the group of layers (which may be configured to a UE or the selected DL DMRS configuration). The CQI determination may also be based on an indication of spectral efficiency for the channel determined during the precoding matrix and rank selection operation. In some cases, the wireless device determines a value for the CQI for each group of layers (e.g., each TB) that is associated with an MCS that is optimized for the selected DMRS configuration for each group of layers (or per TB) and channel conditions. In some cases, the CQI selection operation is replaced by an MCS selection operation (e.g., if the wireless device is a base station).

At block 350, the wireless device may generate a report (e.g., a CSF report if the wireless device is a UE) that includes an indication of the selected DMRS configuration for each group of layers (e.g., a DL DMRS configuration). In some aspects, the reporting of the selected DMRS configuration for each TB or each CDM group may be addressed as a separate capability. In some examples, generating the report includes generating a CSF report that includes a PMI, RI, CQI, and DMI. In some cases, the CSF report may include a DMI field that is used to convey the DMI. A size of the DMI field may be based on a quantity of DMRS configurations that are tested/available for communications. In some examples, a single DMI may indicate multiple DMRS configurations (e.g., one DMRS configuration for each group of layers). In some other examples, the CSF report may include multiple DMIs, each DMI indicating a single DMRS configuration for each group of layers.

In some other cases, the CSF report may jointly pre-code or encode the CQI and DMI based on a relationship between CQI values and DMRS configurations. In some examples, the CQI and the DMI may be jointly pre-coded for each group of layers (e.g., for each TB). The jointly pre-coded CQI and DMI may be conveyed by one or more CQI fields or one or more combined CQI/DMI fields. By including the jointly pre-coded CQI and DMI in a CQI field or a new field, a CSF reporting format may be unchanged while being used to convey additional data and overhead signaling may be reduced using joint CQI and DMI pre-coding.

In some examples, the wireless device may generate the report including one or more indexes associated with each DMRS configuration. For example, in some implementations, the wireless device may, for each selected DMRS configuration in the CSF report, include an index corresponding to each layer associated with the DMRS configuration. For example, the wireless device may select a first DMRS configuration for a first group of layers and include, in the CSF report, an index corresponding to each layer of the first group of layers indicating that each layer of the first group of layers may use a DMRS configured in accordance with the first DMRS configuration (all the layers selected to use the same DMRS configuration will be addressed in the same CDM group). Similarly, the wireless device may select a second DMRS configuration for a second group of layers (a second CDM group) and include, in the CSF report, an index corresponding to each layer of the second group of layers indicating that each layer of the second group of layers may use a DMRS configured in accordance with the second DMRS configuration. In such examples, each index (corresponding to a DMRS port or layer) may be associated with or correspond to a column index of a precoding matrix.

In some other implementations, the wireless device may, for each selected DMRS configuration in the CSF report, include an index corresponding to a TB or CDM group including a group of layers associated with the DMRS configuration. For example, the wireless device may select the first DMRS configuration for the first group of layers (e.g., a first TB or a first CDM group) and include, in the CSF report, an index corresponding to the first TB or the first CDM group indicating that the first TB or the first CDM group may use a DMRS configured in accordance with the first DMRS configuration. Similarly, the wireless device may select the second DMRS configuration for the second group of layers (e.g., a second TB or a second CDM group) and include, in the CSF report, an index corresponding to the second TB or the second CDM group indicating that the second TB or the second CDM group may use a DMRS configured in accordance with the second DMRS configuration. In such examples, the wireless device may include another field in the CSF report (e.g., in addition to the field including the selected DMRS configurations) indicating the DMRS ports or layers associated with each TB or CDM group. For example, the wireless device may include a field in the CSF report indicating that the first TB or the first CDM group includes each layer of the first group of layers and that the second TB or the second CDM group includes each layer of the second group of layers.

The wireless device may transmit the report to a transmitting device. When the report includes or is a CSF report, a transmitting device may adapt transmission parameters based on the received CSF report (e.g., based on the contents or indications included in the CSF report, such as one or more indicated DMRS configurations). The transmitting device may select a DMRS configuration for each TB or each CDM, or both, based on the DMRS configurations selected by the wireless device. In some examples, the transmitting device may determine to use the same DMRS configurations that are selected by the wireless device. In some other examples, the transmitting device may select different DMRS configurations than the DMRS configurations that are selected by the wireless device. For example, the transmitting device may select different DMRS configurations than the DMRS configurations selected by the wireless device based on the DMRS configurations selected by the wireless device and network scheduling criteria. As such, the transmitting device may account for the DMRS configurations selected by the wireless device (e.g., DMRS configurations that may increase the spectral efficiency and achievable throughput of communications between the transmitting device and the wireless device for each TB or CDM group) as well as scheduling criteria at the transmitting device.

The transmitting device may transmit an indication of the DMRS configuration for each TB or CDM group that the transmitting device determines to use to the wireless device. In some examples, the transmitting device may transmit a list of relevant DMRS configurations (e.g., a list of tested, compatible, or otherwise available DMRS configurations) to the wireless device. In some aspects, the transmitting device may activate a list of DMRS configurations to the wireless device via a medium access control (MAC) control element (CE). In such examples, the transmitting device may indicate the specific DMRS configuration from the activated list for each TB or CDM group to the wireless device via a field in a downlink control message, such as DCI. For example, the transmitting device may include a field in DCI including one or more indications of the DMRS configuration for each TB or CDM group.

In some other examples, the transmitting device may include a bit in a downlink control message, such as DCI, that may indicate to the wireless device whether the DMRS configuration for each TB or CDM group determined by the transmitting device is the same as the DMRS configuration for each TB or CDM group as selected by the wireless device and indicated in the last CSF report (e.g., which may, in such contexts, be equivalently referred to as a CSI report or a DMRS report). For instance, the wireless device may select a first DMRS configuration for a first TB or a first CDM group and a second DMRS configuration for a second TB or a second CDM group and the wireless device may determine, based on the value of the bit in the downlink control message, that the transmitting device may use the first DMRS configuration for the first TB or the first CDM group and the second DMRS configuration for the second TB or the second CDM group. For example, if the bit is set the wireless device will determine or assume that the DMRS configurations that the transmitting device will use are the same as the DMRS configurations selected by the wireless device in the last reported CSF. Otherwise, the UE may determine that the DMRS configurations that the transmitting device will use are different than the DMRS configurations selected by the wireless device in the last reported CSF and the wireless device may expect to receive the DMRS configurations selected by the transmitting device explicitly. As such, the transmitting device may implicitly signal the DMRS configurations in the case that the transmitting device uses the same DMRS configurations as those selected by the wireless device.

FIG. 4 illustrates example DMRS configurations 400 that support DMRS configuration selection and reporting per TB and per CDM group in accordance with aspects of the present disclosure. In some examples, the DMRS configurations 400 may be selected to implement aspects of the wireless communications system 100, the wireless communications system 200, and the process flow 300.

FIG. 4 illustrates example DMRS configurations for a downlink transmission, such as a data transmission from a transmitting device (e.g., a base station, as described with reference to FIGS. 1 through 3) to a wireless device (e.g., a UE, as also described with reference to FIGS. 1 through 3) over a PDSCH. As such, the DMRS configurations illustrated in FIG. 4 may be referred to as DL DMRS configurations, as described with reference to FIGS. 2 and 3. However, similar configurations and procedures as those described with reference to FIG. 4 may be implemented in the context of an uplink transmission and, in such cases, the DMRS configurations may be referred to as UL DMRS configurations, as described with reference to FIGS. 2 and 3 (e.g., when the transmitting device is a UE and the wireless device is a base station). In such examples in which the DMRS configurations are UL DMRS configurations, the relevant parameters may include DMRS type A, a CDM group size equal to 2, and an RI equal to four. In some aspects, the DMRS configurations may be associated with a type 1 configuration and may occupy two orthogonal frequency division multiplexing (OFDM) symbols. In some implementations of the present disclosure, the wireless device may select a DMRS configuration for each group of layers associated with a data transmission over a PDSCH to achieve more optimal spectral efficiency across a number of groups of layers.

In some examples, FIG. 4 may illustrate a single resource block including a number of physical downlink control channel (PDCCH) symbols 405 (e.g., two PDCCH symbols 405) and a number of PDSCH symbols 410 (e.g., 12 PDSCH symbols 410). The resource block may be associated with two TBs and, correspondingly, two CDM groups (e.g., the number of layers per TB may be the same as the number of layers per CDM group). In some aspects, each TB may be associated with a number of DMRS ports which may correspond to or otherwise relate to a number of layers. In some cases, each TB may be associated with an upper limit for a number of layers (e.g., a maximum number of layers). For example, each TB may be associated with up to four DMRS ports. As such, when the rank is greater than four (i.e., RI>4), the transmitting device may use multiple TBs (e.g., two TBs) for PDSCH transmissions. For instance, each TB may be associated with up to four DMRS ports and, as such, any transmission over the resource block using more than four DMRS ports may use more than one TB. For example, the transmitting device may transmit over the resource block using eight DMRS ports and, as such, may use two TBs for the transmission. In such examples, the DMRS ports may be multiplexed together and the transmitting device may apply an orthogonal cover code (OCC) to enable a single resource element to carry a number of different DMRS ports. In some cases, the transmitting device may apply an OCC when the selected RI is greater than one.

For example, the transmitting device may apply a two-dimensional OCC to schedule four DMRS ports in a single resource element. In some examples, a "plus/minus" pattern may be multiplied on top of the resource elements including DMRS based on the two-dimensional OCC pattern associated with each DMRS port. For example, if the resource elements at (OFDM symbol 2, subcarrier 0), (OFDM symbol 2, subcarrier 2), (OFDM symbol 3, subcarrier 0), and (OFDM symbol 3, subcarrier 2) are addressed (e.g., in that order), the OCC pattern for port 1000 may be "++++," the OCC pattern for port 1001 may be "+−+−," the OCC pattern for port 1004 may be "++−−," and the OCC pattern for port 1005 may be "+−−+." Similarly, if the resource elements at (OFDM symbol 2, subcarrier 1), (OFDM symbol 2, subcarrier 3), (OFDM symbol 3, subcarrier 1), and (OFDM symbol 3, subcarrier 3) are addressed (e.g., in that order), the OCC pattern for port 1002 may be "++++," the OCC pattern for port 1003 may be "+−+−," the OCC pattern for port 1006 may be "++−−," and the OCC pattern for port 1007 may be "+−−+." As such, the transmitting device may multiplex port 1000, port 1001, port 1004, and port 1005 over the same resources based on the different OCC patterns associated with each DMRS port. The transmitting device may similarly multiplex port 1002, port 1003, port 1006, and port 1007 based on the different OCC patterns associated with each DMRS port. The wireless device, upon receiving a transmission over the resource block, may remove the OCC pattern associated with each DMRS port and, based on removing the OCC patterns, may obtain a decomposition or separation of multiple ports even though they are transmitted using the same resource elements.

In some cases, a CDM group that is used (e.g., by the transmitting device) for DMRS scheduling may be associated with a group of DMRS ports (e.g., a group of layers) that are multiplexed in the same resource elements (e.g., a CDM group is always for DMRS ports that are transmitted on the same resource elements). In some cases, the group of DMRS ports (e.g., the group of layers) that may be associated with a CDM group may be referred to as being coupled to the CDM group. As described herein with respect to a TB, an upper limit for a DMRS CDM group size (e.g., a maximum CDM group size for DMRS scheduling) may similarly be associated with four DMRS ports. As such, different TBs may be associated with different groups of DMRS ports (e.g., different groups of layers) and each group of DMRS ports may be related to or coupled to a CDM group. As such, each TB or each CDM group may correspond to or include a different group of DMRS ports.

In some cases, each TB may be transmitted with different MCS while using the same joint precoding option for all the transmitted layers. Correspondingly, CSF reporting (as described with reference to FIG. 3) may include different CQI (with joint PMI) for each TB. As such, a group of layers associated with a TB may share the same CQI. Accordingly, the group of layers that are associated with the TB are likely to have similar SINR measurements because the group of layers share the same CQI. In the case of significant differences between SINR on each layer of the group of layers (e.g., an SINR difference greater than a threshold difference), a lower rank may be selected by a CSF algorithm. In some cases, however, groups of layers coupled to different TBs (each TB having a different CQI or a different MCS used for transmitting the TB) may have significant variation in SINR measurements. Such significant variation in SINR measurement may impact the selection of optimal DMRS configuration for each TB. For example, if a single DMRS configuration is used for multiple TBs (i.e., a uniform DMRS configuration across a number of groups of layers), the spectral efficiency and achievable throughput over the communication link between the transmitting device and the wireless device may vary across the different TBs. For similar reasons, a uniform DMRS configuration across a number of different CDM groups may also result in variable spectral efficiency and achievable throughput over the communication link between the transmitting device and the wireless device across the different CDM groups. For example, a first DMRS configuration may be associated with a relatively higher spectral efficiency for a first TB or a first CDM group but may be associated with a relatively lower spectral efficiency for a second TB or a second CDM group. In other words, some DMRS configurations may be more optimal than other DMRS configurations for different TBs or CDM groups associated with different groups of layers having different average post-processing SINR characteristics per group and correspondingly imposing different requirements for residual channel estimation error floor that depends among the rest on the two-dimensional pilot pattern that is used.

In some implementations of the present disclosure, the wireless device may determine a DMRS configuration for each group of layers (e.g., for each group of DMRS ports or for each TB or CDM group associated with each group of layers). The wireless device may determine or otherwise select the DMRS configuration for each group of layers as described herein, including with reference to FIGS. 1 through 3. In some implementations, the wireless device may select a DMRS configuration for each group of layers that optimizes (e.g., maximizes) a communication efficiency metric, such as spectral efficiency criteria, for that group of layers. The wireless device may transmit an indication of the selected DMRS configuration for each group of layers to the transmitting device via a CSF report. For example, the wireless device may include a field in the CSF report indicating the DMRS configuration for each group of layers. The transmitting device may receive the CSF report and determine a DMRS configuration for each group of layers based on the indication received from the wireless device. Accordingly, the transmitting device may transmit over a PDSCH to the wireless device, the transmission associated with multiple groups of layers (e.g., the transmission including multiple TBs or multiple CDM groups, or both because multiple TBs will likely be present with multiple CDM groups). For each group of layers (e.g., for each TB or each CDM group), the transmission may include a DMRS configured in accordance with a DMRS configuration that optimizes the spectral efficiency for that group of layers and, in some cases, based on a scheduling criteria.

In some examples, the wireless device may evaluate an effective spectral efficiency metric for each group of layers and a DMRS configuration is selected for each group of layers based on maximizing the effective spectral efficiency metric. Further, additional resource elements that are obtained for data allocation due to less dense DMRS pattern selection for one group of layers are used to allocate all layers together. For example, the layers related to all TBs and all CDM groups are allocated together because joint precoding is used on data resource elements. As such, spectral efficiency is optimized overall for the entire PDSCH and not only for any specific group of layers.

Accordingly, the CQI associated with each group of layers (e.g., the CQI associated with each TB) can be defined assuming a different DMRS configuration. For example, the wireless device may determine a CQI mapping or a CQI table based on the selected DMRS configuration for a respective group of layers. In other words, the wireless device may use the selected DMRS configuration as an input into a selection procedure (e.g., an algorithm) for CQI mapping selection or CQI table selection for each group of layers. As described herein, having different DMRS configurations for each TB (e.g., which also may be understood as having different DMRS configurations for each MCS, because each TB may be transmitted with a unique MCS) of a PDSCH transmission may include having different DMRS configurations for different DMRS CDM groups or different groups of DMRS ports.

In some examples, the transmitting device may transmit data to a wireless device including two TBs. In some aspects, the use of two TBs may be relevant for a transmission associated with a high number of layers (e.g., a number of layers greater than the upper limit for an amount of layers per TB, such as when the RI>4 in the case that the upper limit for an amount of layers per TB is four) or a low mobility scenario, or both. A first TB may be associated with a first MCS and a first post-processing SNR and a second TB may be associated with a second MCS and a second post-processing SNR. In some cases the post-processing SNR (e.g., input SNR) may be the same for both TBs. In some aspects, the TB (or codewords (CWs), because each TB is associated with multiple CWs) with the lower MCS or the lower SNR can afford a higher channel estimate error compared to the TB with the higher MCS or the higher SNR. For example, the TB with the lower MCS/SNR may be associated with an equal or higher likelihood for successful communication (e.g., decoding) with a higher channel estimate error compared to the TB with the higher MCS/SNR and with an equal or lower channel estimate error. In some examples, a less dense DMRS configuration (e.g., a less dense DMRS mapping) may be used for layers associated with the TB (e.g., the CDM group) with the lower MCS or the lower post-processing SNR. In some cases, such as in a low mobility scenario, the less dense DMRS mapping may be relevant to a frequency domain (FD) DMRS mapping density.

In the present example, the first MCS associated with the first TB may be less than the second MCS associated with the second TB (i.e., the second MCS is greater than the first MCS). In some implementations, the first TB may use a first CDM group associated with a first group of DMRS ports (e.g., a first group of layers). For example, the first group of DMRS ports may include port 1000, port 1001, port 1004, and port 1005. Similarly, the second TB may use a second CDM group associated with a second group of DMRS ports (e.g., a second group of layers). For example, the second group of DMRS ports may include port 1002, port 1003, port 1006, and port 1007.

In some examples, the wireless device may determine which layers (or which DMRS ports) are included in which group of layers (or in which group of DMRS ports). For example, the wireless device may determine a post-processing SINR (e.g., a DMRS SINR) for each layer and may use the determined post-processing SINR for each layer to determine a grouping of the layers. In some implementations, the wireless device may determine the grouping of the layers by maintaining a minimal post-processing SINR difference between layers of the same group, as also described with reference to FIG. 1. For example, the wireless device may determine a post-processing SINR for each of port 1000, port 1001, port 1002, port 1003, port 1004, port 1005, port 1006, and port 1007 and may group port 1000, port 1001, port 1004, and port 1005 into the first group of layers (e.g., the first group of DMRS ports, the first TB, or the first CDM group) based on determining that the difference of post-processing SINR between each of port 1000, port 1001, port 1004, and port 1005 is less than the difference of post-processing SINR between any of port 1000, port 1001, port 1004, or port 1005 and any remaining DMRS port.

In another example, the wireless device may group port 1002, port 1003, port 1006, and port 1007 into the second group of layers (e.g., the second group of DMRS ports, the second TB, or the second CDM group) based on determining that the difference of post-processing SINR between each of port 1002, port 1003, port 1006, and port 1007 is less than the difference of post-processing SINR between any of port 1002, port 1003, port 1006, or port 1007 and any remaining DMRS port. In other words, the wireless device may group port 1000, port 1001, port 1004, and port 1005 into the first group of layers because port 1000, port 1001, port 1004, and port 1005 are associated with post-processing SINRs within a threshold range of each other and may group port 1002, port 1003, port 1006, and port 1007 into the second group of layers because port 1002, port 1003, port 1006, and port 1007 are associated with post-processing SINRs within a threshold range of each other and outside of a threshold range from any DMRS port in the first group of layers. As such, the wireless device may determine to group port 1000, port 1001, port 1004, and port 1005 into the first group of layers and may determine to group port 1002, port 1003, port 1006, and port 1007 into the second group of layers such that there is a minimal difference in post-processing SINR between each DMRS port within a group of layers.

The wireless device may transmit an indication of the grouping to the transmitting device. In some examples, the wireless device may include the indication of the grouping in a CSF report or in a report coupled to a CSF report. In such examples, the wireless device may include an indication of which layers (e.g., which DMRS ports) the wireless device determined to be within each TB or each CDM group. The transmitting device may address the involved layers to a TB or a CDM group based on the indication.

According to the techniques described herein, the wireless device may select a first DMRS configuration for the first TB and the first CDM group and may select a second DMRS configuration for the second TB and the second CDM group and may transmit an indication of the first DMRS configuration and the second DMRS configuration to the transmitting device via the CSF report. In some implementations, the wireless device may, for each selected DMRS configuration in the CSF report, include an indication of the layers and DMRS ports associated with the DMRS configuration.

In some implementations, the wireless device may include an index (e.g., an index of a precoding matrix) that is used to transmit each layer associated with the DMRS configuration. For example, the wireless device may select a first DMRS configuration for the first group of layers and include, in the CSF report, an indication of a column of a precoding matrix for each layer of the first group of layers. The wireless device may additionally address a number of DMRS ports to the first CDM group (e.g., related to the first group of layers) using the same columns of the precoding matrix used for each layer of the first group of layers. For example, the CSF report may include a set of indexes (e.g., indexes of the precoding matrix) associated with port 1000, port 1001, port 1004, and port 1005 indicating that port 1000, port 1001, port 1004, and port 1005 may use a DMRS configured in accordance with the first DMRS configuration because the set of indexes may be the same as the indicated set of indexes applied to the first group of layers.

Similarly, the wireless device may select a second DMRS configuration for the second group of layers and include, in the CSF report, an indication of a column of a precoding matrix for each layer of the second group of layers. The wireless device may additionally address a number of DMRS ports to the second CDM group (e.g., related to the second group of layers) using the same columns of the precoding matrix used for each layer of the second group of layers. For example, the CSF report may include a set of indexes (e.g., indexes of a precoding matrix) associated with port 1002, port 1003, port 1006, and port 1007 indicating that port 1002, port 1003, port 1006, and port 1007 may use a DMRS configured in accordance with the second DMRS configuration because the set of indexes may be the same as the indicated set of indexes applied to the second group of layers.

In some examples, the wireless device may include another field in the CSF report (e.g., in addition to the field including the selected DMRS configurations) indicating the DMRS ports or layers associated with each CDM group. For example, the wireless device may include a field in the CSF report indicating an index corresponding to a column of a precoding matrix associated with each layer of the first group of layers and addressing port 1000, port 1001, port 1004, and port 1005 to the first CDM group based on associating the indexes corresponding to the columns of the precoding matrix that are associated with the first group of layers to port 1000, port 1001, port 1004, and port 1005. Similarly, the wireless device may include a field in the CSF report indicating an index corresponding to a column of a precoding matrix associated with each layer of the second group of layers (e.g., different than the indexes associated with the first group of layers) and addressing port 1002, port 1003, port 1006, and port 1007 to the second CDM group based on associating the indexes corresponding to the columns of the precoding matrix that are associated with the second group of layers to port 1002, port 1003, port 1006, and port 1007.

The first DMRS configuration and the second DMRS configurations may include a single DMRS location (e.g., two consecutive PDSCH symbols 410). Further, as illustrated by FIG. 4, each of the first and second DMRS configurations may configure a DMRS type A. In some aspects, the first DMRS configuration may have a different DMRS density than the second DMRS configuration. For example, as illustrated in FIG. 4, the first CDM group may be associated with the first DMRS configuration having a first density (e.g., a first DMRS density). For instance, the first CDM group may be associated with a first DMRS density equal to three DMRS resource elements per resource block per DMRS port. In other words, the first CDM group may have DMRS at 12 resource elements per resource block for CDM group and over four of its DMRS ports per single DMRS location in accordance with the first DMRS configuration. The second CDM group may be associated with the second DMRS configuration having a second density (e.g., a second DMRS density). For instance, the second CDM group may be associated with a second DMRS density equal to 1.5 DMRS resource elements per resource block per DMRS port. The second DMRS configuration, based on having a lower DMRS density, may include one or more available resource elements 415. In some aspects, such available resource elements 415 may be referred to as "punctured" DMRS resource elements.

In one example of the present disclosure, the transmitting device may use the number of available resource elements 415 to transmit additional data resource elements (e.g., the transmitting device may increase the size of the TB or decrease the code rate for more robust communication). For example, the transmitting device may allocate the available resource elements 415 as resources for a data transmission and, as such, the transmitting device may communicate a greater amount of data to the wireless device, potentially increasing the achievable throughput between the transmitting device and the wireless device. Such allocation of empty DMRS resource elements for data may be relevant (e.g., applicable) for both frequency and time mapping of DMRS ports of different CDM groups. Additionally, by allocating the available resource elements 415 for a data transmission, the transmitting device may influence the ratio between the resource allocation for data signaling and the resource allocation for control or pilot signaling, which may increase the spectral efficiency of the communication link between the transmitting device and the wireless device. In some aspects, the relative gain in spectral efficiency may be based on the initial resource allocation for data signaling. For example, if there was a smaller initial resource allocation for data, the relative gain in achievable throughput would be greater because the available resource elements 415 would account for a greater percentage of the resources allocated for data.

In another example of the present disclosure, the transmitting device may refrain from transmitting on the number of available resource elements 415. For example, instead of or in addition to allocating some of the available resource elements 415 for a data transmission, the transmitting device may refrain from transmitting non-zero power (NZP) signaling in at least a portion of the available resource elements 415 to enable the transmitting device to allocate a greater transmit power to all the DMRS ports on the DMRS symbol. In such examples, the transmitting device may boost the power used to transmit signals on the remaining DMRS resource elements within the same symbol with the empty available resource elements 415. For example, the DMRS ports (e.g., all the DMRS ports related to the PDSCH allocation) of the same symbol may be boosted based on the amount of power saved from refraining from transmitting NZP signals in at least a portion of the available DMRS resource elements 415.

Further, the wireless device may use the empty available resource elements 415 (e.g., zero power (ZP) signaling) for interference or noise estimation. For example, the wireless device may use the available resource elements 415 in a similar manner as the wireless device may use a CSI-IM resource. Such options relating to refraining from transmitting NZP signals in the available resource elements 415 may be relevant (e.g., applicable) for frequency mapping of DMRS ports of different CDM groups on at least some of the DMRS locations. In some implementations, the transmitting device and the wireless device may reduce or maintain complexity levels based on refraining from transmitting NZP signaling during the available resource elements 415.

Additionally or alternatively, the described techniques may similarly apply in the context of multiple TRPs. For example, each TRP transmission may have a group of DMRS ports allocated on different CDM groups. In other words, each TRP may be associated with a different CDM group relating to a unique group of DMRS ports (e.g., a unique group of layers). As such, the wireless device may select a DMRS configuration for each TRP transmission or for each codeword transmitted from each TRP. The wireless device may select a DMRS configuration for each TRP transmission and transmit an indication of each DMRS configuration to the transmitting device (or to each one of the TRPs correspondingly) in a field of a CSF report, as described in more detail herein, including with reference to FIGS. 1 through 3. In some aspects, because each TRP transmission may be associated with a unique CDM group, selecting a DMRS configuration for each TRP transmission may be equivalent to selecting a DMRS configuration for each CDM group. In some aspects, the wireless device may use multiple TRPs for coverage enhancement purposes and, as such, may transmit the same data to each TRP using different codewords for greater transmission diversity.

Although described in the context of FIG. 4 as including four DMRS ports, a TB or CDM group may include other numbers of DMRS ports (or other values of an upper limit for an RI per TB or CDM group) without exceeding the scope of the present disclosure. For example, a DMRS CDM group and TB may be defined as up to a group of two DMRS ports or up to a group of two layers and, as such, the transmitting device may use more than one TB (or MCS) or CDM group when the number of layers exceeds two. In such examples, the relevant parameters may include DMRS type A and a single DMRS symbol per location. Further, the upper limit for a number of DMRS ports or the upper limit for a size of a group of layers may be defined separately for a TB and a CDM group. For example, a TB may include four DMRS ports or layers while a CDM group may include two DMRS ports or layers. As such, in some cases, the transmitting device may use more than one CDM group when the number of involved layers is greater than two and may use a single TB when the number of involved layers is less than or equal to four. For instance, the transmitting device may, in some cases, use multiple CDM groups having up to two DMRS ports and a single TB to transmit over a PDSCH and the wireless device may select a DMRS configuration for each CDM group within the single TB, as described in more detail herein, including with reference to FIG. 5.

FIG. 5 illustrates example DMRS configurations 500 that support DMRS configuration selection and reporting per TB and per CDM group in accordance with aspects of the present disclosure. In some examples, the DMRS configurations 500 may be selected to implement aspects of the wireless communications system 100, the wireless communications system 200, and the process flow 300.

FIG. 5 illustrates example DMRS configurations for a downlink transmission, such as a downlink data transmission from a transmitting device (e.g., a base station, as described with reference to FIGS. 1 through 3) to a wireless device (e.g., a UE, as also described with reference to FIGS. 1 through 3) over a PDSCH. As such, the DMRS configurations illustrated in FIG. 5 may be referred to as DL DMRS configurations, as described with reference to FIGS. 2 and 3. In some aspects, the DMRS configurations shown in FIG. 5 may include DMRS type A. However, similar configurations and procedures as those described with reference to FIG. 5 may be implemented in the context of an uplink transmission and, in such cases, the DMRS configurations may be referred to as UL DMRS configurations, as described with reference to FIGS. 2 and 3. In some aspects, the DMRS configurations may be associated with a type 1 configuration and may occupy one OFDM symbol per DMRS location. In some implementations of the present disclosure, the wireless device may select a DMRS configuration for each group of layers associated with a data transmission over a PDSCH to achieve more optimal spectral efficiency of the allocation.

In some examples, FIG. 5 may illustrate a single resource block including a number of PDCCH symbols 505 (e.g., two PDCCH symbols 505) and a number of PDSCH symbols 510 (e.g., 12 PDSCH symbols 510). The resource block may be associated with one TB and multiple CDM groups (e.g., two CDM groups each including two DMRS ports). In some cases, each CDM group may be associated with an upper limit for a number of DMRS ports (e.g., which may correspond to a group of layers). The transmitting device and the wireless device may determine a CDM group size based on the upper limit for the number of DMRS ports (or an upper limit or a maximum number of corresponding layers) that may be used in a single CDM group according to the addressed DMRS configuration. In some cases, for instance, the transmitting device and the wireless device may determine that for a specific addressed DMRS configuration the upper limit for the CDM group size is equal to two and, as such, may use up to two DMRS ports or two layers per CDM group. In such cases, a group of layers may include up to two layers or relate to up to two DMRS ports.

For example, a first CDM group may include port 1000 and port 1001 and a second CDM group may include port 1002 and port 1003. In some examples, the DMRS ports of the same CDM group may be multiplexed together and the transmitting device may apply an OCC to enable a single resource element to carry transmissions from two different DMRS ports. In some cases, based on transmitting DMRS over one consecutive symbol, the OCC may be a one-dimensional OCC. In some examples, a "plus/minus" pattern may be multiplied on top of the resource elements including DMRS based on the two-dimensional OCC pattern associated with each DMRS port.

For example, if the resource elements at (OFDM symbol 2, subcarrier 0) and (OFDM symbol 2, subcarrier 2) are addressed (e.g., in that order), the OCC pattern for port 1000 may be "++" and the OCC pattern for port 1001 may be "+−." Similarly, if the resource elements at (OFDM symbol 2, subcarrier 1) (OFDM symbol 2, subcarrier 3) are addressed (e.g., in that order), the OCC pattern for port 1002 may be "++" and the OCC pattern for port 1003 may be "+−." As such, the transmitting device may multiplex port 1000 and port 1001 over the same resources based on the different OCC patterns associated with each DMRS port. The transmitting device may similarly multiplex port 1002 and port 1003 based on the different OCC patterns associated with each DMRS port. The wireless device, upon receiving a transmission over the resource block, may remove the OCC pattern associated with each DMRS port and, based on removing the OCC patterns, may obtain a decomposition or separation of multiple ports even though they are transmitted using the same resource elements.

In some examples, the wireless device may determine which layers (or which DMRS ports) are included in which group of layers (or in which group of DMRS ports). For example, the wireless device may determine a post-processing SINR (e.g., a DMRS SINR) for each layer and may use the determined post-processing SINR for each layer to determine a grouping of the layers. In some implementations, the wireless device may determine the grouping of the layers by maintaining a minimal post-processing SINR difference between layers of the same group, as also described with reference to FIG. 1. For example, the wireless device may determine a post-processing SINR for each of port 1000, port 1001, port 1002, and port 1003 and may group port 1000 and port 1001 into a first group of layers (e.g., a first group of DMRS ports or a first CDM group) based on determining that the difference of post-processing SINR between port 1000 and port 1001 is less than the difference of post-processing SINR between port 1000 and port 1002 and between port 1000 and port 1003.

In another example, the wireless device may group port 1002 and port 1003 into a second group of layers (e.g., a second group of DMRS ports or a second CDM group) based on determining that the difference of post-processing SINR between port 1002 and port 1003 is less than the difference of post-processing SINR between port 1002 and port 1000 and between port 1002 and port 1001. In other words, the wireless device may group port 1000 and port 1001 into the first group of layers because port 1000 and port 1001 are associated with post-processing SINRs within a threshold range of each other and may group port 1002 and port 1003 into the second group of layers because port 1002 and port 1003 are associated with post-processing SINRs within a threshold range of each other and outside a threshold range of any of the DMRS ports in the first group of layers. As such, the wireless device may determine to group port 1000 and port 1001 into the first group of layers and may determine to group port 1002 and port 1003 into the second group of layers such that there is a minimal difference in post-processing SINR between each DMRS port within a group of layers.

The wireless device may transmit an indication of the grouping to the transmitting device. In some examples, the wireless device may include the indication of the grouping in a CSF report or in a report coupled to a CSF report. In such examples, the wireless device may include an indication of which layers and which DMRS ports the wireless device determined to be within each CDM group. The transmitting device may address the involved layers to a CDM group based on the indication.

In some implementations, the wireless device may, for each selected DMRS configuration in the CSF report, include an index (e.g., an index of a precoding matrix) that is used to transmit each layer associated with the DMRS configuration. For example, the wireless device may select a first DMRS configuration for the first group of layers and include, in the CSF report, an indication of a column of a precoding matrix for each layer of the first group of layers. The wireless device may additionally address a number of DMRS ports to the first CDM group (e.g., related to the first group of layers) using the same columns of the precoding matrix used for each layer of the first group of layers. For example, the CSF report may include an index of the precoding matrix associated with port 1000 and an index of the precoding matrix associated with port 1001 indicating that port 1000 and port 1001 may use a DMRS configured in accordance with the first DMRS configuration because the indexes may be the same as the indicated set of indexes applied to the first group of layers.

Similarly, the wireless device may select a second DMRS configuration for the second group of layers and include, in the CSF report, an indication of a column of a precoding matrix for each layer of the second group of layers. The wireless device may additionally address a number of DMRS ports to the second CDM group (e.g., related to the second group of layers) using the same columns of the precoding matrix used for each layer of the second group of layers. For example, the CSF report may include an index of the precoding matrix associated with port 1002 and an index of the precoding matrix associated with port 1003 indicating that port 1002 and port 1003 may use a DMRS configured in accordance with the second DMRS configuration because the indexes may be the same as the indicated indexes applied to the second group of layers. In such examples, each index (corresponding to a DMRS port or layer) may be associated with or correspond to a column of a precoding matrix.

In some examples, the wireless device may include another field in the CSF report (e.g., in addition to the field including the selected DMRS configurations) indicating the DMRS ports or layers associated with each CDM group. For example, the wireless device may include a field in the CSF report indicating an index corresponding to a column of a precoding matrix associated with each layer of the first group of layers and addressing port 1000 and port 1001 to the first CDM group based on associating the indexes corresponding to the columns of the precoding matrix that are associated with the first group of layers to port 1000 and port 1001. Similarly, the wireless device may include a field in the CSF report indicating an index corresponding to a column of a precoding matrix associated with each layer of the second group of layers (e.g., different than the indexes associated with the first group of layers) and addressing port 1002 and port 1003 to the second CDM group based on associating the indexes corresponding to the columns of the precoding matrix that are associated with the second group of layers to port 1002 and port 1003.

The wireless device may include a CQI field in the CSI report to report the CQI associated with the TB. In some examples, a CQI may be associated with a TB and may be based among the rest on the DMRS configuration of the TB. As such, in the case of a single TB including multiple CDM groups, each CDM group using a different DMRS configuration, the wireless device may report the CQI using some fine tuning in CQI determination or most appropriate CQI mapping table selection based on the DMRS configuration corresponding to the group of layers (e.g., the CDM group) having the highest post-processing SINR or SNR. For example, the wireless device may determine that the first group of layers has a higher post-processing SINR or SNR than the second group of layers and, as such, the wireless device may determine to report CQI based on the CQI mapping table defined for the DMRS configuration corresponding to the first group of layers. In some examples, the wireless device may indicate the group of layers having the highest post-processing SINR or SNR based on addressing the group of layers in a CDM group using a DMRS configuration associated with the highest DMRS density. In some implementations, the wireless device may determine to use the DMRS configuration corresponding to the group of layers having the highest post-processing SINR or SNR based on a value of a flag in a CSI report configuration.

In some examples, the wireless device may determine a number of layers associated with a transmission over the resource block based on a value of an RI. For example, the wireless device may determine to use three layers based on determining that RI=3. In some cases, an RI of three may be associated with a mid-to-high SNR and a medium mobility scenario of a mobile device (e.g., a device moving approximately 30 km per hour), or both. In some cases, three layers may sometimes be used for communications at some frequency ranges. For example, three layers may sometimes be used for sub-6 GHz communications. Further, as illustrated in FIG. 5, a DMRS type A may be used and a DMRS CDM group size may be equal to two such that four DMRS ports are configured, namely port 1000, port 1001, port 1002, and port 1003. A first layer and a second layer of the three layers (e.g., when RI=3) may be associated with a first CDM group including port 1000 and port 1001. Likewise, the third layer of the three layers may be associated with the second CDM group including one of port 1002 or port 1003. As such, the first group of layers (e.g., the first CDM group) may include two layers and the second group of layers (e.g., the second CDM group) may include one layer.

According to the techniques described herein, the wireless device may select a DMRS configuration for each CDM group. In some examples, the wireless device may select a first DMRS configuration for the first CDM group and a second DMRS configuration for the second CDM group. Additional details relating to the selection of a DMRS configuration for each CDM group (e.g., each group of layers) are described herein, including with reference to FIGS. 1 through 3. In some implementations, the first DMRS configuration for the first CDM group may be associated with two DMRS locations. In some examples, the wireless device may select a DMRS configuration with two DMRS locations for the first CDM group based on determining that the first CDM group is the strongest CDM group (e.g., the first CDM group is associated with a higher SNR than the second CDM group). In other words, the wireless device may select the first DMRS configuration with two DMRS locations for the first CDM group based on determining that the first layer and the second layer may be associated with a higher post-processing SINR or SNR than the third layer.

Likewise, the third layer of the three layers may be associated with the second CDM group and may have a lower SNR than the first and second layers. As such, the third layer may be able to afford a higher channel estimate error compared to the first and second layers having the higher SNR. Accordingly, the wireless device may select a second DMRS configuration with a single DMRS location for the second CDM group. In some cases, the transmitting device (e.g., a base station) may signal the amount of PDSCH symbols 510 and the number of DMRS locations for each CDM group for the PDSCH allocation. As such, the wireless device (e.g., a UE) may signal DMRS configurations that are coupled to a specific assumed PDSCH allocation duration. In some aspects, the wireless device may report a DMRS configuration for both the first CDM group and the second CDM group with a DMRS density of three resource elements per resource block per DMRS port.

The transmitting device may receive the CSF report indicating the first DMRS configuration for the first CDM group and the second DMRS configuration for the second CDM group. The transmitting device may select a DMRS configuration for each of the first CDM group and the second CDM group based on the first DMRS configuration and the second DMRS configuration selected by the wireless device. In some examples, the transmitting device may select the first DMRS configuration for the first CDM group and the second DMRS configuration for the second CDM group. In other words, the transmitting device may determine to use the same DMRS configurations that are selected by the wireless device. In some other examples, the transmitting device may select different DMRS configurations than the DMRS configurations that are selected by the wireless device. For example, the transmitting device may select a third DMRS configuration for the first CDM group based on the first DMRS configuration selected by the wireless device and network scheduling criteria or constraint. Similarly, the transmitting device may select a fourth DMRS configuration for the second CDM group based on the second DMRS configuration selected by the wireless device and the network scheduling criteria or constraint.

In some examples where the transmitting device determines to use the first DMRS configuration for the first CDM group and the second DMRS configuration for the second CDM group, the second DMRS location may include a quantity of available resource elements 515 that are unoccupied by DMRS. For example, DMRS configured in accordance with the first DMRS configuration may occupy every other resource element at the second DMRS location (e.g., at OFDM symbol 12) based on the DMRS pattern associated with the first DMRS configuration while DMRS configured in accordance with the second DMRS configuration may not occupy any resource elements at the second DMRS location. In some implementations, the transmitting device may allocate the available resource elements 515 at the second DMRS location that are unoccupied by DMRS as data resource elements. As such, the transmitting device may use the available resource elements 515 at the second DMRS configuration that are unoccupied by DMRS for a data transmission, which may increase the spectral efficiency and the achievable throughput of communications between the transmitting device and the wireless device.

In some other implementations, the transmitting device may refrain from transmitting NZP signaling over the available resource elements 515. In such implementations, the transmitting device may boost a transmit power for transmissions from port 1000 and port 1001 based on the power saved from refraining from transmitting NZP signaling at the second DMRS location for the second CDM group. Additionally or alternatively, the wireless device may use the empty available resource elements 515 (e.g., ZP signaling) for interference or noise estimation. For example, the wireless device may use the available resource elements 415 in a similar manner as the wireless device may use a CSI-IM resource.

Additionally or alternatively, the described techniques may similarly apply in the context of multiple TRPs. For example, each TRP transmission may have a group of DMRS ports allocated on different CDM groups. In other words, each TRP may be associated with a different CDM group relating to a corresponding group of DMRS ports (e.g., related to a corresponding group of layers). As such, the wireless device may select a DMRS configuration for each TRP transmission or for codewords or TBs transmitted from each TRP. The wireless device may select a DMRS configuration for each TRP transmission and transmit an indication of each DMRS configuration to the corresponding transmitting device (each one of the multiple TRPs) in a field of a CSF report, as described in more detail herein, including with reference to FIGS. 1 through 3. In some aspects, because each TRP transmission may be associated with a unique CDM group, selecting a DMRS configuration for each TRP transmission may be equivalent to selecting a DMRS configuration for each CDM group. In some aspects, the wireless device may use multiple TRPs for coverage enhancement purposes and, as such, may transmit the same data from each TRP using different codewords for greater transmission diversity.

Figure 6:
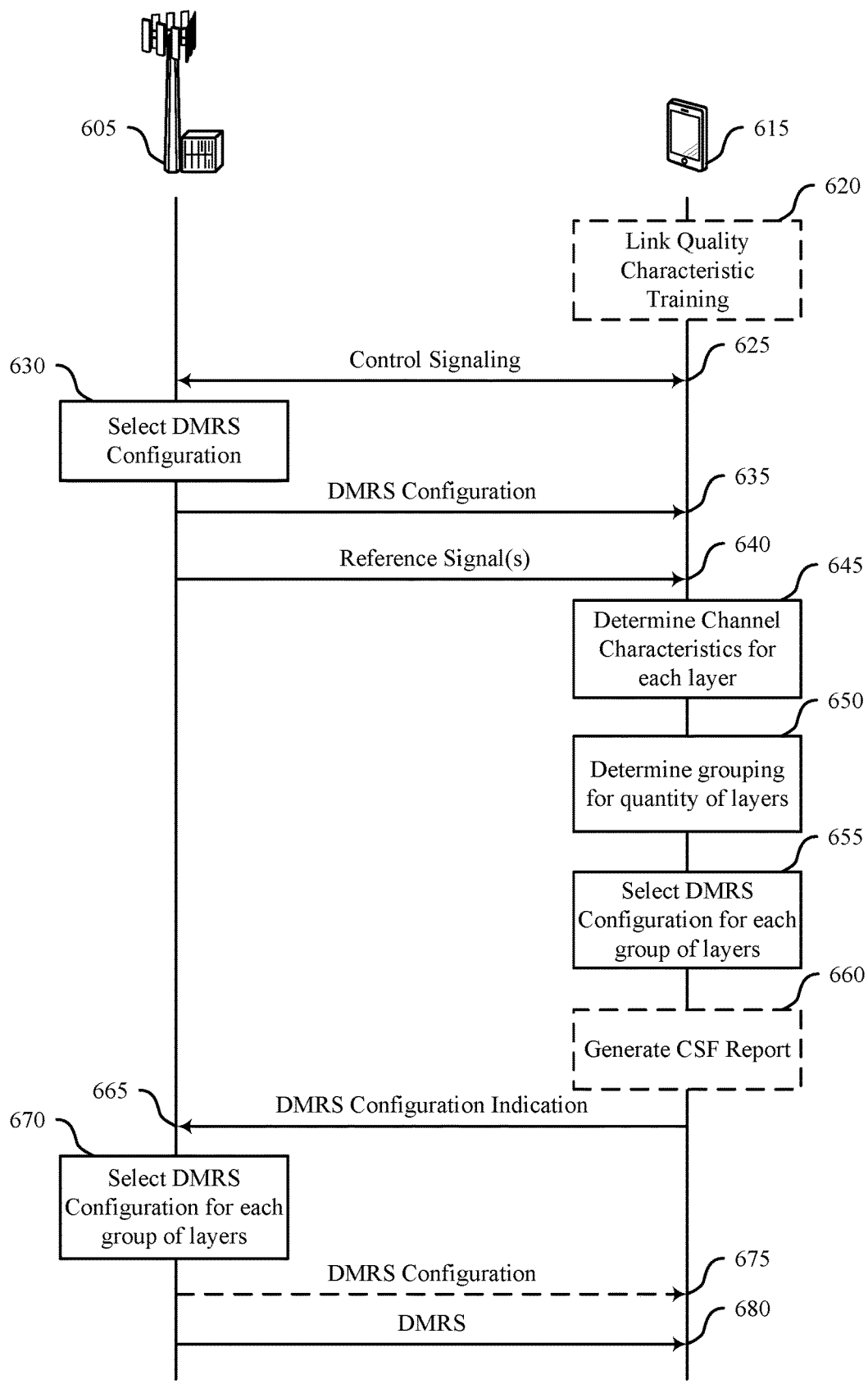
FIG. 6 illustrates an example of a process flow that supports DMRS configuration selection and reporting per TB and per CDM group in accordance with aspects of the present disclosure.

FIG. 6 illustrates an example of a process flow 600 that supports DMRS configuration selection and reporting per TB and per CDM group in accordance with aspects of the present disclosure. In some examples, the process flow 600 may implement aspects of wireless communications system 100, wireless communications system 200, and process flow 300. The process flow 600 may illustrate communications between a base station 605 and a UE 615, which may be examples of corresponding devices as described herein. In some aspects, for example, the UE 615 may correspond to a wireless device as described with reference to FIGS. 2 through 5 and the base station 605 may correspond to a transmitting device as also described with reference to FIGS. 2 through 5.

The process flow 600 illustrates an exemplary collection of operations performed to support the selection of a DL DMRS configuration. For example, the process flow 600 depicts signaling that may be exchanged and processing that may be performed to support selecting a DL DMRS configuration. The process flow 600 may be related to signaling preferred transmission parameters, such as a preferred DL DMRS configurations, precoding matrix, rank, and MCS, from the UE 615 (e.g., a wireless device) to the base station 605 (e.g., a transmitting device).

At block 620, an offline numerical training procedure may be performed for UE 615. Based on the training procedure, one or more mappings that indicate previously determined differences in values computed for a link quality characteristic determined using reference signal transmissions of a first type (e.g., CSI-RS) and reference signal transmissions of a second type (e.g., DMRS) may be generated, as described herein and with reference to FIG. 2. For example, the UE 615 may perform link quality characteristic training to determine a mapping between a first link quality characteristic (e.g., a CSI-RS SINR) and a second link quality characteristic (e.g., a DMRS SINR).

At arrow 625, the base station 605 and the UE 615 may exchange control signaling (e.g., RRC signaling). The UE 615 may signal a capability for selecting DL DMRS configurations. For example, the UE 615 may signal a capability of selecting a DL DMRS configuration for each TB or each CDM group (e.g., each group of layers) associated with a data transmission from the base station 605. Additionally or alternatively, the base station 605 may transmit a message that directs the UE 615 to use a CSF reporting format that supports indicating a DMRS configuration for each TB or each CDM group (e.g., by using a CSF reporting format with an additional field including an indication of multiple DMRS configurations).

At block 630, the base station 605 may select an initial DL DMRS configuration for the UE 615. In some examples, the initial DL DMRS configuration may include different DMRS configurations for each TB or each CDM group (e.g., each group of layers) associated with a data transmission from the base station 605. In some other examples, the initial configuration may include a single DMRS configuration for the data transmission.

At arrow 635, the base station 605 may signal the initial DL DMRS configuration to the UE 615. The UE 615 may determine that DL DMRS will be transmitted in accordance with the initial DL DMRS configuration.

At arrow 640, the base station 605 may transmit one or more reference signals to the UE 615. The base station 605 may transmit any combination of DL DMRS, CSI-RS, TRS, or PTRS to the UE 615. The DL DMRS may be included as part of a data transmission that is also transmitted over a PDSCH at arrow 435. The base station 605 may transmit a DL DMRS in accordance with the initial DL DMRS configuration. In some aspects, the base station 605 may transmit a CSI-RS in accordance with a configured CSI-RS configuration. In some cases, the base station 605 may be prohibited from transmitting over interference management resources (e.g., ZP CSI-IM resources).

At block 645, the UE 615 may use the reference signals to determine channel characteristics and/or reception characteristics for a downlink channel between the base station 605 and the UE 615, as described herein and with reference to FIG. 3. For example, the UE 615 may determine a channel matrix, a noise variance, and an SINR based on a received CSI-RS and a monitored CSI-IM resource. The UE 615 may determine a Doppler frequency and a delay spread (e.g., a channel delay spread characteristic) based on a received TRS. The UE 615 may also determine reception characteristics for the downlink channel (reception SNR). The determined channel characteristics may include the first link quality characteristic (e.g., CSI-RS SINR). In some examples, the UE 615 may use the determined channel characteristics and the mapping determined at 620 to determine a set of channel characteristics associated with each layer (e.g., each DMRS port) associated with the PDSCH. The set of channel characteristics associated with each layer may include the second link quality characteristic (e.g., the DMRS SINR).

At block 650, the UE 615 may determine a grouping of a quantity of layers associated with the PDSCH. In some examples, the UE 615 may determine the grouping based on the second link quality characteristic associated with each layer of the quantity of layers. For example, the UE 615 may use the determined DMRS SINR associated with each layer of the quantity of layers to determine the grouping or pairing association of the layers, as described herein and with reference to FIGS. 4 and 5. For example, the UE 615 may group of the quantity of layers associated with the PDSCH such that the difference or variance in DMRS SINR associated with each layer of a group if layers is minimized. In other words, each layer of a group of layers may have a DMRS SINR that are within a threshold range of each other.

At block 655, the UE 615 may select a DL DMRS configuration for each group of layers (e.g., each TB or CDM group) that maximizes a communication metric (e.g., a spectral efficiency) for the PDSCH relative to other DL DMRS configurations, as described herein and with reference to FIGS. 3 through 5. In some aspects, the UE 615 may use the determined channel characteristics, reception characteristics, and identified DL DMRS configuration to determine additional transmission characteristics (e.g., channel quality/CQI) for the PDSCH (e.g., the downlink data channel).

At block 660, the UE 615 may generate a CSF report that includes a PMI, RI, CQI, SLI, and DMI. A value (or values) for the DMI may be determined based on the identified DL DMRS configuration for each group of layers (e.g., each TB or CDM group). For example, the UE 615 may set DMI to a value that corresponds to the selected DL DMRS configuration for each group of layers. Alternatively, the UE 615 may generate the CSF report including multiple DMIs, where each DMI is set to a value that corresponds to a single DL DMRS configuration for one group of layers (e.g., a single TB or CDM group). A value for the CQI may be determined based on the identified DL DMRS configuration, PMI, RI, or any combination thereof. In some examples, the UE 615 may determine a different CQI for each TB associated with a different DL DMRS configuration. In some cases, the DMI (or DMIs) may be included in a DMI field of the CSF report.

In other cases, the DMI may be jointly encoded with the CQI and included in a CQI field of the CSF report (or alternatively in a new CQI/DMI field of the CSF report). That is, in some cases, a subset of DMRS configurations may be associated with a particular CQI value (e.g., based on a relationship between a DMRS configuration and a CQI value for specific reception conditions). Thus, when joint encoding is used, a value that corresponds to one or more DMRS configurations may also corresponds to a CQI value (e.g., DMRS_2, DMRS_3, and DMRS_5 may correspond to CQI value 1, DMRS_1 and DMRS_4 may correspond to CQI value 2, and so on).

At arrow 665, the UE 615 may transmit an indication of the selected DL DMRS configuration for each group of layers to the base station 605. In some cases, the indication may be included in a CSF report that is transmitted by the UE 615 to base station 605. The base station 605 may decode the CSF report to determine a value of the signaled PMI, RI, SLI, CQI, and DMI for each TB associated with the PDSCH. In some other cases, the UE 615 may transmit the indication of the selected DL DMRS configuration for each group of layers to the base station 605 in a report coupled to the CSF report.

At block 670, the base station 605 may select a DL DMRS configuration for each group of layers (e.g., each TB or CDM group) based on the DMI included in the CSF report. In some cases, the base station 605 may select a DL DMRS configuration for each group of layers that corresponds to the DL DMRS configurations indicated by the DMI. In some other cases, the base station 605 may select a DL DMRS configuration for each group of layers based on the DL DMRS configurations indicated by the DMI and scheduling criteria.

At arrow 675, the base station 605 may signal the selected DL DMRS configuration to the UE 615. In some aspects, the base station 605 may signal the selected DL DMRS configuration in a DCI message or via a MAC-CE or in a combination of both of them where some list of equivalent DMRS configurations is first activated using MAC-CE and then multiple of them (e.g., one for each group of layers, such as each TB or CDM group) is selected by each scheduling DCI.

At arrow 680, the base station 605 may transmit multiple DL DMRSs to the UE 615 in accordance with the selected DL DMRS configurations. For example, the base station 605 may use a first DL DMRS configured in accordance with a first DL DMRS configuration for a first TB or a first CDM group and may use a second DL DMRS configured in accordance with a second DL DMRS configuration for a second TB or a second CDM group. As such, the base station 605 and the UE 615 may increase the achievable throughput and spectral efficiency for communications between the base station 605 and the UE 615.

Although described with reference to selection of a DL DMRS configuration, various aspects of the process flow 600 may be implemented to select an UL DMRS configuration. For example, the transmission of reference signals at arrow 640 and the transmission of DMRS at arrow 680 may be performed by the UE 615, and the operations at block 645, block 650, block 655, and arrow 665 may be performed by the base station 605. In order to perform the operations at block 645, block 650, and block 655, the base station 605 may perform at least a portion of the operations described herein and with reference to FIG. 3 (e.g., the operations described at block 305 through block 340). The base station 605 may also determine various characteristics of the uplink channel, including Doppler frequency.

Figure 7:
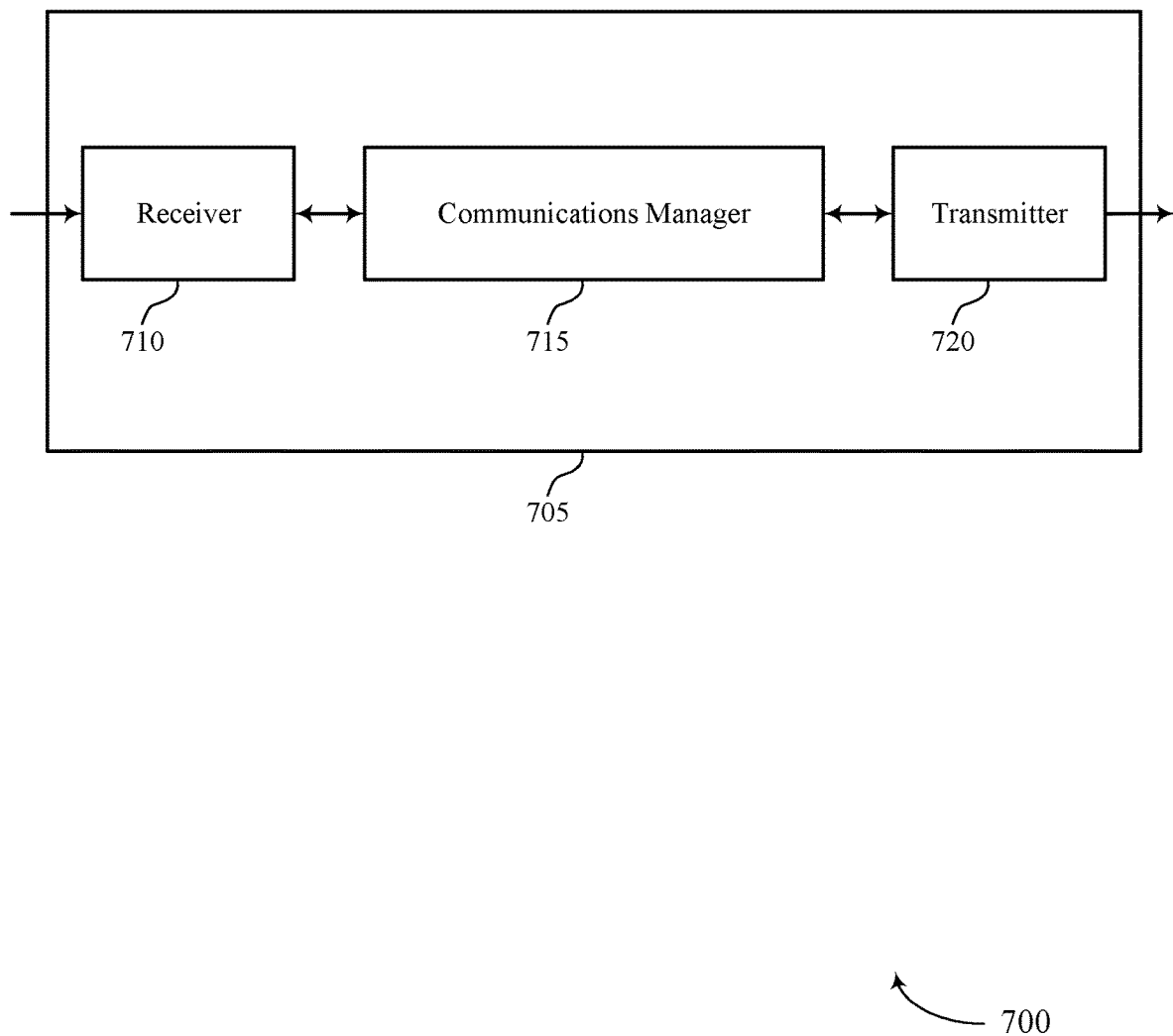
FIGS. 7 and 8 show block diagrams of devices that support DMRS configuration selection and reporting per TB and per CDM group in accordance with aspects of the present disclosure.

FIG. 7 shows a block diagram 700 of a device 705 that supports DMRS configuration selection and reporting per TB and per CDM group in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may provide a means for receiving signals comprising information such as packets, user data, control information, or any combination thereof associated with various information channels. For example, the receiver 710 may receive information such as packets, user data, or control information associated with various information channels (e.g., control channels, data channels, and information channels related to DMRS configuration selection and reporting per TB and per CDM group, etc.). Information may be passed on to other components of the device 705. The receiver 710 may utilize a single antenna or a set of antennas. The receiver 710 may be an example of aspects of the transceiver 1020 described with reference to FIG. 10.

The communications manager 715 may provide a means for communicating information such as packets, user data, control information, or any combination thereof. In some cases, the communications manager 715 may determine a set of channel characteristics and a first link quality characteristic for each layer of a quantity of layers associated with a channel based on one or more downlink reference signals or a CSI-IM resource, or both, identify, based on the set of channel characteristics and the first link quality characteristic, a set of link quality characteristics for each layer of the quantity of layers, the set of link quality characteristics for each layer of the quantity of layers corresponding to a set of DMRS configurations, select a DMRS configuration of the set of DMRS configurations for each of a set of groups of layers based on the set of link quality characteristics and a communication efficiency metric that is associated with the DMRS configuration for each of the set of groups of layers, and transmit, to a base station, an indication of the DMRS configuration for each of the set of groups of layers. The communications manager 715 may be an example of aspects of the communications manager 1010 described herein.

The transmitter 720 may provide a means for transmitting signals generated by other components of the device 705. For example, the transmitter 720 may transmit information such as packets, user data, control information, or any combination thereof associated with various information channels (e.g., control channels, data channels, information channels related to DMRS configuration selection and reporting per TB and per CDM group, etc.). The transmitter 720 may utilize a single antenna or a set of antennas. In some examples, the transmitter 720 may be collocated with a receiver 710 in a transceiver module. For example, the transmitter 720 may be an example of aspects of the transceiver 1020 described with reference to FIG. 10.

The receiver 710, communications manager 715, transmitter 720, or various combinations or components thereof may be examples of means for performing various aspects of DMRS configuration selection and reporting per TB and per CDM group as described herein. For example, the receiver 710, communications manager 715, transmitter 720, or various combinations or components thereof may support a method for performing one or more of the functions described herein.

In some examples, the receiver 710, communications manager 715, transmitter 720, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device (PLD), a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the receiver 710, communications manager 715, transmitter 720, or various combinations or components thereof may be implemented in code (e.g., as communications management software or firmware) executed by a processor. If implemented in code executed by a processor, the functions of the receiver 710, communications manager 715, transmitter 720, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 715 may be configured to perform various operations (e.g., receiving, determining, identifying, selecting, generating, transmitting) using or otherwise in cooperation with the receiver 710, transmitter 720, or both. For example, the communications manager 715 may receive information from the receiver 710, send information to the transmitter 720, or be integrated in combination with the receiver 710, the transmitter 720, or both to receive information, transmit information, or perform various other operations as described herein.

The communications manager 715 may support wireless communication at a UE in accordance with examples as disclosed herein. The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

In some examples, the communications manager 715 may be implemented as an integrated circuit or chipset for a mobile device modem, and the receiver 710 and the transmitter 720 may be implemented as analog components (e.g., amplifiers, filters, antennas) coupled with the mobile device modem to enable wireless transmission and reception over one or more bands.

The communications manager 715 as described herein may be implemented to realize one or more potential advantages. In some implementations of the present disclosure, the communications manager 715 may enable the device 705 to select a DMRS configuration for each group of layers associated with a data transmission from a base station to the device 705. As described herein, the communications manager 715 may select a DMRS configuration for each group of layers based on optimizing or maximizing a communication efficiency metric (e.g., a spectral efficiency) for each group of layers. As such, the communications manager 715 may increase an achievable throughput between the base station and the device 705, which may enable the base station and the device 705 to communicate according to lower latency timelines as well as reduce overhead.

The device 705, based on communicating with the base station in accordance with a lower latency timeline, may switch one or more components associated with communicating with the base station to a sleep mode for longer durations. As such, the device 705 may experience increased power savings and longer battery life.

Figure 8:
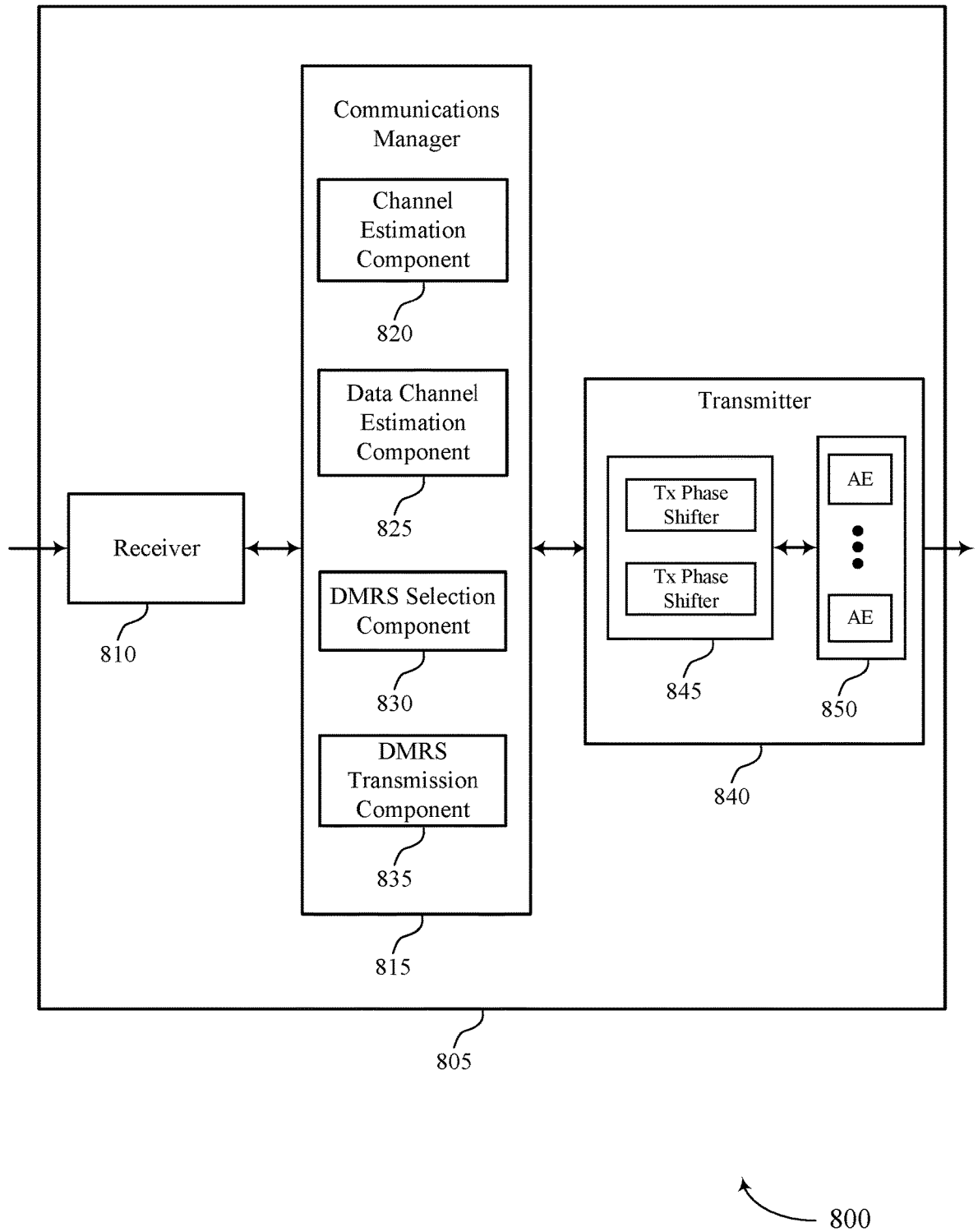

FIG. 8 shows a block diagram 800 of a device 805 that supports DMRS configuration selection and reporting per TB and per CDM group in accordance with aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses). The device 805, or various components thereof, may be an example of means for performing various aspects of DMRS configuration selection and reporting per TB and per CDM group as described herein.

The receiver 810 may provide a means for receiving signals comprising information such as packets, user data, control information, or any combination thereof associated with various information channels. For example, the receiver 810 may receive information such as packets, user data, control information, or any combination thereof associated with various information channels (e.g., control channels, data channels, and information related to DMRS configuration selection and reporting per TB and per CDM group, etc.). Information may be passed on to other components of the device 805. The receiver 810 may utilize a single antenna or a set of multiple antennas. In some cases, the receiver 810 may be an example of aspects of the transceiver 1020 described with reference to FIG. 10.

The communications manager 815 may provide a means for communicating information such as packets, user data, control information, or any combination thereof. In some cases, the communications manager 815 may be an example of aspects of the communications manager 715 as described herein. The communications manager 815 may include a channel estimation component 820, a data channel estimation component 825, a DMRS selection component 830, and a DMRS transmission component 835. In some cases, the communications manager 815 may be an example of aspects of the communications manager 1010 described herein.

The channel estimation component 820 may determine a set of channel characteristics and a first link quality characteristic for each layer of a quantity of layers associated with a channel based on one or more downlink reference signals or a CSI-IM resource, or both. The data channel estimation component 825 may identify, based on the set of channel characteristics and the first link quality characteristic, a set of link quality characteristics for each layer of the quantity of layers, the set of link quality characteristics for each layer of the quantity of layers corresponding to a set of DMRS configurations.

The DMRS selection component 830 may select a DMRS configuration of the set of DMRS configurations for each of a set of groups of layers based on the set of link quality characteristics and a communication efficiency metric that is associated with the DMRS configuration for each of the set of groups of layers. The DMRS transmission component 835 may transmit, to a base station, an indication of the DMRS configuration for each of the set of groups of layers.

The transmitter 840 may provide a means for transmitting signals generated by other components of the device 805. For example, the transmitter 840 may transmit information such as packets, user data, control information, or any combination thereof associated with various information channels (e.g., control channels, data channels, and information related to DMRS configuration selection and reporting per TB and per CDM group, etc.). The transmitter 840 may utilize a single antenna or a set of antennas. In some examples, the transmitter 840 may be collocated with a receiver 810 in a transceiver module. For example, the transmitter 840 may be an example of aspects of the transceiver 1020 described with reference to FIG. 10.

The transmitter 840 may include one or more phase shifters 845 and one or more antenna elements 850. The phase shifter 845 may provide a configurable phase shift or phase offset to a corresponding radio frequency signal to be transmitted on a respective antenna element 850. The settings of each of the phase shifters 845 may be independent, meaning that each can be set to provide a desired amount of phase shift or the same amount of phase shift or some other configuration. A modem or other processor may have at least one control line connected to each of the phase shifters 845 and which may be used to configure the phase shifters 845 to provide a desired amounts of phase shift or phase offset between antenna elements 850.

In some implementations, changing or receiving a transmit or receive beam comprises adjusting relative phase shifts for signals on different antenna elements 850. The relative phase shifts may be achieved by the modem adjusting the phase shift of one or more phase shifters 845. The set of phases for different phase shifters 845 (and corresponding antenna elements 850) may comprise the spatial receive parameters or spatial transmit parameters for a respective beam. To receive or transmit on a beam, the spatial parameters may need to be set before the beginning of the transmitting or receiving.

Figure 9:
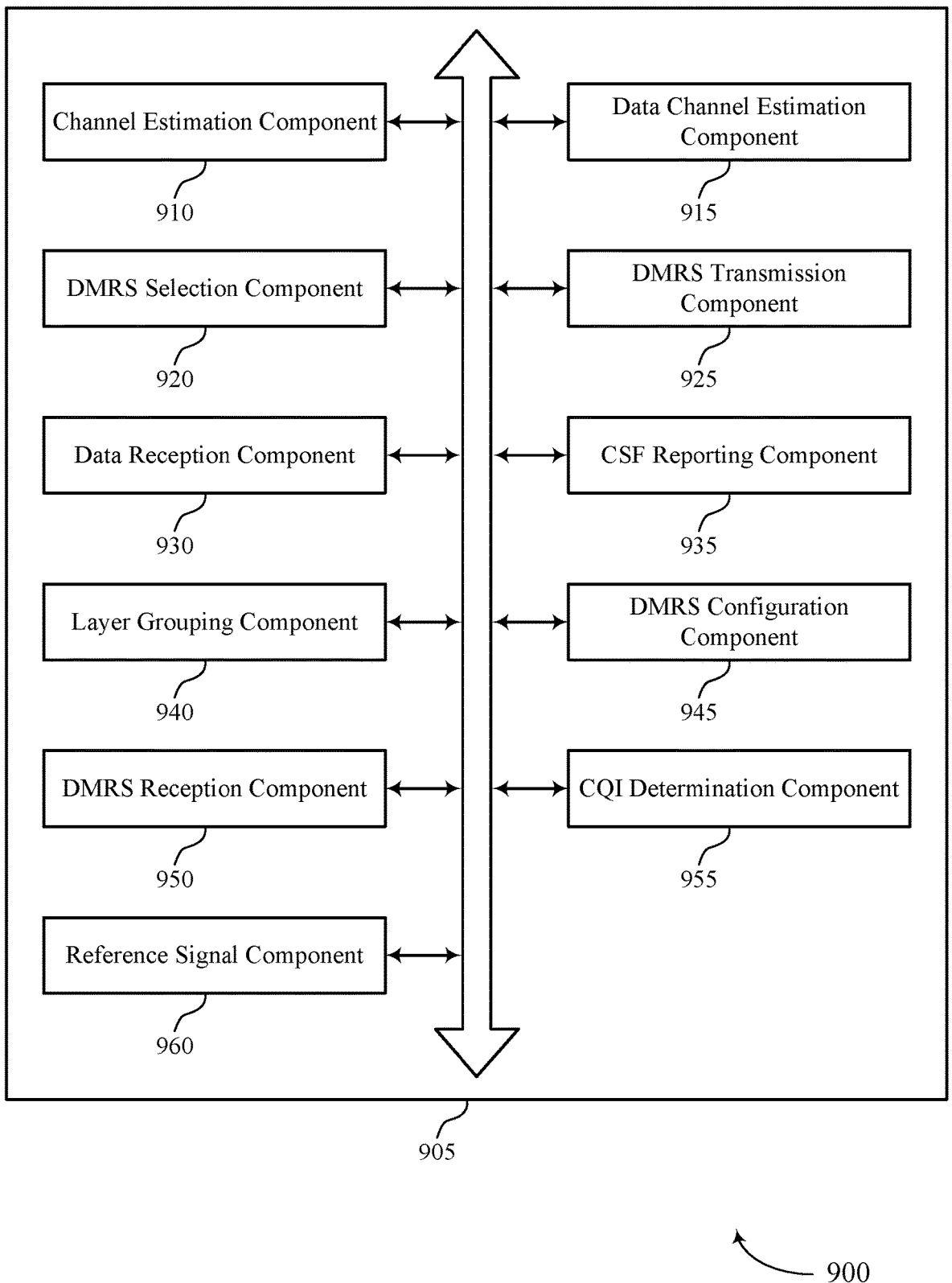
FIG. 9 shows a block diagram of a communications manager that supports DMRS configuration selection and reporting per TB and per CDM group in accordance with aspects of the present disclosure.

FIG. 9 shows a block diagram 900 of a communications manager 905 that supports DMRS configuration selection and reporting per TB and per CDM group in accordance with aspects of the present disclosure. The communications manager 905 may be an example of aspects of a communications manager 715, a communications manager 815, or a communications manager 1010 described herein. The communications manager 905 may include a channel estimation component 910, a data channel estimation component 915, a DMRS selection component 920, a DMRS transmission component 925, a data reception component 930, a CSF reporting component 935, a layer grouping component 940, a DMRS configuration component 945, a DMRS reception component 950, a CQI determination component 955, and a reference signal component 960. Each of these modules may communicate, directly or indirectly, with one another (e.g., via one or more buses).

The channel estimation component 910 may determine a set of channel characteristics and a first link quality characteristic for each layer of a quantity of layers associated with a channel based on one or more downlink reference signals or a CSI-IM resource, or both. In some examples, the channel estimation component 910 may perform a thermal and interference noise estimation procedure using the third quantity of resource elements that are unused for data or DMRS transmission.

The data channel estimation component 915 may identify, based on the set of channel characteristics and the first link quality characteristic, a set of link quality characteristics for each layer of the quantity of layers, the set of link quality characteristics for each layer of the quantity of layers corresponding to a set of DMRS configurations. In some examples, the data channel estimation component 915 may identify, for a first DMRS configuration, a second link quality characteristic for each of the quantity of layers based on the first link quality characteristic for the quantity of layers and a mapping, where the set of link quality characteristics includes the second link quality characteristic. In some examples, the data channel estimation component 915 may determine a channel delay spread characteristic for each of the set of groups of layers based on the first link quality characteristic, where determining the second link quality characteristic for each layer of the quantity of layers is based on the channel delay spread characteristic for corresponding groups of layers.

In some examples, the data channel estimation component 915 may identify, for a CSI-RS configuration and the set of channel characteristics, a mapping from a set of mappings, where the mapping includes a set of adjustments. In some examples, the data channel estimation component 915 may adjust the first link quality characteristic based on the set of adjustments. In some examples, the data channel estimation component 915 may determine the set of link quality characteristics based on the adjusting. In some cases, each of the set of mappings is associated with a different combination of CSI-RS configurations and values for the set of channel characteristics.

The DMRS selection component 920 may select a DMRS configuration of the set of DMRS configurations for each of a set of groups of layers based on the set of link quality characteristics and a communication efficiency metric that is associated with the DMRS configuration for each of the set of groups of layers. In some examples, the DMRS selection component 920 may determine a first value for the communication efficiency metric for a first group of layers based on a temporal density, a frequency density, a first power level for a first DMRS configuration relative to a second power level for a data transmission, and the second link quality characteristic for the first group of layers for the first DMRS configuration.

In some examples, the DMRS selection component 920 may determine, for each remaining DMRS configuration of the set of DMRS configurations for the first group of layers, a first set of values for the communication efficiency metric based on respective temporal densities, respective frequency densities, respective power levels relative to the second power level for the data transmission, and respective second link quality characteristics of each of the remaining DMRS configurations. In some examples, the DMRS selection component 920 may determine that the first value for the communication efficiency metric associated with the first DMRS configuration is greater than the first set of values for the communication efficiency metric associated with each of the remaining DMRS configurations.

In some examples, the DMRS selection component 920 may select the first DMRS configuration for the first group of layers. In some examples, the DMRS selection component 920 may determine that a second value for the communication efficiency metric associated with a second DMRS configuration for a second group of layers is greater than a second set of values for the communication efficiency metric associated with each of the remaining DMRS configurations for the second group of layers.

In some examples, the DMRS selection component 920 may select the second DMRS configuration for the second group of layers. In some examples, the DMRS selection component 920 may determine the set of groups of layers, each of the set of groups of layers associated with one of a set of transmission and reception points, where determining the DMRS configuration for each of the set of groups of layers includes determining the DMRS configuration for a TRP associated with each of the set of groups of layers.

In some examples, the DMRS selection component 920 may select the DMRS configuration of the set of DMRS configurations for each of the one or more CDM groups or for each of the one or more TBs, or both. In some cases, the report includes a first index associated with a first DMRS configuration, the first index corresponding to one or more indexes associated with a group of layers of the set of groups of layers that are related to the first DMRS configuration. In some cases, the group of layers of the set of groups of layers corresponds to a CDM group or a TB. In some cases, each index of the one or more indexes corresponds to a column of a precoding matrix.

The DMRS transmission component 925 may transmit, to a base station, an indication of the DMRS configuration for each of the set of groups of layers.

The data reception component 930 may receive, from the base station, a data transmission associated with the set of groups of layers over a data channel based on the indication of the DMRS configuration for each of the set of groups of layers, where the data transmission includes a DMRS for each of the set of groups of layers associated with the data transmission. In some examples, the data reception component 930 may receive the data transmission including the set of TBs, where each TB of the set of TBs is associated with a different DMRS based on the indication of the DMRS configuration for each of the set of groups of layers.

In some examples, the data reception component 930 may receive the data transmission including the set of CDM groups, where each CDM group of the set of CDM groups is associated with a different DMRS based on the indication of the DMRS configuration for each of the set of groups of layers. In some examples, the data reception component 930 may receive the data transmission over the third quantity of resource elements.

The CSF reporting component 935 may generate a report that includes the indication of the DMRS configuration for each of the set of groups of layers. In some examples, transmitting the report to the base station, where transmitting the indication includes transmitting the report to the base station. In some examples, the CSF reporting component 935 may transmit, to the base station, a second indication of the CQI defined based on the selected DMRS configuration for each of the one or more TBs.

In some examples, the CSF reporting component 935 may transmit, to the base station, a second indication of the CQI for the single TB. In some examples, the CSF reporting component 935 may generate a CSF report based on a joint coding of the indication of the selected DMRS configuration for each of the set of groups of layers and a CQI for each of the set of groups of layers, respectively. In some examples, the CSF reporting component 935 may transmit the CSF report to the base station, where transmitting the indication includes transmitting the CSF report to the base station.

In some cases, the report includes a field for indicating the DMRS configuration for each of the set of groups of layers, a size of the field being based on a quantity of the set of DMRS configurations. In some cases, the report is coupled with a CSF report or includes the CSF report.

The layer grouping component 940 may determine a grouping for the quantity of layers associated with a data transmission based on a CDM group size, where the set of groups of layers are based on the grouping for the quantity of layers. In some examples, the layer grouping component 940 may transmit a second indication of the grouping for the quantity of layers in the report. In some examples, the layer grouping component 940 may determine the quantity of layers based on a selected RI of the data transmission.

In some examples, the layer grouping component 940 may determine a second link quality characteristic for each layer of the quantity of layers associated with a selected RI based on the first link quality characteristic for each layer of the quantity of layers and a mapping. In some examples, the layer grouping component 940 may determine a difference of the second link quality characteristic between each layer of the quantity of layers. In some examples, determining the grouping for the quantity of layers such that the difference of the second link quality characteristic between each layer of a single group of layers includes a smallest difference of the second link quality characteristic.

In some examples, the layer grouping component 940 may determine a first group of layers including a subset of the quantity of layers based on the second link quality characteristic for each of the quantity of layers. In some examples, the layer grouping component 940 may determine a second link quality characteristic for each layer of the quantity of layers based on the first link quality characteristic and a mapping, where layer association to each of the set of involved CDM groups is based on the second link quality characteristic for each layer of the quantity of layers. In some examples, the layer grouping component 940 may identify a group of layers of the set of groups of layers associated with a greatest second link quality characteristic, where the group of layers corresponds to a CDM group.

In some cases, the set of groups of layers correspond to a set of CDM groups. In some cases, the set of groups of layers correspond to one or more groups of DMRS ports related to one or more CDM groups, and where one or more TBs are associated with the one or more CDM groups.

The DMRS configuration component 945 may determine that the first DMRS configuration includes a first quantity of resource elements in a corresponding first set of one or more CDM groups and that the second DMRS configuration includes a second quantity of resource elements in a corresponding second set of one or more CDM groups, where the first quantity of resource elements includes a third quantity of resource elements less than the second quantity of resource elements. In some examples, the DMRS configuration component 945 may determine that the first DMRS configuration includes a first quantity of resource elements and that the second DMRS configuration includes a second quantity of resource elements, where the first quantity of resource elements includes a third quantity of resource elements less than the second quantity of resource elements, the third quantity of resource elements unused for data or DMRS transmission.

The DMRS reception component 950 may receive, from the base station, communication over a first group of DMRS ports associated with the first group of layers and over a second group of DMRS ports associated with the second group of layers having a boosted power level. In some examples, the DMRS reception component 950 may receive, from the base station, a MAC-CE activating a subset of DMRS configurations.

In some examples, the DMRS reception component 950 may receive, from the base station, downlink control information indicating one or more DMRS configurations of the subset of DMRS configurations, where each of the one or more DMRS configurations correspond to a group of layers of the set of groups of layers. In some examples, the DMRS reception component 950 may receive, from the base station, downlink control information including a bit indicating whether the DMRS configuration for each of the set of groups of layers of a scheduled allocation are the same as the DMRS configuration for each of the set of groups of layers selected by the UE in a last delivered indication regarding the selected DMRS configurations.

The CQI determination component 955 may determine a CQI for each of the one or more TBs based on the selected DMRS configuration for each of the one or more TBs. In some examples, the CQI determination component 955 may determine a CQI for the single TB based on the DMRS configuration for the group of layers associated with the greatest second link quality characteristic.

The reference signal component 960 may receive one or more downlink reference signals from the base station. In some cases, the one or more downlink reference signals include one or more of a CSI-RS, a TRS, or a PTRS.

Figure 10:
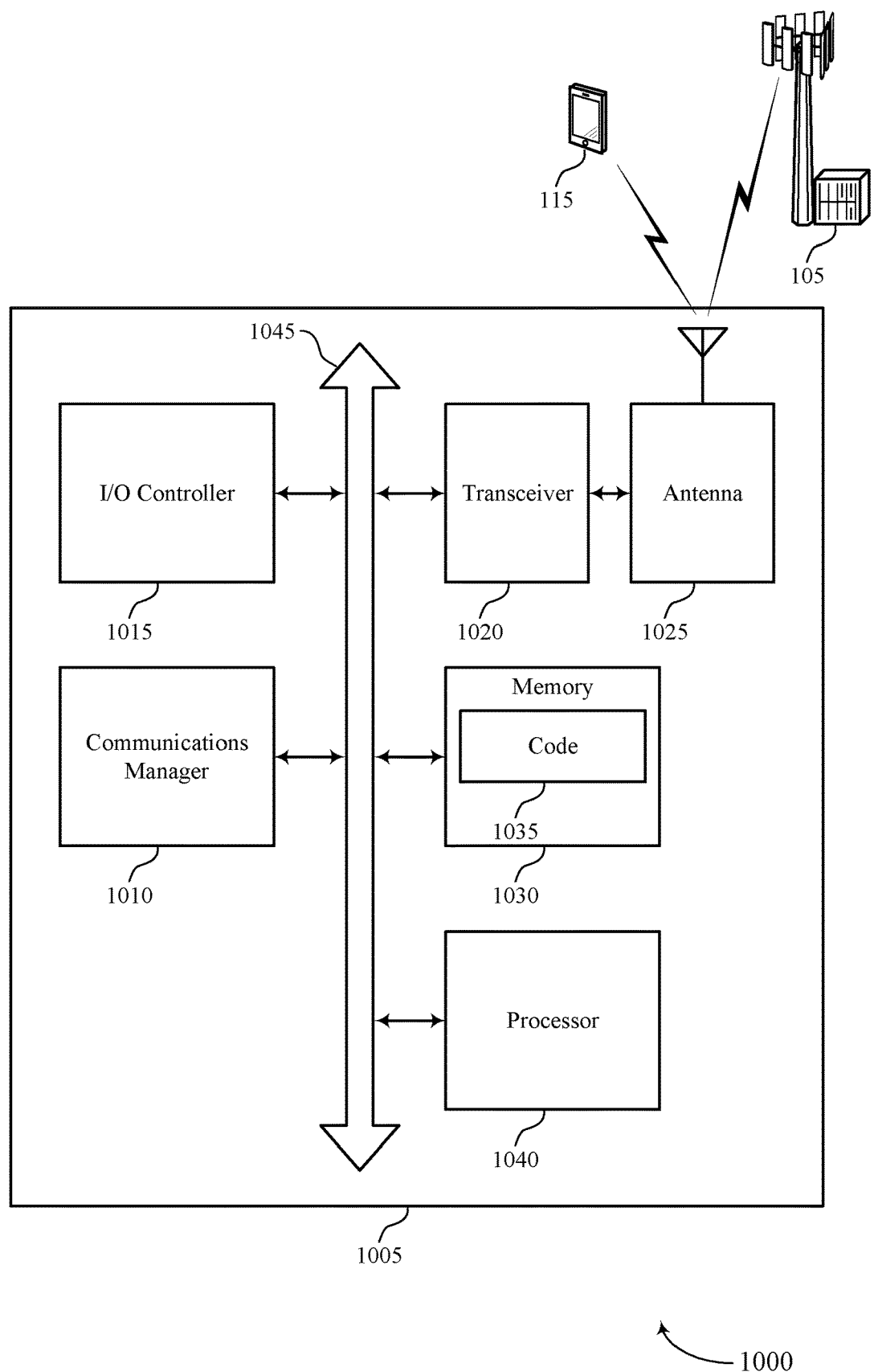
FIG. 10 shows a diagram of a system including a device that supports DMRS configuration selection and reporting per TB and per CDM group in accordance with aspects of the present disclosure.

FIG. 10 shows a diagram of a system 1000 including a device 1005 that supports DMRS configuration selection and reporting per TB and per CDM group in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may determine a set of channel characteristics and a first link quality characteristic for each layer of a quantity of layers associated with a channel based on one or more downlink reference signals or a CSI-IM resource, or both, identify, based on the set of channel characteristics and the first link quality characteristic, a set of link quality characteristics for each layer of the quantity of layers, the set of link quality characteristics for each layer of the quantity of layers corresponding to a set of DMRS configurations, select a DMRS configuration of the set of DMRS configurations for each of a set of groups of layers based on the set of link quality characteristics and a communication efficiency metric that is associated with the DMRS configuration for each of the set of groups of layers, and transmit, to a base station, an indication of the DMRS configuration for each of the set of groups of layers.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting DMRS configuration selection and reporting per TB and per CDM group).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
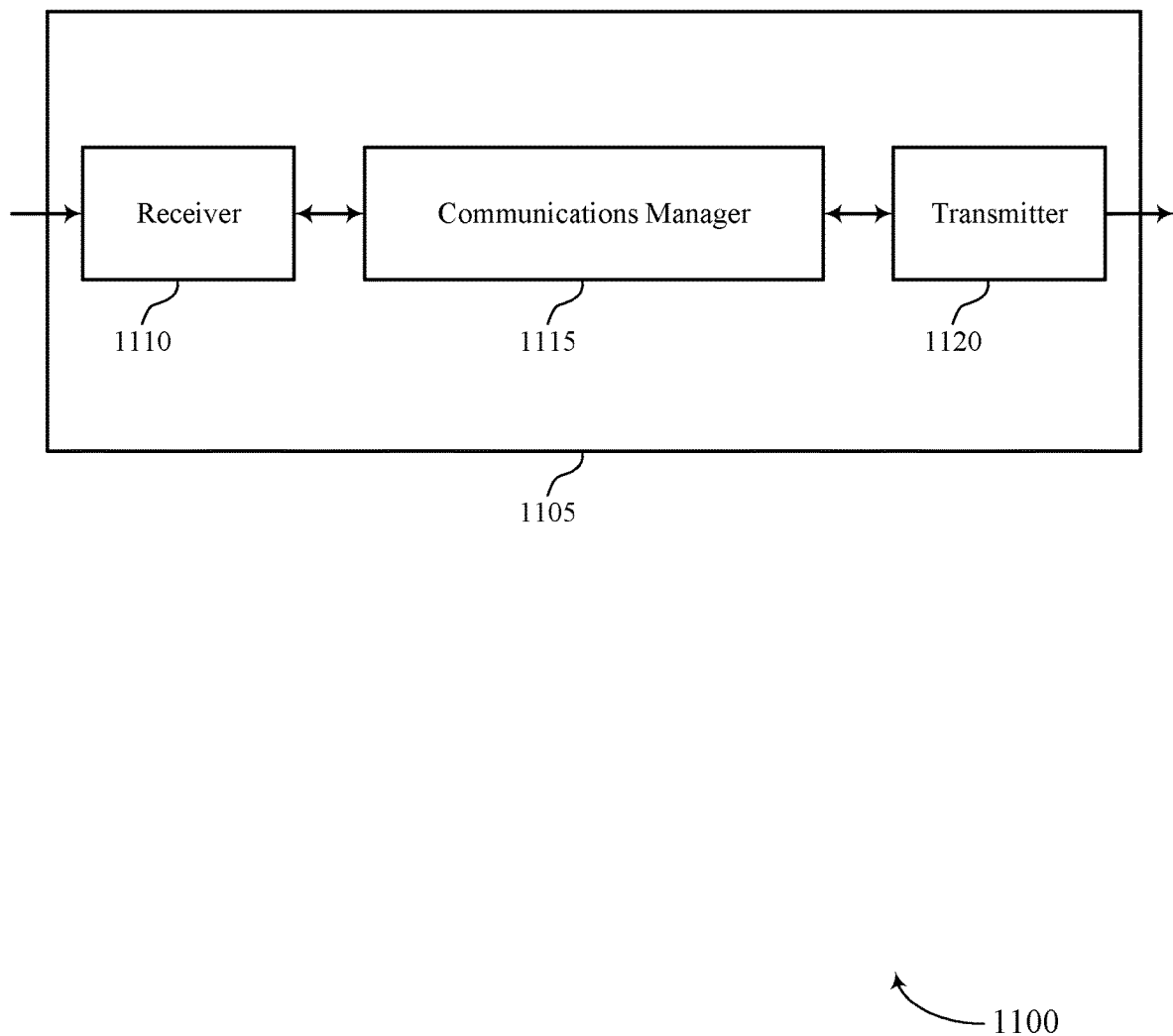
FIGS. 11 and 12 show block diagrams of devices that support DMRS configuration selection and reporting per TB and per CDM group in accordance with aspects of the present disclosure.

FIG. 11 shows a block diagram 1100 of a device 1105 that supports DMRS configuration selection and reporting per TB and per CDM group in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may provide a means for receiving signals comprising information such as packets, user data, control information, or any combination thereof associated with various information channels. For example, the receiver 1110 may receive information such as packets, user data, or control information associated with various information channels (e.g., control channels, data channels, and information related to DMRS configuration selection and reporting per TB and per CDM group, etc.). Information may be passed on to other components of the device 1105. The receiver 1110 may utilize a single antenna or a set of antennas. The receiver 1110 may be an example of aspects of the transceiver 1420 described with reference to FIG. 14.

The communications manager 1115 may provide a means for communicating information such as packets, user data, control information, or any combination thereof. In some cases, the receiver 1110 may transmit, to a UE, a first transmission that includes a first DMRS for each of set of groups of layers associated with the first transmission, the first DMRS for each of the set of groups of layers being configured in accordance with a first one or more DMRS configurations of a set of DMRS configurations, receive, from the UE, an indication of a second one or more DMRS configurations of the set of DMRS configurations based on a CSI-RS and a CSI-IM resource, the second one or more DMRS configurations including a DMRS configuration for each of the set of groups of layers, select a different DMRS configuration of the set of DMRS configurations for each of the set of groups of layers that are different than the first one or more DMRS configurations based on the indication of the second one or more DMRS configurations, and transmit, to the UE, a second transmission that includes a second DMRS for each of the set of groups of layers that are configured in accordance with the different DMRS configuration for each of the set of groups of layers. The communications manager 1115 may be an example of aspects of the communications manager 1410 described herein.

The transmitter 1120 may provide a means for transmitting signals generated by other components of the device 1105. For example, the transmitter 1120 may transmit may transmit information such as packets, user data, control information, or any combination thereof associated with various information channels (e.g., control channels, data channels, information channels related to DMRS configuration selection and reporting per TB and per CDM group, etc.). The transmitter 1120 may utilize a single antenna or a set of antennas. In some examples, the transmitter 1120 may be collocated with a receiver 1110 in a transceiver module. For example, the transmitter 1120 may be an example of aspects of the transceiver 1420 described with reference to FIG. 14.

The receiver 1110, communications manager 1115, transmitter 1120, or various combinations or components thereof may be examples of means for performing various aspects of DMRS configuration selection and reporting per TB and per CDM group as described herein. For example, the receiver 1110, communications manager 1115, transmitter 1120, or various combinations or components thereof may support a method for performing one or more of the functions described herein.

In some examples, the receiver 1110, communications manager 1115, transmitter 1120, or various combinations or components thereof may be implemented in hardware (e.g., in communications management circuitry). The hardware may include a processor, a DSP, an ASIC, an or other PLD, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the receiver 1110, communications manager 1115, transmitter 1120, or various combinations or components thereof may be implemented in code (e.g., as communications management software or firmware) executed by a processor. If implemented in code executed by a processor, the functions of the receiver 1110, communications manager 1115, transmitter 1120, or various combinations or components thereof may be executed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1115 may be configured to perform various operations (e.g., receiving, determining, selecting, transmitting) using or otherwise in cooperation with the receiver 1110, transmitter 1120, or both. For example, the communications manager 1115 may receive information from the receiver 1110, send information to the transmitter 1120, or be integrated in combination with the receiver 1110, the transmitter 1120, or both to receive information, transmit information, or perform various other operations as described herein.

The communications manager 1115 may support wireless communication at a UE in accordance with examples as disclosed herein. The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

As described herein, the device 1105 may receive an indication from a UE of a different DMRS configuration for each of a number of different groups of layers associated with a data transmission from the device 1105 to the UE. In some implementations, the UE may indicate DMRS configurations that optimize or maximize a communication efficiency metric (e.g., a spectral efficiency) between the device 1105 and the UE. The device 1105 may determine to use a DMRS configuration for each of the number of different groups of layers based on the DMRS configurations indicated by the UE and network scheduling criteria. As such, the device 1105 may balance an optimal spectral efficiency with scheduling priorities or interference management procedures at the device 1105, which may result in a greater achievable throughput between the device 1105 and the UE as well network efficiency.

Figure 12:
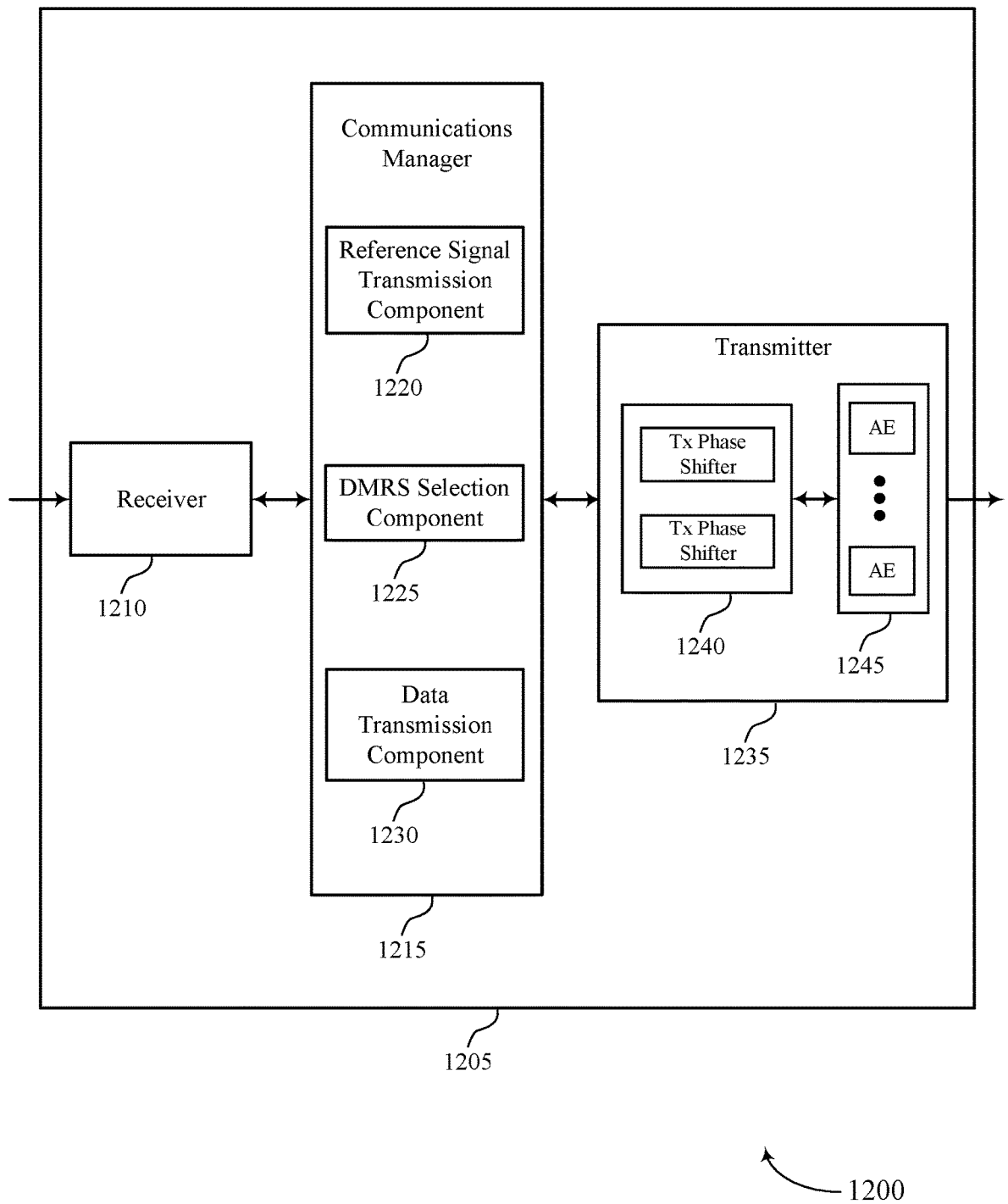

FIG. 12 shows a block diagram 1200 of a device 1205 that supports DMRS configuration selection and reporting per TB and per CDM group in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses). The device 1205 or various components thereof, may be an example of means for performing various aspects of DMRS configuration selection and reporting per TB and per CDM group as described herein.

The receiver 1210 may provide a means for receiving signals comprising information such as packets, user data, control information, or any combination thereof associated with various information channels. For example, the receiver 1210 may receive information such as packets, user data, or control information associated with various information channels (e.g., control channels, data channels, and information related to DMRS configuration selection and reporting per TB and per CDM group, etc.). Information may be passed on to other components of the device 1205. The receiver 1210 may utilize a single antenna or a set of antennas. In some case, the receiver 1210 may be an example of aspects of the transceiver 1420 described with reference to FIG. 14.

The communications manager 1215 may provide a means for communicating information such as packets, user data, control information, or any combination thereof. In some cases, the communications manager 1215 may be an example of aspects of the communications manager 1115 as described herein. The communications manager 1215 may include a reference signal transmission component 1220, a DMRS selection component 1225, and a data transmission component 1230. The communications manager 1215 may be an example of aspects of the communications manager 1410 described herein.

The reference signal transmission component 1220 may transmit, to a UE, a first transmission that includes a first DMRS for each of set of groups of layers associated with the first transmission, the first DMRS for each of the set of groups of layers being configured in accordance with a first one or more DMRS configurations of a set of DMRS configurations.

The DMRS selection component 1225 may receive, from the UE, an indication of a second one or more DMRS configurations of the set of DMRS configurations based on a CSI-RS and a CSI-IM resource, the second one or more DMRS configurations including a DMRS configuration for each of the set of groups of layers and select a different DMRS configuration of the set of DMRS configurations for each of the set of groups of layers that are different than the first one or more DMRS configurations based on the indication of the second one or more DMRS configurations.

The data transmission component 1230 may transmit, to the UE, a second transmission that includes a second DMRS for each of the set of groups of layers that are configured in accordance with the different DMRS configuration for each of the set of groups of layers.

The transmitter 1235 may provide a means for transmitting signals generated by other components of the device 805. For example, the transmitter 1235 may transmit information such as packets, user data, control information, or any combination thereof associated with various information channels (e.g., control channels, data channels, and information related to DMRS configuration selection and reporting per TB and per CDM group, etc.). The transmitter 1235 may utilize a single antenna or a set of antennas. In some examples, the transmitter 1235 may be collocated with a receiver 1210 in a transceiver module. For example, the transmitter 1235 may be an example of aspects of the transceiver 1420 described with reference to FIG. 14.

The transmitter 1235 may include one or more phase shifters 1240 and one or more antenna elements 1245. The phase shifter 1240 may provide a configurable phase shift or phase offset to a corresponding radio frequency signal to be transmitted on a respective antenna element 1245. The settings of each of the phase shifters 1240 may be independent, meaning that each can be set to provide a desired amount of phase shift or the same amount of phase shift or some other configuration. A modem or other processor may have at least one control line connected to each of the phase shifters 1240 and which may be used to configure the phase shifters 1240 to provide a desired amounts of phase shift or phase offset between antenna elements 1245.

In some implementations, changing or receiving a transmit or receive beam comprises adjusting relative phase shifts for signals on different antenna elements 1245. The relative phase shifts may be achieved by the modem adjusting the phase shift of one or more phase shifters 1240. The set of phases for different phase shifters 1240 (and corresponding antenna elements 1245) may comprise the spatial receive parameters or spatial transmit parameters for a respective beam. To receive or transmit on a beam, the spatial parameters may need to be set before the beginning of the transmitting or receiving.

Figure 13:
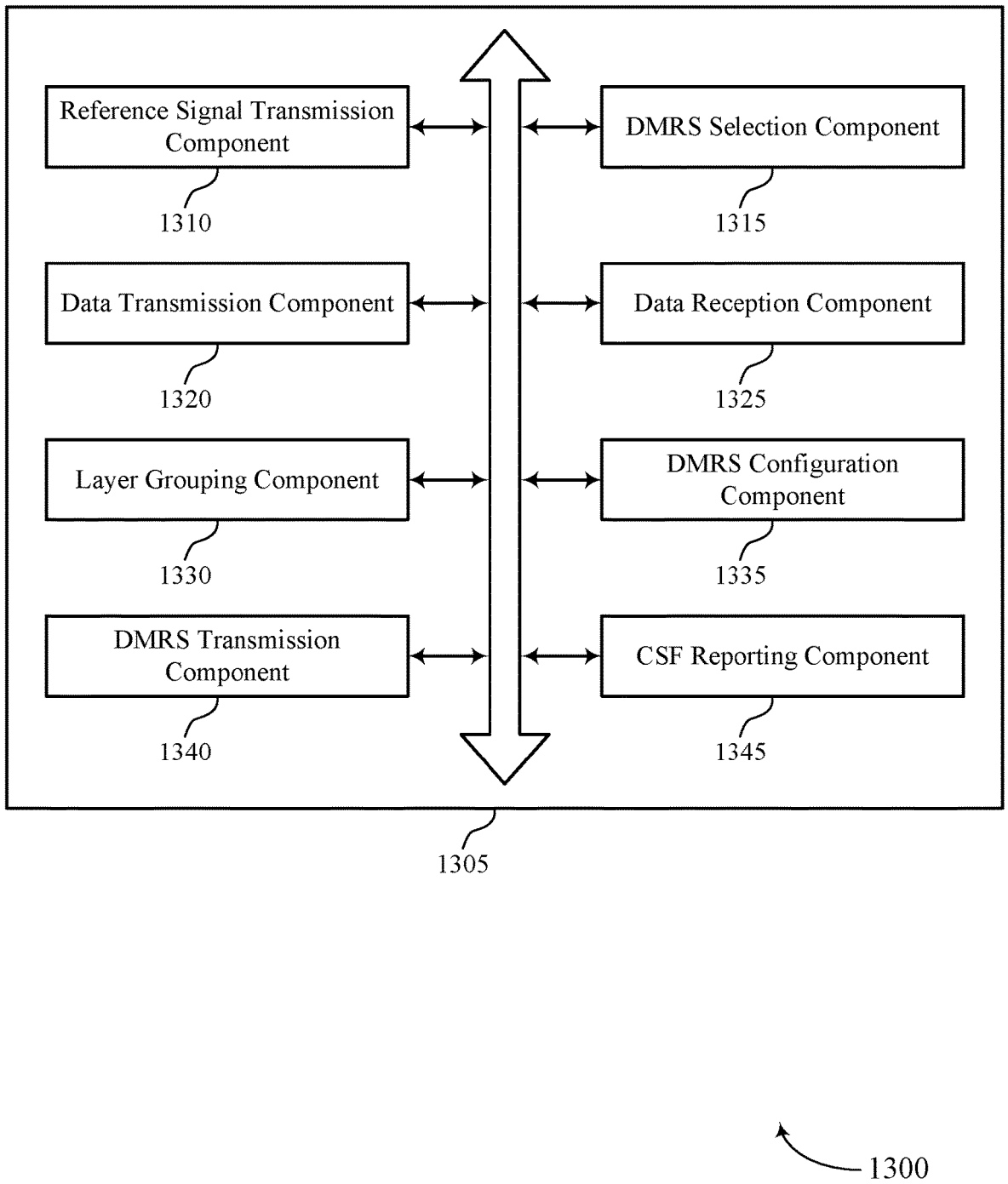
FIG. 13 shows a block diagram of a communications manager that supports DMRS configuration selection and reporting per TB and per CDM group in accordance with aspects of the present disclosure.

FIG. 13 shows a block diagram 1300 of a communications manager 1305 that supports DMRS configuration selection and reporting per TB and per CDM group in accordance with aspects of the present disclosure. The communications manager 1305 may be an example of aspects of a communications manager 1115, a communications manager 1215, or a communications manager 1410 described herein. The communications manager 1305 may include a reference signal transmission component 1310, a DMRS selection component 1315, a data transmission component 1320, a data reception component 1325, a layer grouping component 1330, a DMRS configuration component 1335, a DMRS transmission component 1340, and a CSF reporting component 1345. Each of these modules may communicate, directly or indirectly, with one another (e.g., via one or more buses).

The reference signal transmission component 1310 may transmit, to a UE, a first transmission that includes a first DMRS for each of set of groups of layers associated with the first transmission, the first DMRS for each of the set of groups of layers being configured in accordance with a first one or more DMRS configurations of a set of DMRS configurations.

The DMRS selection component 1315 may receive, from the UE, an indication of a second one or more DMRS configurations of the set of DMRS configurations based on a CSI-RS and a CSI-IM resource, the second one or more DMRS configurations including a DMRS configuration for each of the set of groups of layers. In some examples, the DMRS selection component 1315 may select a different DMRS configuration of the set of DMRS configurations for each of the set of groups of layers that are different than the first one or more DMRS configurations based on the indication of the second one or more DMRS configurations.

In some examples, the DMRS selection component 1315 may select the second one or more DMRS configurations based on the indication of the second one or more DMRS configurations, where the second DMRS for each of the set of groups of layers are configured in accordance with the second one or more DMRS configurations. In some examples, the DMRS selection component 1315 may transmit, to the UE, downlink control information including a bit indicating that the different DMRS configuration for each of the set of groups of layers are the same as the second one or more DMRS configurations indicated by the UE in a last received indication.

In some examples, the DMRS selection component 1315 may select a third one or more DMRS configurations based on the second one or more DMRS configurations, where the second DMRS for each of the set of groups of layers are configured in accordance with the third one or more DMRS configurations. In some examples, the DMRS selection component 1315 may identify a set of DMRS configurations based on the second one or more DMRS configurations or a UE capability, or both.

In some examples, the DMRS selection component 1315 may transmit, to the UE, a MAC-CE activating a subset of DMRS configurations. In some examples, the DMRS selection component 1315 may transmit, to the UE, downlink control information indicating one or more DMRS configurations of the subset of DMRS configurations, where each of the one or more DMRS configurations correspond to a group of layers of the set of groups of layers.

In some cases, the different DMRS configuration for each of the set of groups of layers include a first DMRS configuration for a first group of layers and a second DMRS configuration for a second group of layers. In some cases, the first one or more DMRS configurations and the second one or more DMRS configurations include different DMRS configurations for each of the set of groups of layers.

The data transmission component 1320 may transmit, to the UE, a second transmission that includes a second DMRS for each of the set of groups of layers that are configured in accordance with the different DMRS configuration for each of the set of groups of layers. In some examples, the data transmission component 1320 may allocate the third quantity of resource elements to a data transmission.

The data reception component 1325 may transmit the data transmission including the one or more TBs, where each TB of the one or more TBs is associated with a different DMRS based on the different DMRS configuration for each of the set of groups of layers. In some examples, the data reception component 1325 may transmit the data transmission including different DMRS ports associated with each of the one or more CDM groups, where each CDM group of the one or more CDM groups is associated with a different DMRS based on the different DMRS configuration for each of the set of groups of layers.

The layer grouping component 1330 may receive a second indication of a grouping for a quantity of layers associated with a data transmission, where the set of groups of layers are based on the grouping for the quantity of layers. In some examples, the layer grouping component 1330 may determine one or more CDM groups corresponding to the set of groups of layers based on the grouping for the quantity of layers, a selected RI, and a CDM group size. In some examples, the layer grouping component 1330 may determine an index of precoding matrix as precoding coefficients for each layer related to each of the one or more CDM groups based on the grouping indication for each layer of the quantity of layers to a CDM group.

The DMRS configuration component 1335 may determine that the first DMRS configuration includes a first quantity of resource elements in a corresponding first set of one or more CDM groups and that the second DMRS configuration includes a second quantity of resource elements in a corresponding second set of one or more CDM groups, where the first quantity of resource elements includes a third quantity of resource elements less than the second quantity of resource elements. In some examples, the DMRS configuration component 1335 may determine that the first DMRS configuration includes a first quantity of resource elements and that the second DMRS configuration includes a second quantity of resource elements, where the first quantity of resource elements includes a third quantity of resource elements less than the second quantity of resource elements, the third quantity of resource elements unused for data or DMRS transmission.

The DMRS transmission component 1340 may boost a power level for communication over a first group of DMRS ports associated with the first group of layers and over a second group of DMRS ports associated with the second group of layers.

The CSF reporting component 1345 may transmit, to the UE, a message that configures the UE to use a CSF report format that includes a field for indicating a DMRS configuration for each of the set of groups of layers. In some examples, the CSF reporting component 1345 may receive a CSF report including the indication of the second one or more DMRS configurations.

Figure 14:
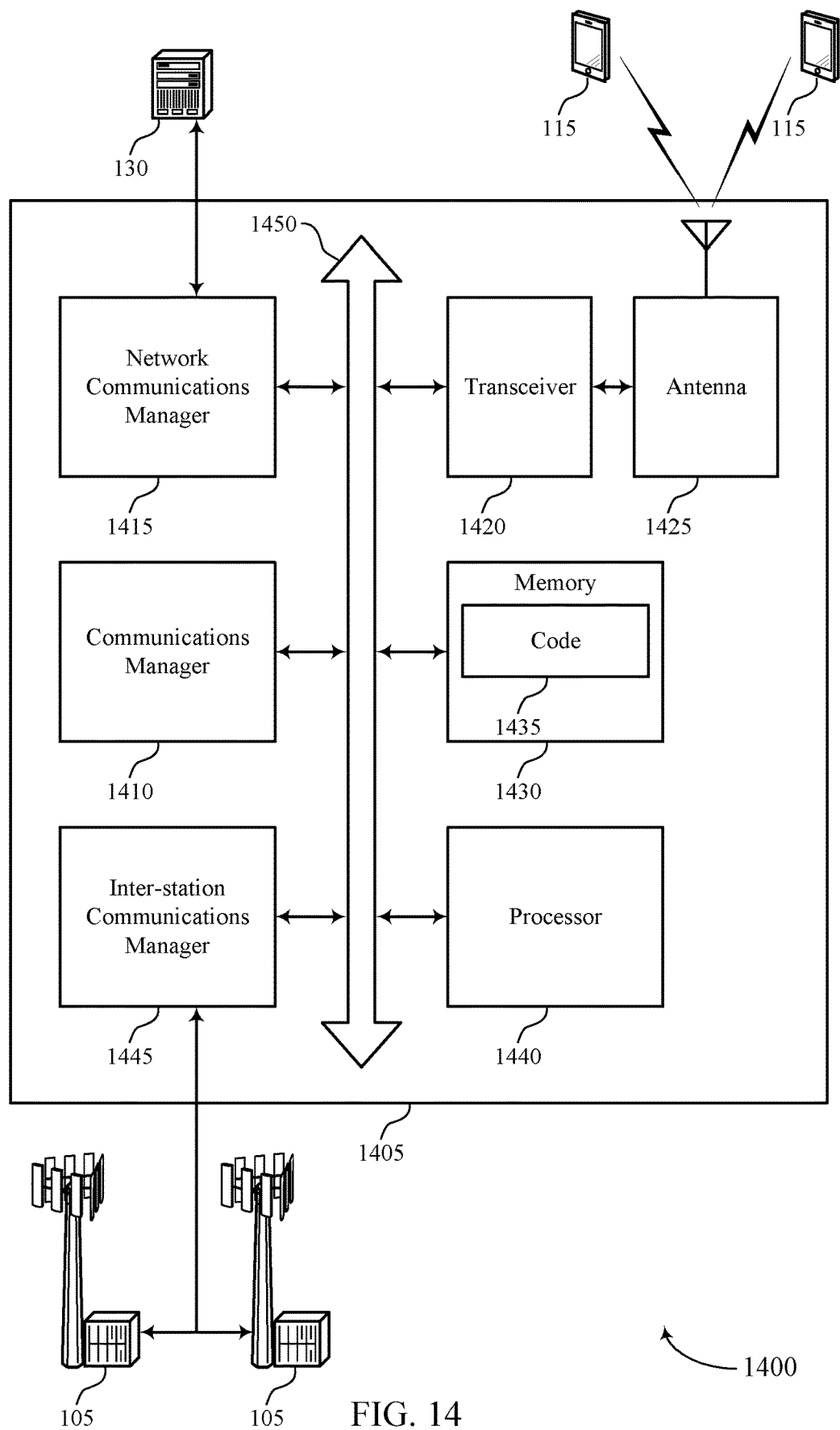
FIG. 14 shows a diagram of a system including a device that supports DMRS configuration selection and reporting per TB and per CDM group in accordance with aspects of the present disclosure.

FIG. 14 shows a diagram of a system 1400 including a device 1405 that supports DMRS configuration selection and reporting per TB and per CDM group in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit, to a UE, a first transmission that includes a first DMRS for each of set of groups of layers associated with the first transmission, the first DMRS for each of the set of groups of layers being configured in accordance with a first one or more DMRS configurations of a set of DMRS configurations, receive, from the UE, an indication of a second one or more DMRS configurations of the set of DMRS configurations based on a CSI-RS and a CSI-IM resource, the second one or more DMRS configurations including a DMRS configuration for each of the set of groups of layers, select a different DMRS configuration of the set of DMRS configurations for each of the set of groups of layers that are different than the first one or more DMRS configurations based on the indication of the second one or more DMRS configurations, and transmit, to the UE, a second transmission that includes a second DMRS for each of the set of groups of layers that are configured in accordance with the different DMRS configuration for each of the set of groups of layers.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting DMRS configuration selection and reporting per TB and per CDM group).

The inter-station communications manager 1445 may manage communications with other base station 105 and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
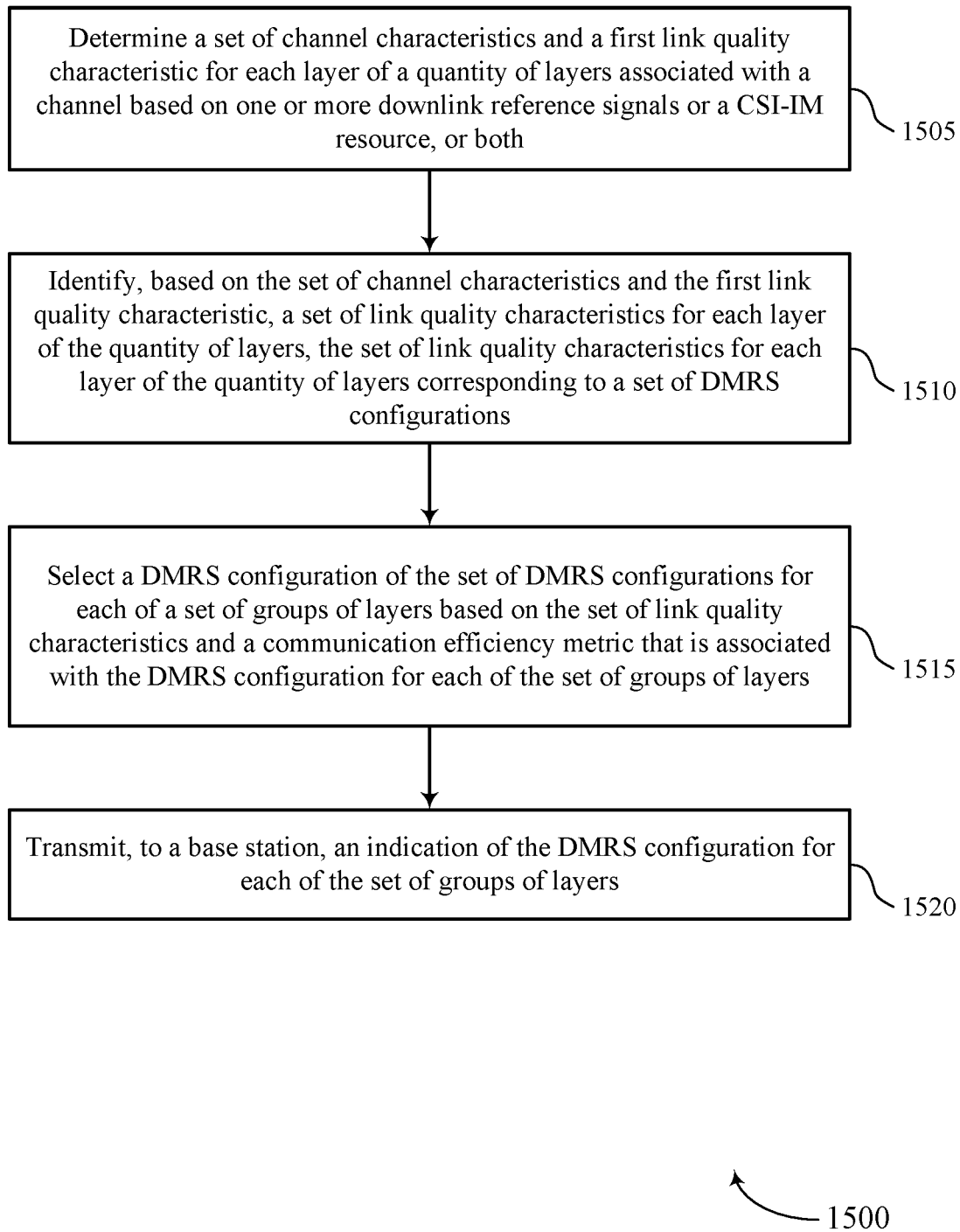
FIGS. 15 through 18 show flowcharts illustrating methods that support DMRS configuration selection and reporting per TB and per CDM group in accordance with aspects of the present disclosure.

FIG. 15 shows a flowchart illustrating a method 1500 that supports DMRS configuration selection and reporting per TB and per CDM group in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1505, the UE may determine a set of channel characteristics and a first link quality characteristic for each layer of a quantity of layers associated with a channel based on one or more downlink reference signals or a CSI-IM resource, or both. The operations of 1505 may be performed according to the methods described herein. In some examples, aspects of the operations of 1505 may be performed by a channel estimation component as described with reference to FIGS. 7 through 10.

At 1510, the UE may identify, based on the set of channel characteristics and the first link quality characteristic, a set of link quality characteristics for each layer of the quantity of layers, the set of link quality characteristics for each layer of the quantity of layers corresponding to a set of DMRS configurations. The operations of 1510 may be performed according to the methods described herein. In some examples, aspects of the operations of 1510 may be performed by a data channel estimation component as described with reference to FIGS. 7 through 10.

At 1515, the UE may select a DMRS configuration of the set of DMRS configurations for each of a set of groups of layers based on the set of link quality characteristics and a communication efficiency metric that is associated with the DMRS configuration for each of the set of groups of layers. The operations of 1515 may be performed according to the methods described herein. In some examples, aspects of the operations of 1515 may be performed by a DMRS selection component as described with reference to FIGS. 7 through 10.

At 1520, the UE may transmit, to a base station, an indication of the DMRS configuration for each of the set of groups of layers. The operations of 1520 may be performed according to the methods described herein. In some examples, aspects of the operations of 1520 may be performed by a DMRS transmission component as described with reference to FIGS. 7 through 10.

Figure 16:
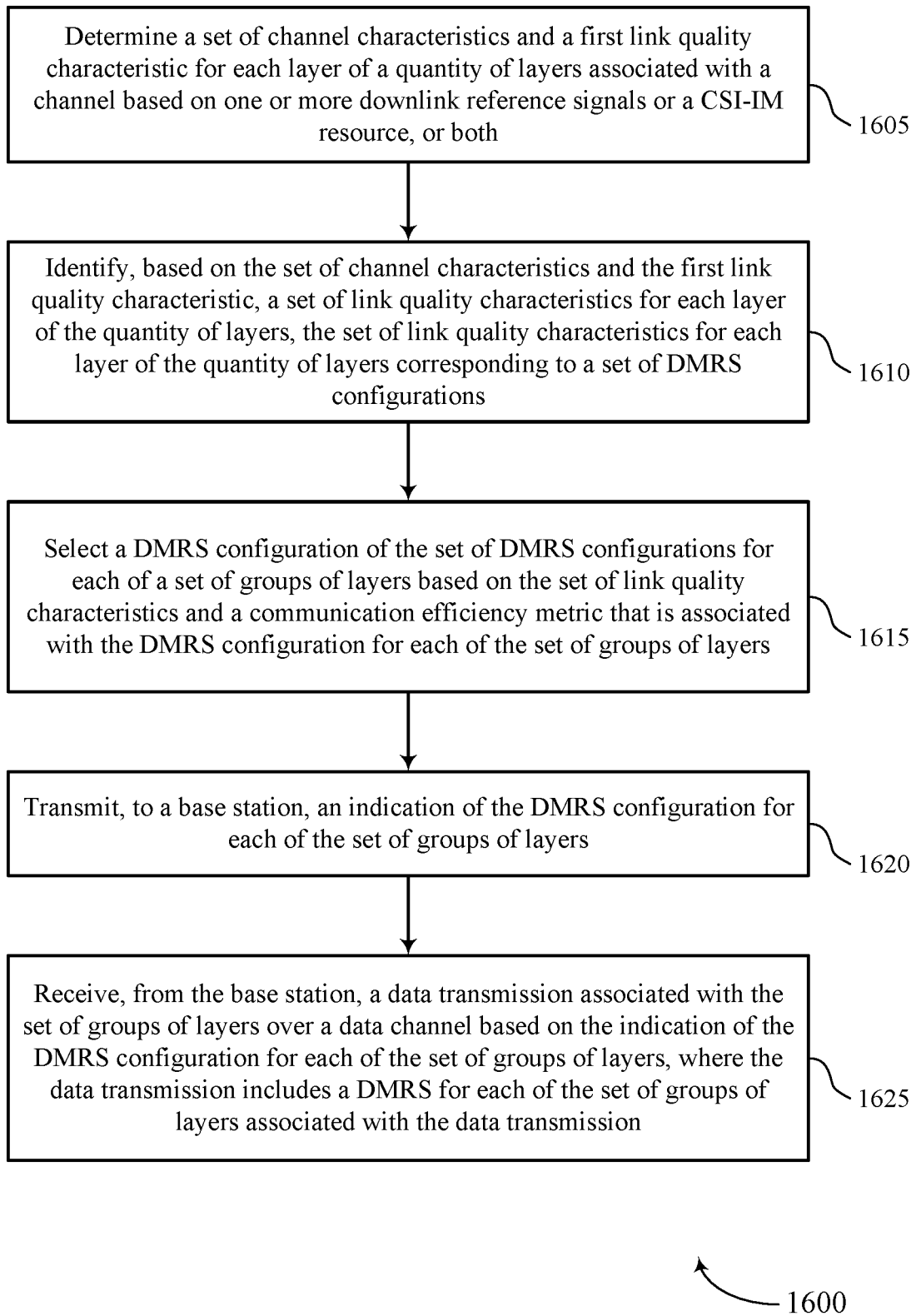

FIG. 16 shows a flowchart illustrating a method 1600 that supports DMRS configuration selection and reporting per TB and per CDM group in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1605, the UE may determine a set of channel characteristics and a first link quality characteristic for each layer of a quantity of layers associated with a channel based on one or more downlink reference signals or a CSI-IM resource, or both. The operations of 1605 may be performed according to the methods described herein. In some examples, aspects of the operations of 1605 may be performed by a channel estimation component as described with reference to FIGS. 7 through 10.

At 1610, the UE may identify, based on the set of channel characteristics and the first link quality characteristic, a set of link quality characteristics for each layer of the quantity of layers, the set of link quality characteristics for each layer of the quantity of layers corresponding to a set of DMRS configurations. The operations of 1610 may be performed according to the methods described herein. In some examples, aspects of the operations of 1610 may be performed by a data channel estimation component as described with reference to FIGS. 7 through 10.

At 1615, the UE may select a DMRS configuration of the set of DMRS configurations for each of a set of groups of layers based on the set of link quality characteristics and a communication efficiency metric that is associated with the DMRS configuration for each of the set of groups of layers. The operations of 1615 may be performed according to the methods described herein. In some examples, aspects of the operations of 1615 may be performed by a DMRS selection component as described with reference to FIGS. 7 through 10.

At 1620, the UE may transmit, to a base station, an indication of the DMRS configuration for each of the set of groups of layers. The operations of 1620 may be performed according to the methods described herein. In some examples, aspects of the operations of 1620 may be performed by a DMRS transmission component as described with reference to FIGS. 7 through 10.

At 1625, the UE may receive, from the base station, a data transmission associated with the set of groups of layers over a data channel based on the indication of the DMRS configuration for each of the set of groups of layers, where the data transmission includes a DMRS for each of the set of groups of layers associated with the data transmission. The operations of 1625 may be performed according to the methods described herein. In some examples, aspects of the operations of 1625 may be performed by a data reception component as described with reference to FIGS. 7 through 10.

Figure 17:
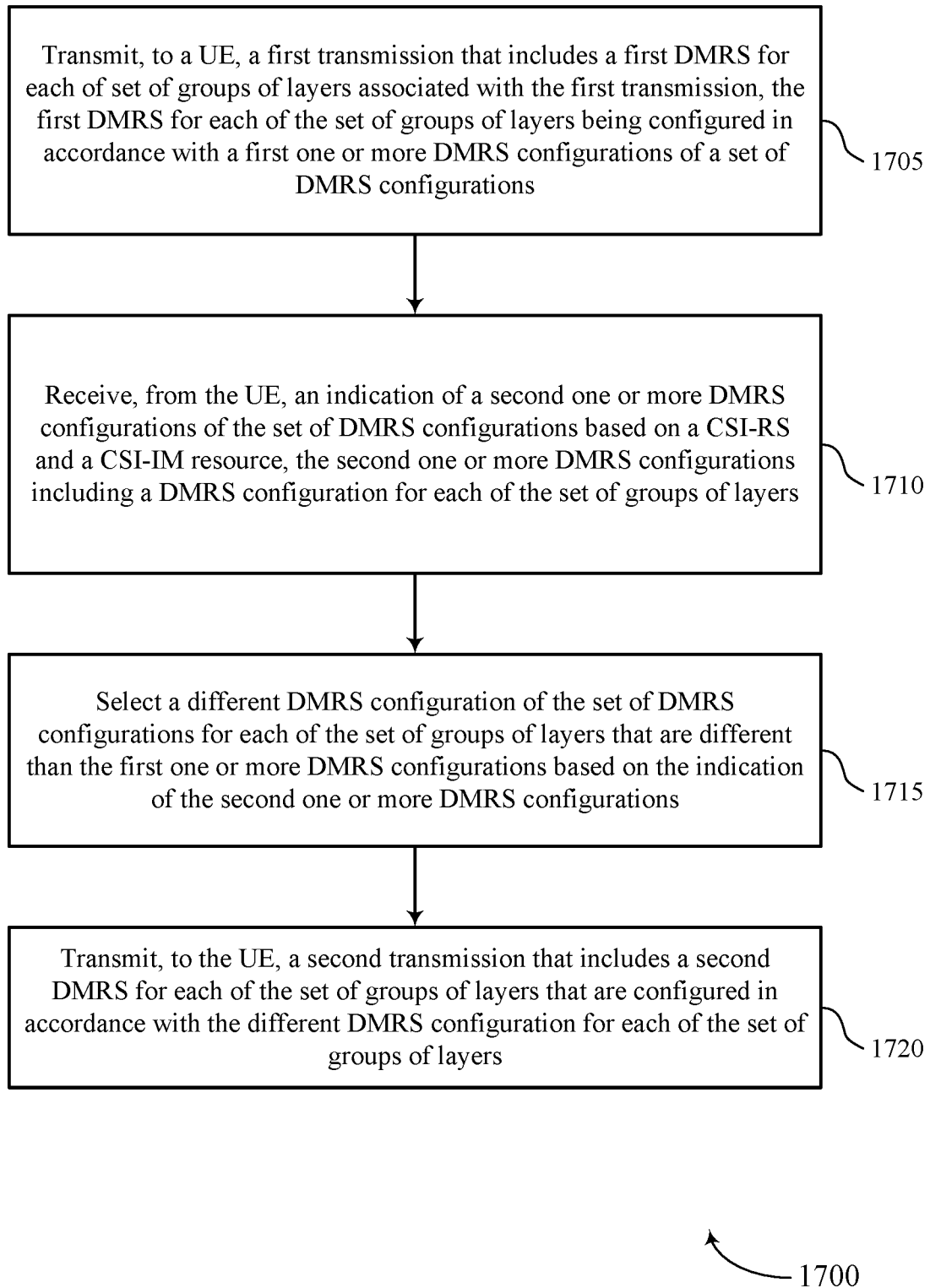

FIG. 17 shows a flowchart illustrating a method 1700 that supports DMRS configuration selection and reporting per TB and per CDM group in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1705, the base station may transmit, to a UE, a first transmission that includes a first DMRS for each of set of groups of layers associated with the first transmission, the first DMRS for each of the set of groups of layers being configured in accordance with a first one or more DMRS configurations of a set of DMRS configurations. The operations of 1705 may be performed according to the methods described herein. In some examples, aspects of the operations of 1705 may be performed by a reference signal transmission component as described with reference to FIGS. 11 through 14.

At 1710, the base station may receive, from the UE, an indication of a second one or more DMRS configurations of the set of DMRS configurations based on a CSI-RS and a CSI-IM resource, the second one or more DMRS configurations including a DMRS configuration for each of the set of groups of layers. The operations of 1710 may be performed according to the methods described herein. In some examples, aspects of the operations of 1710 may be performed by a DMRS selection component as described with reference to FIGS. 11 through 14.

At 1715, the base station may select a different DMRS configuration of the set of DMRS configurations for each of the set of groups of layers that are different than the first one or more DMRS configurations based on the indication of the second one or more DMRS configurations. The operations of 1715 may be performed according to the methods described herein. In some examples, aspects of the operations of 1715 may be performed by a DMRS selection component as described with reference to FIGS. 11 through 14.

At 1720, the base station may transmit, to the UE, a second transmission that includes a second DMRS for each of the set of groups of layers that are configured in accordance with the different DMRS configuration for each of the set of groups of layers. The operations of 1720 may be performed according to the methods described herein. In some examples, aspects of the operations of 1720 may be performed by a data transmission component as described with reference to FIGS. 11 through 14.

Figure 18:
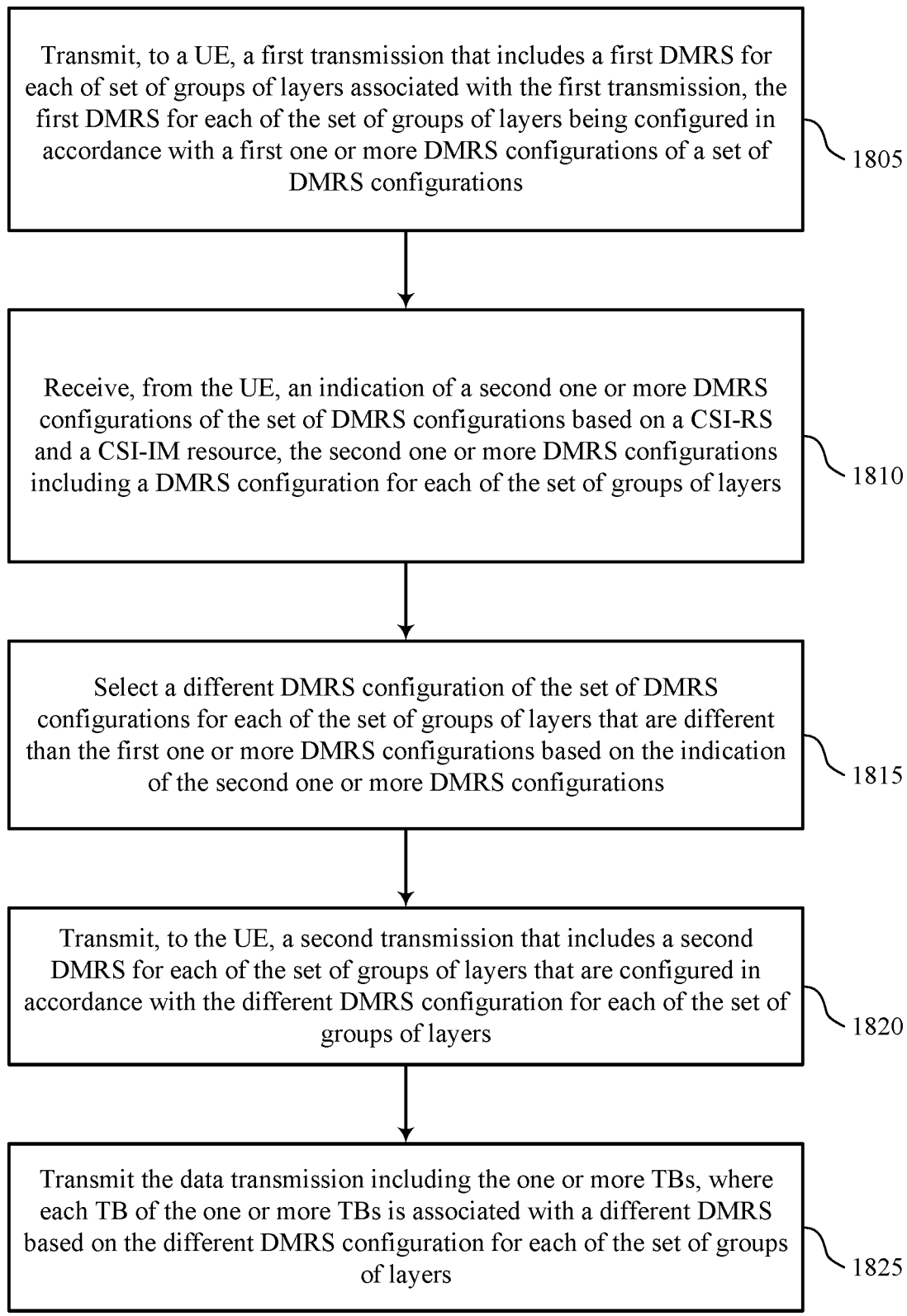

FIG. 18 shows a flowchart illustrating a method 1800 that supports DMRS configuration selection and reporting per TB and per CDM group in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1805, the base station may transmit, to a UE, a first transmission that includes a first DMRS for each of set of groups of layers associated with the first transmission, the first DMRS for each of the set of groups of layers being configured in accordance with a first one or more DMRS configurations of a set of DMRS configurations. The operations of 1805 may be performed according to the methods described herein. In some examples, aspects of the operations of 1805 may be performed by a reference signal transmission component as described with reference to FIGS. 11 through 14.

At 1810, the base station may receive, from the UE, an indication of a second one or more DMRS configurations of the set of DMRS configurations based on a CSI-RS and a CSI-IM resource, the second one or more DMRS configurations including a DMRS configuration for each of the set of groups of layers. The operations of 1810 may be performed according to the methods described herein. In some examples, aspects of the operations of 1810 may be performed by a DMRS selection component as described with reference to FIGS. 11 through 14.

At 1815, the base station may select a different DMRS configuration of the set of DMRS configurations for each of the set of groups of layers that are different than the first one or more DMRS configurations based on the indication of the second one or more DMRS configurations. The operations of 1815 may be performed according to the methods described herein. In some examples, aspects of the operations of 1815 may be performed by a DMRS selection component as described with reference to FIGS. 11 through 14.

At 1820, the base station may transmit, to the UE, a second transmission that includes a second DMRS for each of the set of groups of layers that are configured in accordance with the different DMRS configuration for each of the set of groups of layers. The operations of 1820 may be performed according to the methods described herein. In some examples, aspects of the operations of 1820 may be performed by a data transmission component as described with reference to FIGS. 11 through 14.

At 1825, the base station may transmit the data transmission including the one or more TBs, where each TB of the one or more TBs is associated with a different DMRS based on the different DMRS configuration for each of the set of groups of layers. The operations of 1825 may be performed according to the methods described herein. In some examples, aspects of the operations of 1825 may be performed by a data reception component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

The following examples are given by way of illustration. Aspects of the following examples may be combined with aspects or embodiments shown or discussed in relation to the figures or elsewhere herein.

Aspect 1 is a method of wireless communications at a UE that includes determining a set of channel characteristics and a first link quality characteristic for each layer of a quantity of layers associated with a channel based at least in part on one or more downlink reference signals or a CSI-IM resource, or both; identifying, based at least in part on the set of channel characteristics and the first link quality characteristic, a plurality of link quality characteristics for each layer of the quantity of layers, the plurality of link quality characteristics for each layer of the quantity of layers corresponding to a plurality of DMRS configurations; selecting a DMRS configuration of the plurality of DMRS configurations for each of a plurality of groups of layers based at least in part on the plurality of link quality characteristics and a communication efficiency metric that is associated with the DMRS configuration for each of the plurality of groups of layers; and transmitting, to a base station, an indication of the DMRS configuration for each of the plurality of groups of layers.

In Aspect 2, the method of aspect 1 includes receiving, from the base station, a data transmission associated with the plurality of groups of layers over a data channel based at least in part on the indication of the DMRS configuration for each of the plurality of groups of layers, wherein the data transmission comprises a DMRS for each of the plurality of groups of layers associated with the data transmission.

In Aspect 3, the plurality of groups of layers of aspect 2 may correspond to a plurality of TBs and the method of aspect 2 includes receiving the data transmission comprising the plurality of TBs, wherein each TB of the plurality of TBs is associated with a different DMRS based at least in part on the indication of the DMRS configuration for each of the plurality of groups of layers.

In Aspect 4, the plurality of groups of layers of any of aspects 2 or 3 may correspond to a plurality of CDM groups and the method of any of aspects 2 or 3 includes receiving the data transmission comprising the plurality of CDM groups, wherein each CDM group of the plurality of CDM groups is associated with a different DMRS based at least in part on the indication of the DMRS configuration for each of the plurality of groups of layers.

In Aspect 5, the method of any of aspects 1-4 includes generating a report that includes the indication of the DMRS configuration for each of the plurality of groups of layers; and transmitting the report to the base station, wherein transmitting the indication comprises transmitting the report to the base station.

In Aspect 6, the report of aspect 5 comprises a field for indicating the DMRS configuration for each of the plurality of groups of layers, a size of the field being based at least in part on a quantity of the plurality of DMRS configurations.

In Aspect 7, the method of any of aspects 5 or 6 includes determining a grouping for the quantity of layers associated with a data transmission based at least in part on a CDM group size, wherein the plurality of groups of layers are based at least in part on the grouping for the quantity of layers; and transmitting a second indication of the grouping for the quantity of layers in the report.

In Aspect 8, the method of aspect 7 includes determining the quantity of layers based at least in part on a selected rank indication of the data transmission.

In Aspect 9, determining the grouping for the quantity of layers in the method of any of aspects 7 or 8 includes determining a second link quality characteristic for each layer of the quantity of layers associated with a selected rank indication based at least in part on the first link quality characteristic for each layer of the quantity of layers and a mapping; determining a difference of the second link quality characteristic between each layer of the quantity of layers; and determining the grouping for the quantity of layers such that the difference of the second link quality characteristic between each layer of a single group of layers comprises a smallest difference of the second link quality characteristic.

In Aspect 10, the report of any of aspects 5-9 comprises a first index associated with a first DMRS configuration, the first index corresponding to one or more indexes associated with a group of layers of the plurality of groups of layers that are related to the first DMRS configuration.

In Aspect 11, the group of layers of the plurality of groups of layers of aspect 10 corresponds to a CDM group or a TB.

In Aspect 12, each index of the one or more indexes of any of aspects 10 or 11 corresponds to a column of a precoding matrix.

In Aspect 13, the report of any of aspects 5-12 is coupled with a CSF report or comprises the CSF report.

In Aspect 14, the method of any of aspects 1-13 includes identifying, for a first DMRS configuration, a second link quality characteristic for each of the quantity of layers based at least in part on the first link quality characteristic for the quantity of layers and a mapping, wherein the plurality of link quality characteristics comprises the second link quality characteristic; and determining a first group of layers comprising a subset of the quantity of layers based at least in part on the second link quality characteristic for each of the quantity of layers.

In Aspect 15, selecting the DMRS configuration for each of the plurality of groups of layers in the method of any of aspects 1 through 14 includes determining a first value for the communication efficiency metric for a first group of layers based at least in part on a temporal density, a frequency density, a first power level for a first DMRS configuration relative to a second power level for a data transmission, and the second link quality characteristic for the first group of layers for the first DMRS configuration; determining, for each remaining DMRS configuration of the plurality of DMRS configurations for the first group of layers, a first plurality of values for the communication efficiency metric based at least in part on respective temporal densities, respective frequency densities, respective power levels relative to the second power level for the data transmission, and respective second link quality characteristics of each of the remaining DMRS configurations; determining that the first value for the communication efficiency metric associated with the first DMRS configuration is different from (e.g., greater than) the first plurality of values for the communication efficiency metric associated with each of the remaining DMRS configurations; and selecting the first DMRS configuration for the first group of layers.

In Aspect 16, the method of aspect 15 includes determining that a second value for the communication efficiency metric associated with a second DMRS configuration for a second group of layers is different from (e.g., greater than) a second plurality of values for the communication efficiency metric associated with each of the remaining DMRS configurations for the second group of layers; and selecting the second DMRS configuration for the second group of layers.

In Aspect 17, the first DMRS configuration of aspect 16 is associated with a lower temporal density or a lower frequency density, or both, relative to the second DMRS configuration and the method of aspect 16 includes determining that the first DMRS configuration comprises a first quantity of resource elements in a corresponding first set of one or more CDM groups and that the second DMRS configuration comprises a second quantity of resource elements in a corresponding second set of one or more CDM groups, wherein the first quantity of resource elements comprises a third quantity of resource elements less than the second quantity of resource elements; and receiving the data transmission over the third quantity of resource elements.

In Aspect 18, the first DMRS configuration of aspect 16 is associated with a lower temporal density or a lower frequency density, or both, relative to the second DMRS configuration and the method of aspect 16 includes determining that the first DMRS configuration comprises a first quantity of resource elements and that the second DMRS configuration comprises a second quantity of resource elements, wherein the first quantity of resource elements comprises a third quantity of resource elements less than the second quantity of resource elements, the third quantity of resource elements unused for data or DMRS transmission; and receiving, from the base station, communication over a first group of DMRS ports associated with the first group of layers and over a second group of DMRS ports associated with the second group of layers having a boosted power level.

In Aspect 19, the first DMRS configuration of aspect 16 is associated with a low frequency density relative to the second DMRS configuration and the method of aspect 16 includes determining that the first DMRS configuration comprises a first quantity of resource elements and that the second DMRS configuration comprises a second quantity of resource elements, wherein the first quantity of resource elements comprises a third quantity of resource elements less than the second quantity of resource elements, the third quantity of resource elements unused for data or DMRS transmission; and performing a thermal and interference noise estimation procedure using the third quantity of resource elements that are unused for data or DMRS transmission.

In Aspect 20, the method of any of aspects 1-19 includes determining the plurality of groups of layers, each of the plurality of groups of layers associated with one of a plurality of TRPs, wherein determining the DMRS configuration for each of the plurality of groups of layers comprises determining the DMRS configuration for the TRP associated with each of the plurality of groups of layers.

In Aspect 21, the plurality of groups of layers of aspect 20 correspond to a plurality of CDM groups.

In Aspect 22, the plurality of groups of layers of any of aspects 1-21 correspond to one or more TBs and the method of any of aspects 1-21 includes determining a channel quality indicator for each of the one or more TBs based at least in part on the selected DMRS configuration for each of the one or more TBs; and transmitting, to the base station, a second indication of the channel quality indicator defined based at least in part on the selected DMRS configuration for each of the one or more TBs.

In Aspect 23, the plurality of groups of layers of any of aspects 1-22 correspond to a plurality of involved CDM groups and a single TB and the method of any of aspects 1-22 includes determining a second link quality characteristic for each layer of the quantity of layers based at least in part on the first link quality characteristic and a mapping, wherein layer association to each of the plurality of involved CDM groups is based at least in part on the second link quality characteristic for each layer of the quantity of layers; identifying a group of layers of the plurality of groups of layers associated with a greatest second link quality characteristic, wherein the group of layers corresponds to a CDM group; determining a channel quality indicator for the single TB based at least in part on the DMRS configuration for the group of layers associated with the greatest second link quality characteristic; and transmitting, to the base station, a second indication of the channel quality indicator for the single TB.

In Aspect 24, the method of aspect 23 includes determining a channel delay spread characteristic for each of the plurality of groups of layers based at least in part on the first link quality characteristic, wherein determining the second link quality characteristic for each layer of the quantity of layers is based at least in part on the channel delay spread characteristic for corresponding groups of layers.

In Aspect 25, the method of any of aspects 1-24 includes receiving, from the base station, a MAC-CE activating a subset of DMRS configurations; and receiving, from the base station, downlink control information indicating one or more DMRS configurations of the subset of DMRS configurations, wherein each of the one or more DMRS configurations correspond to a group of layers of the plurality of groups of layers.

In Aspect 26, the method of any of aspects 1-25 includes receiving, from the base station, downlink control information comprising a bit indicating whether the DMRS configuration for each of the plurality of groups of layers of a scheduled allocation are the same as the DMRS configuration for each of the plurality of groups of layers selected by the UE in a last delivered indication regarding the selected DMRS configurations.

In Aspect 27, the method of any of aspects 1-26 includes generating a CSF report based at least in part on a joint coding of the indication of the selected DMRS configuration for each of the plurality of groups of layers and a channel quality indicator for each of the plurality of groups of layers, respectively; and transmitting the CSF report to the base station, wherein transmitting the indication comprises transmitting the CSF report to the base station.

In Aspect 28, identifying the plurality of link quality characteristics for each layer of the quantity of layers corresponding to the plurality of DMRS configurations in the method of any of aspects 1-27 includes identifying, for a CSI-RS configuration and the set of channel characteristics, a mapping from a plurality of mappings, wherein the mapping comprises a plurality of adjustments; adjusting the first link quality characteristic based at least in part on the plurality of adjustments; and determining the plurality of link quality characteristics based at least in part on the adjusting.

In Aspect 29, each of the plurality of mappings of aspect 28 is associated with a different combination of CSI-RS configurations and values for the set of channel characteristics.

In Aspect 30, the plurality of groups of layers in the method of any of aspects 1-29 correspond to one or more groups of DMRS ports related to one or more CDM groups, and wherein one or more TBs are associated with the one or more CDM groups.

In Aspect 31, selecting the DMRS configuration of the plurality of DMRS configurations for each of the plurality of groups of layers in the method of aspect 30 includes selecting the DMRS configuration of the plurality of DMRS configurations for each of the one or more CDM groups or for each of the one or more TBs, or both.

In Aspect 32, the one or more downlink reference signals in the method of any of aspects 1-31 comprise a CSI-RS, a TRS, a PTRS, or any combination thereof.

Aspect 33 is a method of wireless communication at a base station that includes transmitting, to a user equipment, a first transmission that comprises a first DMRS for each of a plurality of groups of layers associated with the first transmission, the first DMRS for each of the plurality of groups of layers being configured in accordance with a first one or more DMRS configurations of a plurality of DMRS configurations; receiving, from the user equipment, an indication of a second one or more DMRS configurations of the plurality of DMRS configurations based at least in part on a channel state information reference signal (CSI-RS) and a CSI-IM resource, the second one or more DMRS configurations comprising a DMRS configuration for each of the plurality of groups of layers; selecting a different DMRS configuration of the plurality of DMRS configurations for each of the plurality of groups of layers that are different than the first one or more DMRS configurations based at least in part on the indication of the second one or more DMRS configurations; and transmitting, to the user equipment, a second transmission that comprises a second DMRS for each of the plurality of groups of layers that are configured in accordance with the different DMRS configuration for each of the plurality of groups of layers.

In Aspect 34, the second transmission in the method of aspect 33 is a data transmission and the plurality of groups of layers in the method of aspect 33 correspond to one or more TBs and the method of aspect 33 includes transmitting the data transmission comprising the one or more TBs, wherein each TB of the one or more TBs is associated with a different DMRS based at least in part on the different DMRS configuration for each of the plurality of groups of layers.

In Aspect 35, the second transmission in the method of any of aspects 33 or 34 is a data transmission and the plurality of groups of layers in the method of any of aspects 33 or 34 correspond to one or more CDM groups, each CDM group including one or more DMRS ports corresponding to a group of layers of the plurality of groups of layers, and the method of any of aspects 33 or 34 includes transmitting the data transmission comprising different DMRS ports associated with each of the one or more CDM groups, wherein each CDM group of the one or more CDM groups is associated with a different DMRS based at least in part on the different DMRS configuration for each of the plurality of groups of layers.

In Aspect 36, the method of any of aspects 33-35 includes receiving a second indication of a grouping for a quantity of layers associated with a data transmission, wherein the plurality of groups of layers are based at least in part on the grouping for the quantity of layers; and determining one or more CDM groups corresponding to the plurality of groups of layers based at least in part on the grouping for the quantity of layers, a selected rank indication, and a CDM group size.

In Aspect 37, the method of aspect 36 includes determining an index of precoding matrix as precoding coefficients for each layer related to each of the one or more CDM groups based at least in part on the grouping indication for each layer of the quantity of layers to a CDM group.

In Aspect 38, the different DMRS configuration for each of the plurality of groups of layers in the method of any of aspects 33-37 comprise a first DMRS configuration for a first group of layers and a second DMRS configuration for a second group of layers.

In Aspect 39, the first DMRS configuration in the method of aspect 38 is associated with a lower temporal density or a lower frequency density, or both, relative to the second DMRS configuration and the method of aspect 38 includes determining that the first DMRS configuration comprises a first quantity of resource elements in a corresponding first set of one or more CDM groups and that the second DMRS configuration comprises a second quantity of resource elements in a corresponding second set of one or more CDM groups, wherein the first quantity of resource elements comprises a third quantity of resource elements less than the second quantity of resource elements; and allocating the third quantity of resource elements to a data transmission.

In Aspect 40, the first DMRS configuration in the method of aspect 38 is associated with a lower temporal density or a lower frequency density, or both, relative to the second DMRS configuration and the method of aspect 40 includes determining that the first DMRS configuration comprises a first quantity of resource elements and that the second DMRS configuration comprises a second quantity of resource elements, wherein the first quantity of resource elements comprises a third quantity of resource elements less than the second quantity of resource elements, the third quantity of resource elements unused for data or DMRS transmission; and boosting a power level for communication over a first group of DMRS ports associated with the first group of layers and over a second group of DMRS ports associated with the second group of layers.

In Aspect 41, selecting the different DMRS configuration for each of the plurality of groups of layers in the method of any of aspects 33-40 includes selecting the second one or more DMRS configurations based at least in part on the indication of the second one or more DMRS configurations, wherein the second DMRS for each of the plurality of groups of layers are configured in accordance with the second one or more DMRS configurations.

In Aspect 42, the method of aspect 41 includes transmitting, to the UE, downlink control information comprising a bit indicating that the different DMRS configuration for each of the plurality of groups of layers are the same as the second one or more DMRS configurations indicated by the UE in a last received indication.

In Aspect 43, selecting the different DMRS configuration for each of the plurality of groups of layers in the method of any of aspects 33-40 includes selecting a third one or more DMRS configurations based at least in part on the second one or more DMRS configurations, wherein the second DMRS for each of the plurality of groups of layers are configured in accordance with the third one or more DMRS configurations.

In Aspect 44, the method of any of aspects 33-43 includes transmitting, to the user equipment, a message that configures the user equipment to use a CSF report format that includes a field for indicating a DMRS configuration for each of the plurality of groups of layers.

In Aspect 45, receiving the indication of the second one or more DMRS configurations in the method of aspect 44 includes receiving a CSF report including the indication of the second one or more DMRS configurations.

In Aspect 46, the method of any of aspects 33-45 includes identifying a set of DMRS configurations based at least in part on the second one or more DMRS configurations or a UE capability, or both; transmitting, to the UE, a MAC-CE activating a subset of DMRS configurations; and transmitting, to the UE, downlink control information indicating one or more DMRS configurations of the subset of DMRS configurations, wherein each of the one or more DMRS configurations correspond to a group of layers of the plurality of groups of layers.

In Aspect 47, the first one or more DMRS configurations and the second one or more DMRS configurations in the method of any of aspects 33-46 comprise different DMRS configurations for each of the plurality of groups of layers.

Aspect 48 is a system or apparatus including means for implementing a method or realizing an apparatus as in any of aspects 1-32.

Aspect 49 is a non-transitory computer-readable medium storing instructions executable by one or more processors to cause the one or more processors to implement a method as in any of aspects 1-32.

Aspect 50 is a system including one or more processors and memory in electronic communication with the one or more processors storing instructions executable by the one or more processors to cause the system or apparatus to implement a method as in any of aspects 1-32.

Aspect 51 is a system or apparatus including means for implementing a method or realizing an apparatus as in any of aspects 33-47.

Aspect 52 is a non-transitory computer-readable medium storing instructions executable by one or more processors to cause the one or more processors to implement a method as in any of aspects 33-47.

Aspect 53 is a system including one or more processors and memory in electronic communication with the one or more processors storing instructions executable by the one or more processors to cause the system or apparatus to implement a method as in any of aspects 33-47.

Examples of these aspects may be combined with aspects or embodiments disclosed in other implementations.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein

What is claimed is:

1. A method for wireless communication at a user equipment, comprising:
   determining a set of channel characteristics and a first link quality characteristic for each layer of a quantity of layers associated with a channel based at least in part on one or more downlink reference signals or a channel state information interference management (CSI-IM) resource, or both;
   identifying, based at least in part on the set of channel characteristics and the first link quality characteristic, a plurality of link quality characteristics for each layer of the quantity of layers, the plurality of link quality characteristics for each layer of the quantity of layers corresponding to a plurality of demodulation reference signal configurations;
   selecting a demodulation reference signal configuration of the plurality of demodulation reference signal configurations for each of a plurality of groups of layers based at least in part on the plurality of link quality characteristics and a communication efficiency metric that is associated with the demodulation reference signal configuration for each of the plurality of groups of layers; and transmitting, to a base station, an indication of the demodulation reference signal configuration for each of the plurality of groups of layers.

2. The method of claim 1, further comprising:

receiving, from the base station, a data transmission associated with the plurality of groups of layers over a data channel based at least in part on the indication of the demodulation reference signal configuration for each of the plurality of groups of layers, wherein the data transmission comprises a demodulation reference signal for each of the plurality of groups of layers associated with the data transmission.

3. The method of claim 2, wherein the plurality of groups of layers correspond to a plurality of transport blocks, the method further comprising:

receiving the data transmission comprising the plurality of transport blocks, wherein each transport block of the plurality of transport blocks is associated with a different demodulation reference signal based at least in part on the indication of the demodulation reference signal configuration for each of the plurality of groups of layers.

4. The method of claim 2, wherein the plurality of groups of layers correspond to a plurality of code division multiplexing groups, the method further comprising:

receiving the data transmission comprising the plurality of code division multiplexing groups, wherein each code division multiplexing group of the plurality of code division multiplexing groups is associated with a different demodulation reference signal based at least in part on the indication of the demodulation reference signal configuration for each of the plurality of groups of layers.

5. The method of claim 1, further comprising:

generating a report that includes the indication of the demodulation reference signal configuration for each of the plurality of groups of layers; and transmitting the report to the base station, wherein transmitting the indication comprises transmitting the report to the base station.

6. The method of claim 5, wherein the report comprises a field for indicating the demodulation reference signal configuration for each of the plurality of groups of layers, a size of the field being based at least in part on a quantity of the plurality of demodulation reference signal configurations.

7. The method of claim 5, further comprising:

determining a grouping for the quantity of layers associated with a data transmission based at least in part on a code division multiplexing group size, wherein the plurality of groups of layers is based at least in part on the grouping for the quantity of layers; and transmitting a second indication of the grouping for the quantity of layers in the report.

8. The method of claim 5, wherein:

the report comprises a first index associated with a first demodulation reference signal configuration, the first index corresponding to one or more indexes associated with a group of layers of the plurality of groups of layers that are related to the first demodulation reference signal configuration;

the group of layers of the plurality of groups of layers corresponds to a code division multiplexing group or a transport block; and each index of the one or more indexes corresponds to a column of a precoding matrix.

9. The method of claim 5, wherein the report is coupled with a channel state feedback report or comprises the channel state feedback report.

10. The method of claim 1, further comprising:

identifying, for a first demodulation reference signal configuration, a second link quality characteristic for each of the quantity of layers based at least in part on the first link quality characteristic for the quantity of layers and a mapping, wherein the plurality of link quality characteristics comprises the second link quality characteristic; and determining a first group of layers comprising a subset of the quantity of layers based at least in part on the second link quality characteristic for each of the quantity of layers.

11. The method of claim 1, wherein selecting the demodulation reference signal configuration for each of the plurality of groups of layers comprises:

determining a first value for the communication efficiency metric for a first group of layers based at least in part on a temporal density, a frequency density, a first power level for a first demodulation reference signal configuration relative to a second power level for a data transmission, and a second link quality characteristic for the first group of layers for the first demodulation reference signal configuration;

determining, for each remaining demodulation reference signal configuration of the plurality of demodulation reference signal configurations for the first group of layers, a first plurality of values for the communication efficiency metric based at least in part on respective temporal densities, respective frequency densities, respective power levels relative to the second power level for the data transmission, and respective second link quality characteristics of each of the remaining demodulation reference signal configurations;

determining that the first value for the communication efficiency metric associated with the first demodulation reference signal configuration is different from the first plurality of values for the communication efficiency metric associated with each of the remaining demodulation reference signal configurations; and selecting the first demodulation reference signal configuration for the first group of layers.

12. The method of claim 11, further comprising:

determining that a second value for the communication efficiency metric associated with a second demodulation reference signal configuration for a second group of layers is different from a second plurality of values for the communication efficiency metric associated with each of the remaining demodulation reference signal configurations for the second group of layers; and selecting the second demodulation reference signal configuration for the second group of layers.

13. The method of claim 1, further comprising:

determining the plurality of groups of layers, each of the plurality of groups of layers associated with one of a plurality of transmission and reception points, wherein determining the demodulation reference signal configuration for each of the plurality of groups of layers comprises determining the demodulation reference signal configuration for a transmission and reception point associated with each of the plurality of groups of layers, and wherein the plurality of groups of layers correspond to a plurality of code division multiplexing groups.

14. The method of claim 1, wherein the plurality of groups of layers correspond to one or more transport blocks, the method further comprising:
  determining a channel quality indicator for each of the one or more transport blocks based at least in part on the selected demodulation reference signal configuration for each of the one or more transport blocks; and
  transmitting, to the base station, a second indication of the channel quality indicator defined based at least in part on the selected demodulation reference signal configuration for each of the one or more transport blocks.

15. The method of claim 1, wherein the plurality of groups of layers correspond to a plurality of involved code division multiplexing groups and a single transport block, the method further comprising:
  determining a second link quality characteristic for each layer of the quantity of layers based at least in part on the first link quality characteristic and a mapping, wherein layer association to each of the plurality of involved code division multiplexing groups is based at least in part on the second link quality characteristic for each layer of the quantity of layers;
  identifying a group of layers of the plurality of groups of layers associated with a greatest second link quality characteristic, wherein the group of layers corresponds to a code division multiplexing group;
  determining a channel quality indicator for the single transport block based at least in part on the demodulation reference signal configuration for the group of layers associated with the greatest second link quality characteristic; and
  transmitting, to the base station, a second indication of the channel quality indicator for the single transport block.

16. The method of claim 1, further comprising:
  receiving, from the base station, a medium access control (MAC) control element (CE) activating a subset of demodulation reference signal configurations; and
  receiving, from the base station, downlink control information indicating one or more demodulation reference signal configurations of the subset of demodulation reference signal configurations, wherein each of the one or more demodulation reference signal configurations correspond to a group of layers of the plurality of groups of layers.

17. The method of claim 1, wherein:
  the plurality of groups of layers correspond to one or more groups of demodulation reference signal ports related to one or more code division multiplexing groups;
  one or more transport blocks are associated with the one or more code division multiplexing groups; and
  selecting the demodulation reference signal configuration of the plurality of demodulation reference signal configurations for each of the plurality of groups of layers comprises selecting the demodulation reference signal configuration of the plurality of demodulation reference signal configurations for at least on of each of the one or more code division multiplexing groups or each of the one or more transport blocks.

18. A method for wireless communication at a base station, comprising:
  transmitting, to a user equipment, a first transmission that comprises a first demodulation reference signal for each of a plurality of groups of layers associated with the first transmission, the first demodulation reference signal for each of the plurality of groups of layers being configured in accordance with a first one or more demodulation reference signal configurations of a plurality of demodulation reference signal configurations;
  receiving, from the user equipment, an indication of a second one or more demodulation reference signal configurations of the plurality of demodulation reference signal configurations based at least in part on a channel state information reference signal (CSI-RS) and a channel state information interference management (CSI-IM) resource, the second one or more demodulation reference signal configurations comprising a demodulation reference signal configuration for each of the plurality of groups of layers;
  selecting a different demodulation reference signal configuration of the plurality of demodulation reference signal configurations for each of the plurality of groups of layers that are different than the first one or more demodulation reference signal configurations based at least in part on the indication of the second one or more demodulation reference signal configurations; and
  transmitting, to the user equipment, a second transmission that comprises a second demodulation reference signal for each of the plurality of groups of layers that are configured in accordance with the different demodulation reference signal configuration for each of the plurality of groups of layers.

19. The method of claim 18, wherein the second transmission is a data transmission and the plurality of groups of layers correspond to one or more transport blocks, the method further comprising:
  transmitting the data transmission comprising the one or more transport blocks, wherein each transport block of the one or more transport blocks is associated with a different demodulation reference signal based at least in part on the different demodulation reference signal configuration for each of the plurality of groups of layers.

20. The method of claim 18, wherein the second transmission is a data transmission and the plurality of groups of layers correspond to one or more code division multiplexing groups, each code division multiplexing group including one or more demodulation reference signal ports corresponding to a group of layers of the plurality of groups of layers, the method further comprising:
  transmitting the data transmission comprising different demodulation reference signal ports associated with each of the one or more code division multiplexing groups, wherein each code division multiplexing group of the one or more code division multiplexing groups is associated with a different demodulation reference signal based at least in part on the different demodulation reference signal configuration for each of the plurality of groups of layers.

21. The method of claim 18, further comprising:
  receiving a second indication of a grouping for a quantity of layers associated with a data transmission, wherein the plurality of groups of layers are based at least in part on the grouping for the quantity of layers; and
  determining one or more code division multiplexing groups corresponding to the plurality of groups of layers based at least in part on the grouping for the quantity of layers, a selected rank indication, and a code division multiplexing group size.

22. An apparatus for wireless communication at a user equipment, comprising:
   a processor,
   memory coupled with the processor; and
   instructions stored in the memory and executable by the processor to cause the apparatus to:
      determine a set of channel characteristics and a first link quality characteristic for each layer of a quantity of layers associated with a channel based at least in part on one or more downlink reference signals or a channel state information interference management (CSI-IM) resource, or both;
      identify, based at least in part on the set of channel characteristics and the first link quality characteristic, a plurality of link quality characteristics for each layer of the quantity of layers, the plurality of link quality characteristics for each layer of the quantity of layers corresponding to a plurality of demodulation reference signal configurations;
      select a demodulation reference signal configuration of the plurality of demodulation reference signal configurations for each of a plurality of groups of layers based at least in part on the plurality of link quality characteristics and a communication efficiency metric that is associated with the demodulation reference signal configuration for each of the plurality of groups of layers; and
      transmit, to a base station, an indication of the demodulation reference signal configuration for each of the plurality of groups of layers.

23. The apparatus of claim 22, wherein the instructions are further executable by the processor to cause the apparatus to:
   receive, from the base station, a data transmission associated with the plurality of groups of layers over a data channel based at least in part on the indication of the demodulation reference signal configuration for each of the plurality of groups of layers, wherein the data transmission comprises a demodulation reference signal for each of the plurality of groups of layers associated with the data transmission.

24. The apparatus of claim 23, wherein the plurality of groups of layers correspond to a plurality of transport blocks, and the instructions are further executable by the processor to cause the apparatus to:
   receive the data transmission comprising the plurality of transport blocks, wherein each transport block of the plurality of transport blocks is associated with a different demodulation reference signal based at least in part on the indication of the demodulation reference signal configuration for each of the plurality of groups of layers.

25. The apparatus of claim 23, wherein the plurality of groups of layers correspond to a plurality of code division multiplexing groups, and the instructions are further executable by the processor to cause the apparatus to:
   receive the data transmission comprising the plurality of code division multiplexing groups, wherein each code division multiplexing group of the plurality of code division multiplexing groups is associated with a different demodulation reference signal based at least in part on the indication of the demodulation reference signal configuration for each of the plurality of groups of layers.

26. The apparatus of claim 22, wherein the instructions are further executable by the processor to cause the apparatus to:
   generate a report that includes the indication of the demodulation reference signal configuration for each of the plurality of groups of layers; and
   the instructions to transmit the report to the base station, wherein transmitting the indication are executable by the processor to cause the apparatus to transmit the report to the base station.

27. An apparatus for wireless communication at a base station, comprising:
   a processor,
   memory coupled with the processor; and
   instructions stored in the memory and executable by the processor to cause the apparatus to:
      transmit, to a user equipment, a first transmission that comprises a first demodulation reference signal for each of a plurality of groups of layers associated with the first transmission, the first demodulation reference signal for each of the plurality of groups of layers being configured in accordance with a first one or more demodulation reference signal configurations of a plurality of demodulation reference signal configurations;
      receive, from the user equipment, an indication of a second one or more demodulation reference signal configurations of the plurality of demodulation reference signal configurations based at least in part on a channel state information reference signal (CSI-RS) and a channel state information interference management (CSI-IM) resource, the second one or more demodulation reference signal configurations comprising a demodulation reference signal configuration for each of the plurality of groups of layers;
      select a different demodulation reference signal configuration of the plurality of demodulation reference signal configurations for each of the plurality of groups of layers that are different than the first one or more demodulation reference signal configurations based at least in part on the indication of the second one or more demodulation reference signal configurations; and
      transmit, to the user equipment, a second transmission that comprises a second demodulation reference signal for each of the plurality of groups of layers that are configured in accordance with the different demodulation reference signal configuration for each of the plurality of groups of layers.

28. The apparatus of claim 27, wherein the second transmission is a data transmission and the plurality of groups of layers correspond to one or more transport blocks, and the instructions are further executable by the processor to cause the apparatus to:
   transmit the data transmission comprising the one or more transport blocks, wherein each transport block of the one or more transport blocks is associated with a different demodulation reference signal based at least in part on the different demodulation reference signal configuration for each of the plurality of groups of layers.

29. The apparatus of claim 27, wherein the second transmission is a data transmission and the plurality of groups of layers correspond to one or more code division multiplexing groups, each code division multiplexing group including one or more demodulation reference signal ports corresponding to a group of layers of the plurality of groups of layers, and the instructions are further executable by the processor to cause the apparatus to:

transmit the data transmission comprising different demodulation reference signal ports associated with each of the one or more code division multiplexing groups, wherein each code division multiplexing group of the one or more code division multiplexing groups is associated with a different demodulation reference signal based at least in part on the different demodulation reference signal configuration for each of the plurality of groups of layers.

30. The apparatus of claim 27, wherein the instructions are further executable by the processor to cause the apparatus to:

receive a second indication of a grouping for a quantity of layers associated with a data transmission, wherein the plurality of groups of layers are based at least in part on the grouping for the quantity of layers; and determine one or more code division multiplexing groups corresponding to the plurality of groups of layers based at least in part on the grouping for the quantity of layers, a selected rank indication, and a code division multiplexing group size.

* * * * *